(12) United States Patent
Goodwin

(10) Patent No.: US 12,737,718 B2
(45) Date of Patent: Sep. 15, 2026

(54) METHOD AND APPARATUS FOR A CLOUD CONNECTED IOT WINE STORAGE SYSTEM

(71) Applicant: Paul Goodwin, Cedar Park, TX (US)

(72) Inventor: Paul Goodwin, Cedar Park, TX (US)

( * ) Notice: Subject to any disclaimer, the term of this patent is extended or adjusted under 35 U.S.C. 154(b) by 334 days.

(21) Appl. No.: 18/154,944

(22) Filed: Jan. 16, 2023

(65) Prior Publication Data

US 2024/0242173 A1 Jul. 18, 2024

(51) Int. Cl.

| | |
|---|---|
| ***G06Q 10/087*** | (2023.01) |
| ***H04W 4/35*** | (2018.01) |
| ***H04W 4/38*** | (2018.01) |
| *H04W 88/04* | (2009.01) |

(52) U.S. Cl.

CPC ............ *G06Q 10/087* (2013.01); *H04W 4/35* (2018.02); *H04W 4/38* (2018.02); *H04W 88/04* (2013.01)

(58) Field of Classification Search

CPC ........ G06Q 10/087; H04W 4/35; H04W 4/38; H04W 88/04

USPC ........................................................... 705/28

See application file for complete search history.

(56) References Cited

U.S. PATENT DOCUMENTS 8,717,182 B1 * 5/2014 Brashears .......... G06K 7/10722 340/572.1
2020/0214474 A1 * 7/2020 Ryu ........................ G07F 9/023

FOREIGN PATENT DOCUMENTS

EP 3677862 A1 * 7/2020 ............ A47B 73/00

* cited by examiner

*Primary Examiner* — Garcia Ade

(57) ABSTRACT

Sensor modules referred to herein as “buds”, are connected by wireline or wirelessly to a controller referred to herein as a “root” in what is referred to herein as a vine to provide inventory control information for a wine storage facility. Buds sense when objects are moved into or out of sensing range of a proximity sensor and, in alternative embodiments, may also track or control other quantities of interest, like the local temperature, humidity, or VOCs. A root may broadcast a message to all buds, or send a message to an individual bud, while buds return messages back to the root. Scaling of the system is accomplished through the use of roots as repeaters or targets. In a preferred embodiment, the vine originates at the root and each bud has at least two downstream facing ports, which dispatch messages along paths referred to here as “primary” and “divergent”.

20 Claims, 61 Drawing Sheets

$1004_3$
$1004_2$
$1004_1$
4dn
4d1
4c3
4c2
4c1
4b2
4bn
4b1
4cn
4c1
4bn
4b2
4a1
4a2
4a3
2
5
59
33
34
$1002_2$
$1002_1$
$1002_3$
$1000_1$
$1000_2$
$1000_3$

METHOD AND APPARATUS FOR A CLOUD CONNECTED IOT WINE STORAGE SYSTEM

TECHNICAL FIELD

The present invention relates to "Internet of Things" devices. More particularly, this invention relates to improved wine storage management systems and methods. systems.

BACKGROUND OF THE INVENTION

The earliest known wine cellars date back to the 4$^{th}$ century B.C.E. in Egypt. The earliest reference to getting wine from a wine cellar is on a papyrus scroll from the 7$^{th}$ century, found in Jerusalem.

The last major advance in wine storage occurred in the 17$^{th}$ century, when wine began to be stored in glass bottles with a cork closure. Along with the practice of fortification, this allowed wines to be preserved for shipping over long distances, or stored for long periods of time.

Today many houses have some form of wine storage. These range from under counter refrigerators to dedicated climate-controlled rooms that store thousands of bottles.

Tracking a wine collection, however, is still a manual process. The state of the inventory is only as good as the discipline of the owner and other household members. Failing to log wines taken out of the collection leads to not being able to find wines that are listed in the ledger. Failing to log wines that are placed in the collection, or record when a bottle is moved from one location to another, leads to wines being forgotten and potentially spoiling before they can be drunk.

This can be resolved by periodically inventorying the entire wine collection, but while. it may only take a few minutes to verify the bottles in an under-cabinet wine refrigerator, larger collections may require days or weeks to inventory.

What is needed, therefore, is a method and apparatus to allow collectors to check only those bottles which may have been moved since their last inventory.

SUMMARY OF THE INVENTION

Sensor and control modules referred to herein as "buds", are connected by wireline or wirelessly to a master controller referred to herein as a "root" in what is referred to herein as a vine interconnect to a wine or bottle storage facility. Buds sense when objects are moved into or out of close proximity of a proximity sensor that disposed adjacent to a bottle receptive socket in a storage facility and, in alternative embodiments, may also track other quantities of interest, like the local temperature, humidity, or light level. The system may also be accompanied by control modules, used to control other devices or components such as lights, alarms, cooling units, or humidifiers using information acquired from one or more sensors.

Buds monitor for selected object proximity and may also monitor temperature at the location of the sensor of the bud. Optionally, humidity, motion, power consumption, light, liquid level and distance may be monitored. In addition to the sensing functions, the multi-function sensors may have controllable multi-color indicators, spot lights, audible alarms, or tactile feedback.

The controller modules are used to control internal or external functions. Internal functions such as spotlights may illuminate a particular bottle or area with multi-color visible indicators. External functions can be lighting, humidifiers, alarms, video recording, cooling units, fans. Audible alarms and vibration can be used by those who are visually impaired to locate the area of the wine cellar where the bottle is located and the tactile feedback to identify the particular socket.

A root may broadcast a message to all buds, or send a message to an individual bud, while buds return messages back to the root. It is desirable that the vine should be able to scale to a large number of buds without excessive wiring or latency, as in the larger use cases, the number of buds required could exceed 10,000.

This scaling is accomplished through the use of some or all buds as repeaters or targets. The root injects messages into the network and the messages are comprised of a command to be delivered to a particular address associated with a bud of the vine. If a bud receives a message not addressed to it, it the receiving bud determines which direction the message will be sent based on the addressing in the message and forwards the message out a downstream facing port.

Messages originating with, rather than passed along by a bud are destined for the root. A bud which receives a message intended for the root forwards it out on a root-facing port.

In a preferred embodiment, the vine originates at the root and each bud has at least two downstream facing ports, which dispatch messages along paths referred to here as "primary" and "divergent" or secondary. In a preferred embodiment, a message on a primary path can take a divergent path or continue on the primary route depending upon the intended address. If the message takes a first divergent path it can continue on this first divergent path or then take a second or tertiary or even higher order divergent path. One of skill in the art after appreciating this disclosure can see where there could be more than one outbound port at each bud and the number of times that a message can take a divergent path can be more than two and is only limited by the implementation.

In a preferred embodiment, a bud on the first primary path represents a physical wine rack, and the primary route is up to 32 hops long. If the message is targeted at a bud on a first divergent path then it is routed to the divergent port. In a preferred embodiment, the first divergent route is up to 32 hops long, and corresponds to a shelf in a wine rack. If the message is targeted at a bud on a tertiary or higher order path, the message is routed to the divergent port. The second divergent route of the preferred embodiment is up to 16 hops long, and corresponds to a socket in a wine rack.

The present invention can be used advantageously to detect whenever a bottle or other unit in storage is added, removed, or removed and placed in a different socket. By detecting whether and when, a bottle is added or removed from a socket in the storage facility, the inventory of bottles such as wine bottles in a storage facility can be kept up to date.

When a sensor portion of a bud assembly in an embodiment of the present invention detects a change in the population of items in the storage device the person responsible for maintaining the collection may, depending on the updating of an associated database, be notified that the database is out of sync with the population of the storage and determine what sockets have had activity without having to check every socket in the collection.

The present invention may also be used advantageously to notify the owner referred to as the keeper of the wine collection when there is a change to the population when they are not present. The keeper may not be present because they are travelling, they have collections in multiple locations, or they are contracting storage with a third party that has the present invention deployed.

Thru the connection to the cloud a change in the population in a socket in their cellar can trigger a message to be send to the keeper's mobile device.

The present invention may be used advantageously to monitor the temperature distribution across the cellar. This gives the keeper of the cellars the temperature gradient across the cellar.

With the temperature gradient the keeper can make manual changes to the airflow of the cellar to either balance the temperature across the entire cellar or to create zones of different temperatures and locate wines in the appropriate temperature zone or the system can turn on fans to circulate air to areas that are out of temperature range.

The present invention may be used advantageously to monitor the humidity in the wine cellar. Humidity is as important to the proper storage of wine as temperature is.

By monitoring the humidity, the present invention is able to remotely control a humidifier to put moisture in the air in a wine cellar to maintain the proper humidity levels.

The present invention may be used advantageously to locate a bottle of wine in a wine cellar. By searching and filtering the database of a wine collection down to a single bottle or all wines in a certain category the location in the cellar can be highlighted with a visual indication.

In addition to the convenience of a visual indicator where a selected bottle of wine is it has the additional benefit of making the wine cellar more energy efficient. Being able to quickly locate the selected bottle the door or doors of the wine cellar are not open as long and do not let the cold air out. In addition to being more energy efficient it will extend the life of the cooling unit by reducing the time it needs to be on to bring the temperature back to the desired point.

Connecting the wine cellar tracking system to the cloud provides other benefits for both the keeper of the cellar and suppliers. For keepers that are members of a wine club thru a winery or retailer the club can push the list of wines to be delivered into the system saving the keeper from manually entering the data. When the wine is received the keeper can select a bottle from the list, place it in a socket and the system will register that bottle in that socket.

The present invention may be used advantageously to provide decorative lighting. With a wine cellar that is visible from a seating area the matrix of buds with optical indicators can be all turned on or randomly turned on to provide decorative lighting.

The present invention may be used advantageously to control the wine cellar's chiller unit. A wine cellar chiller is typically controlled by a single thermostat. This is either a thermostat on the chiller unit or a remote sensor. The remote sensor is often a temperature probe placed in a bottle of liquid that is placed into a socket of the wine cellar. Monitoring the temperature of the liquid in a bottle probe tends to lag the conditions in the wine cellar. So the wine cellar may have warmed up considerably before the temperature of the liquid in the bottle warms. Conversely the temperature in the cellar may drop well below the desired temperature before the probe in the bottle detects that the desired temperature has been reached. This results in the chiller working harder when it doesn't need to, and it is not on when it needs to be.

The present invention can take multiple temperature readings from the cellar and control the chiller in an optimal and efficient fashion. The multiple readings can be a combination of dedicated temperature sensors and in bottle probes distributed across the cellar to give an accurate reflection of the temperature across the whole cellar.

The present invention may be used advantageously by a collector or a bottle storage facility to monitor and continuously record the temperature that a bottle was stored at to demonstrate that the bottle has continuously been kept at a proper storage temperature.

The present invention may be used advantageously by the visually handicapped to locate a region of a wine cellar that a bottle is stored in thru an audible sound and to locate the selected bottle but tactile feedback.

The present invention can be used advantageously to monitor activity within the cellar. When one of the matrix of buds detects a change the present invention can enable a video camera to start recording the area in and around the wine cellar. Thus, in addition to detecting and logging any changes to the population within the cellar there is video of who is making the changes.

The present invention may be used advantageously by a winery, wine club or wine merchant to track the consumption, likes, dislikes and inventory of their clients or members.

These features and advantages of the invention will become apparent upon reading the following specification, when taken in conjunction with the accompanying drawings.

DETAILED DESCRIPTION

Figure 1:
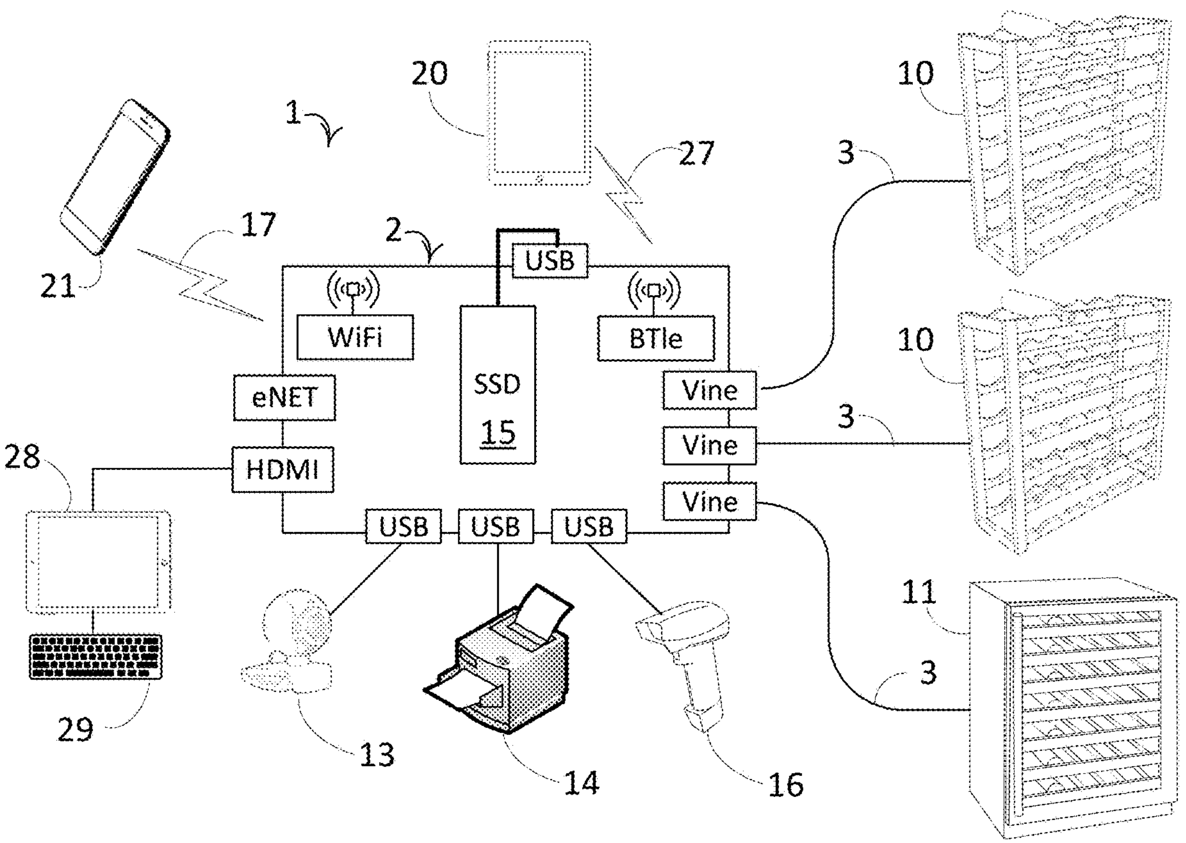
FIG. 1 is a graphical depiction of a preferred embodiment of the present invention.

The graphical depiction of FIG. 1 illustrates an embodiment of the present invention as implemented to monitor a wine collection. As shown in FIG. 1, root 2 is connected to unrefrigerated wine racks 10 and refrigerated wine storage appliance 11 through vine interconnects 3. Root 2 is also depicted with connections to exemplar peripheral devices such as a video camera 13, printer 14, a bar code scanner 16, and data storage devices 15. Root 2 may be accessed by an attached touch screen monitor 28 tablet computer 20 via Bluetooth link 27 or via a cell phone 21 over a wireless link 17.

Figure 2:
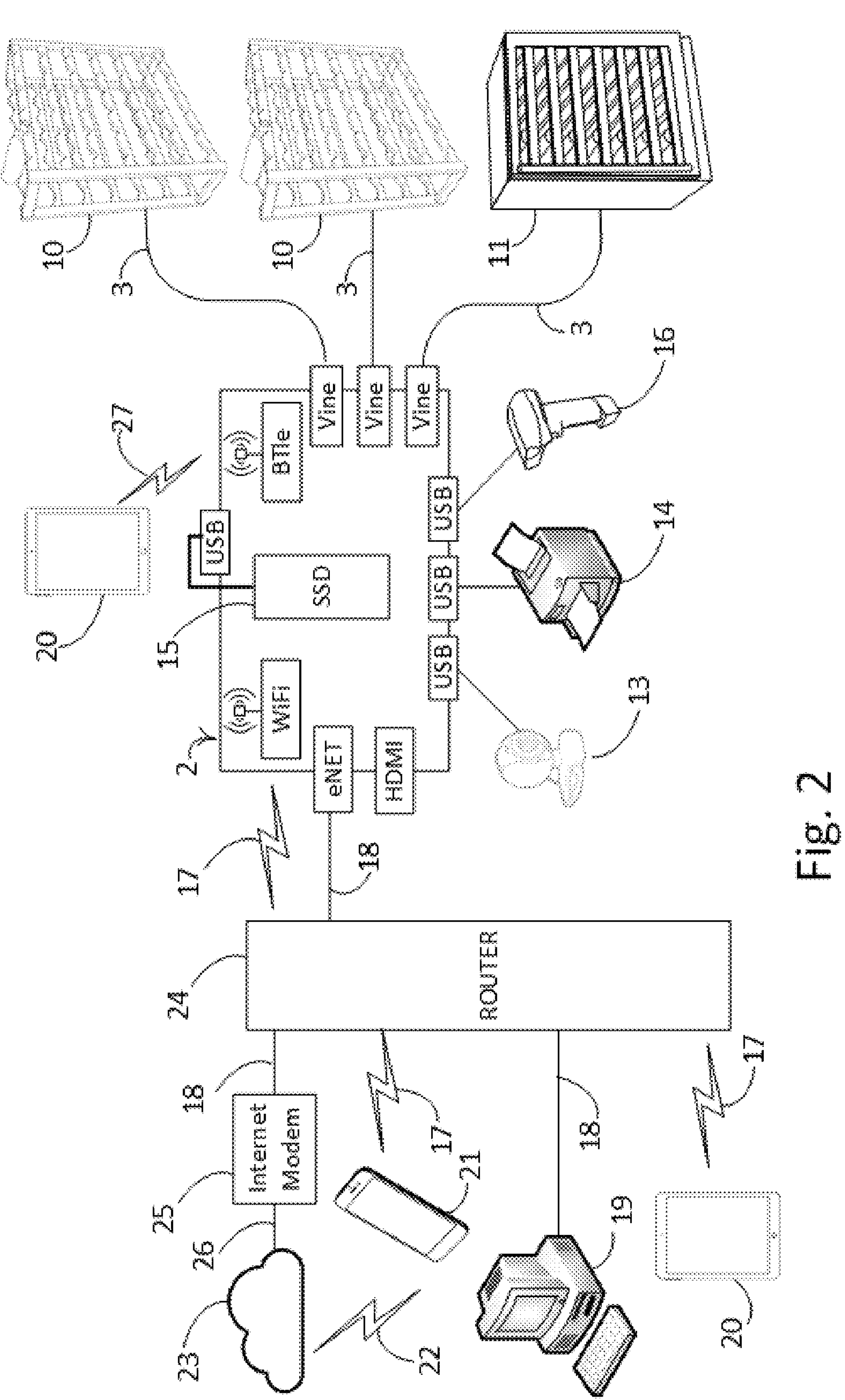
FIG. 2 depicts a preferred embodiment implemented with a cloud environment.

FIG. 2 depicts a preferred embodiment of the present invention implemented with a cloud environment. The wine management system depicted in FIG. 2 is comprised root 2 and vines 3 which in concert with existing infrastructure such as the following non limiting features of a network router 24, WIFI connections 17, ethernet connections 18, a computer 19, a tablet 20, a cell phone 21, a cellular connection 22, an internet modem 25, broadband connections 26, and the cloud 23 provides a novel system and method for the management of wine inventory. Those of skill will appreciate that, in addition to the exemplar above-noted existing infrastructure features, peripheral devices may be connected to the present invention such as, for example, a video camera 13, a printer 14, or a laser scanner 16, a touch screen display 28 and/or a keyboard 29.

Figure 3:
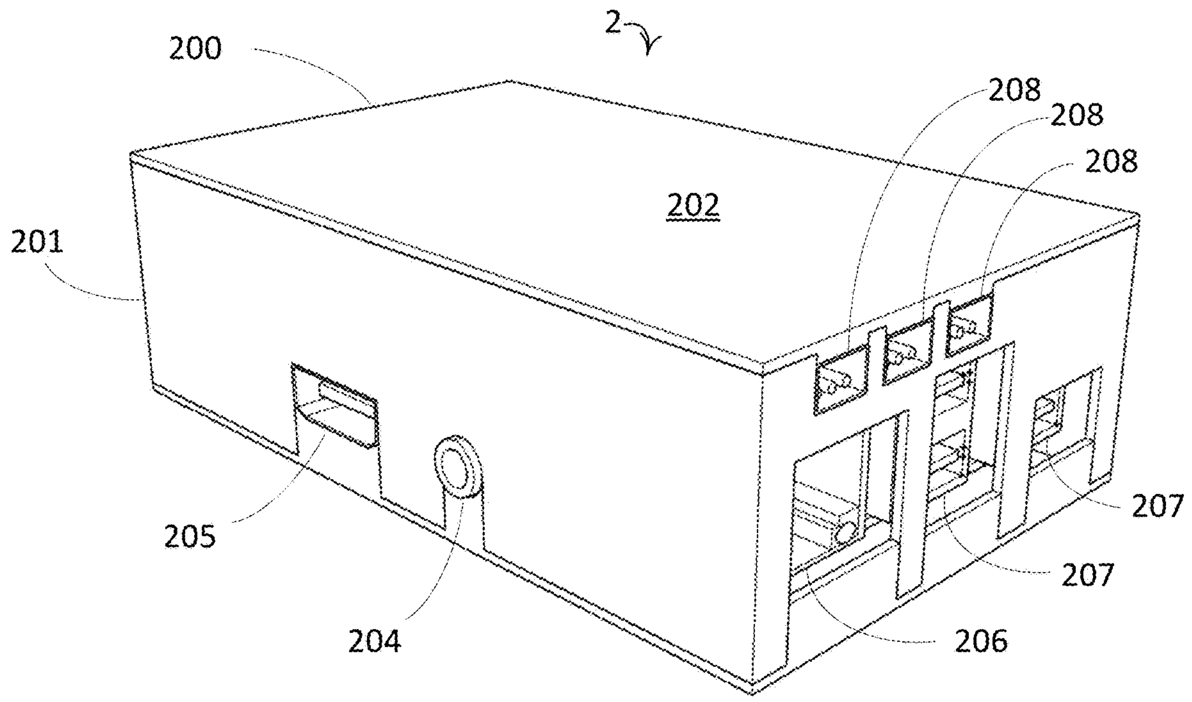
FIG. 3 depicts an embodiment of a root controller or "root.".

FIG. 3 depicts the external appearance of an enclosure for an exemplar root 2 of an embodiment of the present invention. Enclosure 200 is comprised of a frame 201 with a top cover 202 and a bottom cover 203. Exemplar enclosure 200 has accessible connections for root 2 including, for example, power 204, video monitor 205, ethernet 206, multiple USB devices 207, and multiple connections 208 to various configurations of vine 3.

Figure 4:
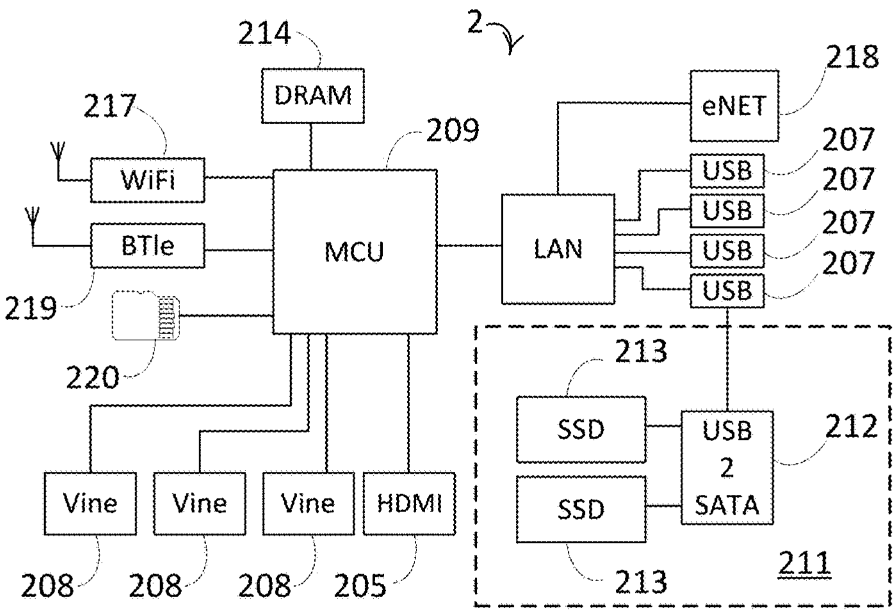
FIG. 4 depicts a block diagram of a root controller that may be employed in a preferred embodiment of the present invention.

FIG. 4 depicts a block diagram of an embodiment of root 2 minus sensing components. In depicted root 2, a microcontroller unit (MCU) 209 executes firmware code stored in flash module 220 that employs RAM memory 214 for temporary storage. As those of skill will appreciate, in root 2, logic other than a what is conventionally known as a microcontroller may be employed to execute appropriate firmware code such as, in simple embodiments, a state machine combinatorial logic or similar circuitry or in more complicated embodiments, a microprocessor. MCU 209 communicates with an array of buds 4 as shown in further figures and may communicate with additional roots 2 via one or more vine interconnect interfaces 208. Exemplar root 2 is depicted with four USB connectors 207 for peripheral devices although any useful number of such peripherals may be employed. In the depicted configuration, one of USB connectors 207 is dedicated to a local storage module 211. In the embodiment depicted, this local storage 211 is comprised of a USB to SATA bridge controller 212 and one or more SSD modules 213 and may be instantiated as a module.

Root 2 has multiple means to receive commands and provides status. A user of the system may communicate wirelessly with root 2 over, for example, WIFI 217 or Bluetooth 219 interfaces or directly thru a touch screen display connected to a HDMI interface 205 or with an IO device connected to one of the USB 208 interfaces. Additionally, in preferred embodiments, root 2 provides a wired ethernet interface 218 for remote access.

Figure 5:
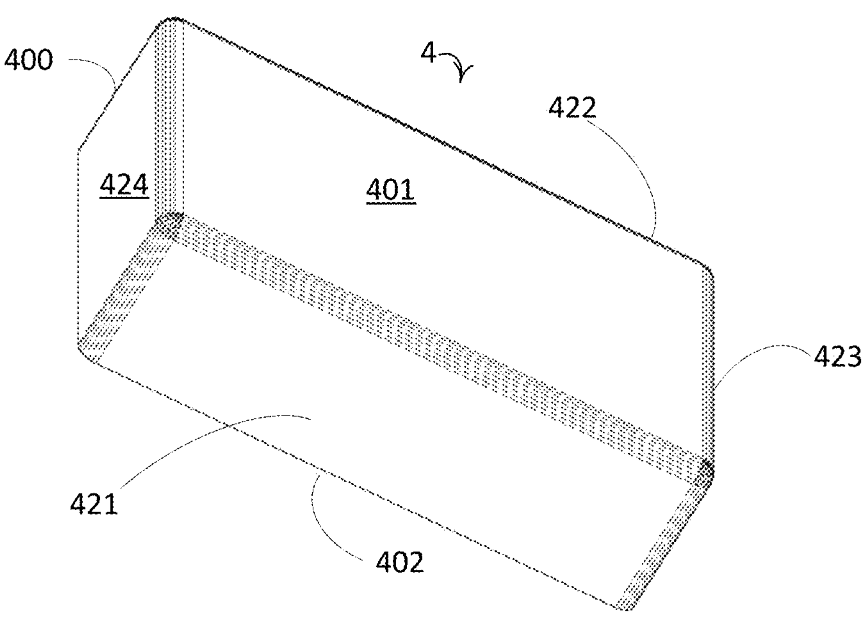
FIG. 5 depicts the exterior of a multi-function bud for use in a preferred embodiment of the present invention.

FIG. 5 depicts an external enclosure 400 of a multi-function sensor known and identified herein as a bud or multi-function bud 4. Depicted enclosure 400 has a first major side 401 or top, and a second major side 402 or bottom. Depicted enclosure 400 also has a first long minor side 421 and a second long minor side 422 as well as short minor sides 423 and 424, respectively. One or more of the sides of enclosure 400 are preferably translucent when a sensor that employs a light frequency is employed but those of skill will recognize that the physical implementation of an enclosure for a bud may vary depending on the application and wine storage facility with which it is to be employed.

Figure 6:
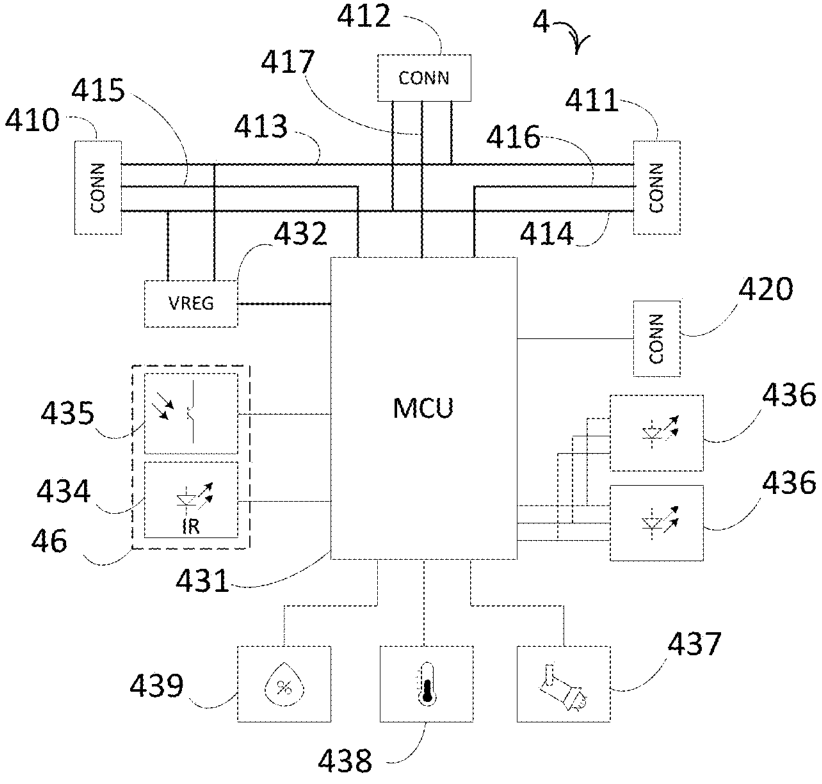
FIG. 6 depicts an exemplar block diagram of a bud that may be advantageously employed in a preferred embodiment of the present invention.

FIG. 6 is a block diagram of an electrical implementation of an exemplar bud 4 that includes sensing components. As shown, microcontroller 431 is connected to multiple I/O access facilities including connector 410 for a root-facing port and connector 411 for a primary path and connector 412 for a divergent path. Root facing port connector 410 is the input for messages originating from root 2. The exemplar connector has three contacts for power 413, ground 414 and data 415. The primary path connector 411 also has three contacts for power 413, ground 414 and data 416. As with the root-facing port connector 410 and the downstream facing port connector, divergent port connector 412 has three contacts including power 413, ground 414 and data 417. Power 413 and ground 414 are in common connection to root facing port connector 410, primary path connector 411, and divergent port connector 412.

Power distributed on vine 3 is preferably at a higher voltage than the voltage used by the components in bud 4. Vine 3 can be relatively long, and consequently, there can be a voltage drop due to the resistance of the wire and the resistance of the connectors. Therefore, a higher voltage than for example, the common 5V is preferred. In addition, the current carrying capacity of a vine 3 typically needs to be able to supply a large number of buds 4 and, for example, using a common operating voltage such as 5V, a large gauge wire would be required. By distributing a higher voltage, a lower gauge wire can be used. Smaller gauge wire allows for smaller connectors which in turn keeps the bud 4 small. The distributed voltage may be reduced to the required operating voltage with voltage regulator 432.

In preferred embodiments, a proximity detector or sensor is part of bud 4 but those of skill will recognize that the sensing components may be implemented in a module physically separated from the other signal managing components of bud 4. Bud 4 is preferably disposed proximal to a socket in a wine storage rack as later explained so that the proximity detector may sense the socket status indicating whether that socket is occupied or populated by a bottle or not and thus the respective bud 4 may signal root 2 as to that status using a communications path between root 2 and the respective bud 4. In preferred embodiments, visible light sources are used as addressable indicators so that the status of a socket being monitored by a bud is communicated to root 2 but is apparent as well through the addressable indicator. Other modes of signaling the socket status indicating the presence or absence of bottles may also be implemented with the present invention including just as examples, vibrational transducers for those who cannot see and sound generation to draw attention to particular areas of wine storage where inventory has recently changed.

Optional connector 420 may be used for external devices. These external devices may be remote indicator modules, annunciators, presence detection, or control for other devices.

An optional high intensity LED 437 is available to light an area of the wine cellar. Other optional features in the bud 4 are a humidity detector 439 and a temperature sensor 438.

Figure 7:
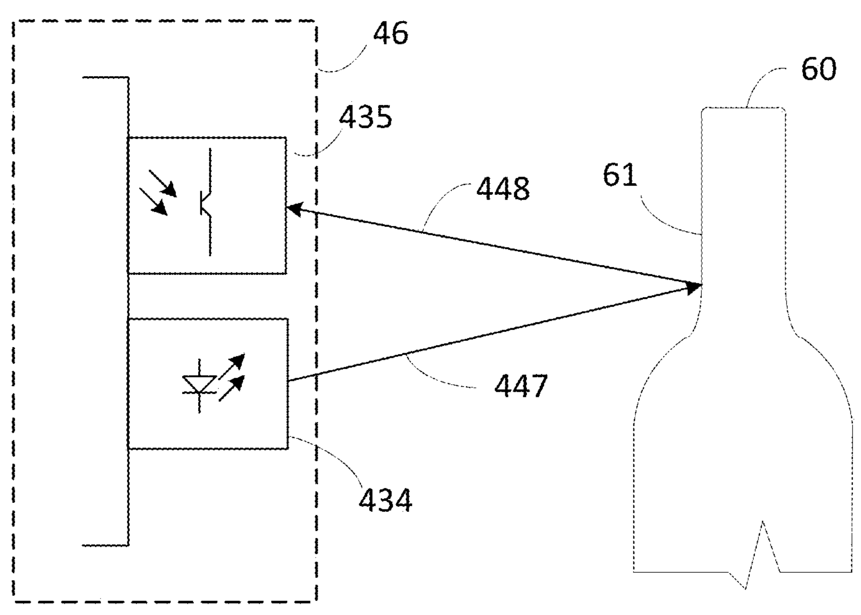
FIG. 7 depicts the use of an IR proximity sensor of a bud to detect the presence of a wine bottle in a preferred embodiment of the present invention.

FIG. 7 depicts a high-level schematic of a preferred embodiment of an exemplar proximity sensor 46. Proximity sensor 46 uses an IR light source 434 and a photo transistor 435 to detect wine bottle 60. IR light source 434 emits a beam 447 of infrared light. When a wine bottle is in proximal range to light source 434 it reflects a portion of the transmitted light 448. Phototransistor 435 detects this reflected light 448.

As one skilled in the art can envision, proximity sensor 46 can be configured to detect a bottle 60 in a socket where any part of bottle 60 comes into proximal range of the sensor. One can also envision that instead of a wine bottle 60, the unit being detected can be a case with wine bottles in it. Such a case can be made of wood, plastic or cardboard or other materials suitable for carriage.

Figure 8:
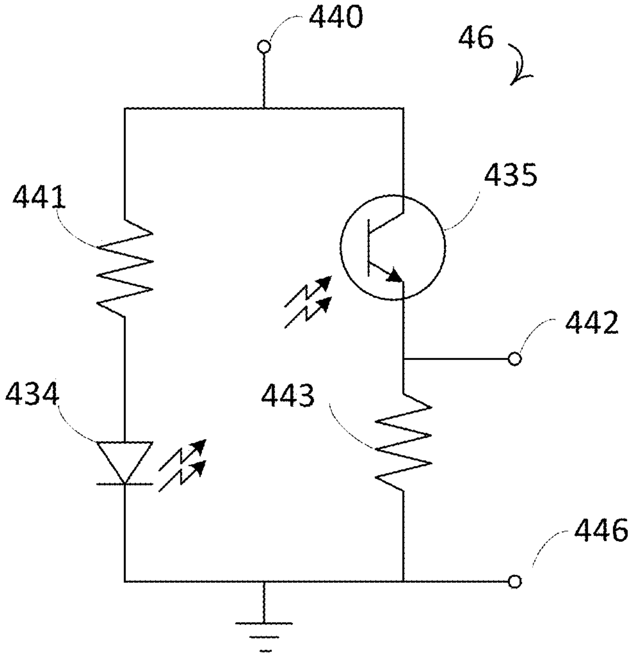
FIG. 8 depicts a simple schematic of an IR proximity sensor.

FIG. 8 is an exemplary circuit of the IR proximity sensor 46 of FIG. 7. A voltage is applied at the Vin terminal 440 and a current flows thru resistor 441 that results in the IR LED 434 emitting IR light. When there is not an object near the detector there will not be any IR light reflected to the photo transistor 435. Photo transistor 435 will be in a high impedance state and the resistor 443 will act as a pull-down and pull the voltage on the Vout terminal 442 to near 0V.

When an object is close to proximity detector 46, IR light from the IR LED 434 will be reflected onto the photo detector 435. When the photo transistor 435 is exposed to IR light it becomes lower in impedance proportional to the amount of IR light that shines on it. In this low impedance state the photo transistor 435 acts as a voltage divider with resistor 443 and the voltage on the Vout terminal 442 rises. The value of resistor 443 is picked so that when an object is close the output is above a detectable level.

One skilled in the art will recognize that the circuit can be always on providing continuous detection or it could be cycled on and off. Cycling the detector on and off will reduce the power and only sampling for the IR light return when the IR source is on will reduce false readings due to other IR sources such as TV remote controls.

Figure 9:
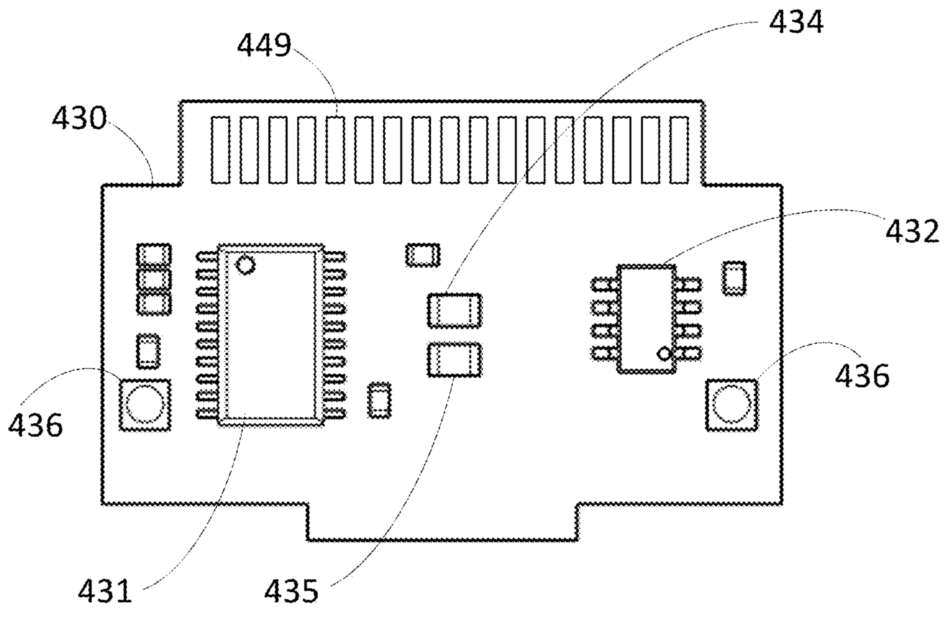
FIG. 9 depicts the top side of an exemplar PCB printed circuit board for use with a sensor node of a bud in a preferred embodiment of the present invention.

FIG. 9 shows a primary side of a PCB 430 of an embodiment of the block diagram of FIG. 6. In the depicted embodiment, a minimum required components are populated on this primary side. Microcontroller 431, voltage regulator 432, IR LED 434 and phototransistor 435 and the RGB LEDs 436 are all populated on this side. An edge card connector 449 is disposed along one edge of the PCB 430 to facilitate programming the MCU 431 and debugging the module 430.

Figure 10:
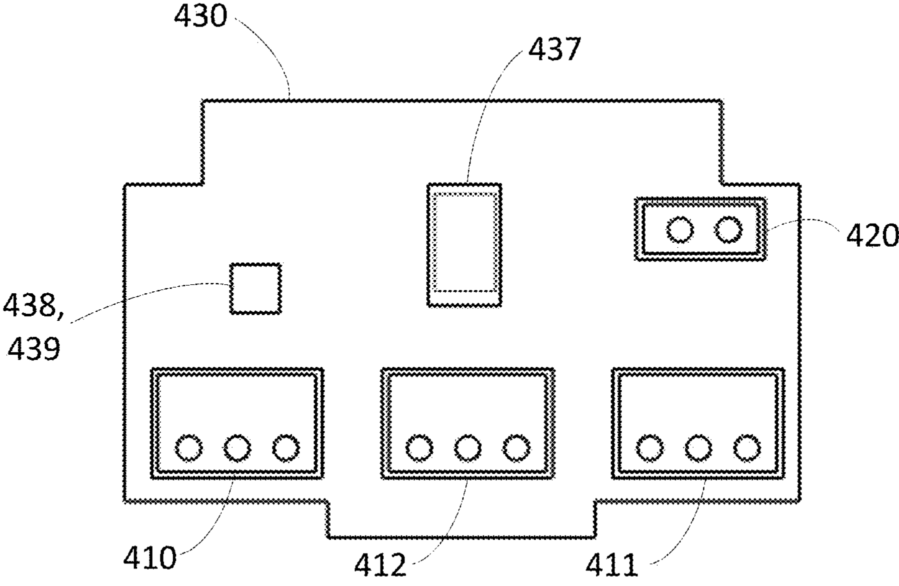
FIG. 10 depicts the bottom side of the PCB shown in FIG. 9.

FIG. 10 shows a second side of PCB 430. Vine connectors 410, 411, and 412 are mounted on this side along with optional features such as, for example, high intensity LED 437, remote indicator connector 420, and temperature sensor 438 and humidity sensor 439. In some embodiments, a single component that measures both temperature and humidity may be utilized in place of temperature sensor 438 and humidity sensor 439.

Figure 11:
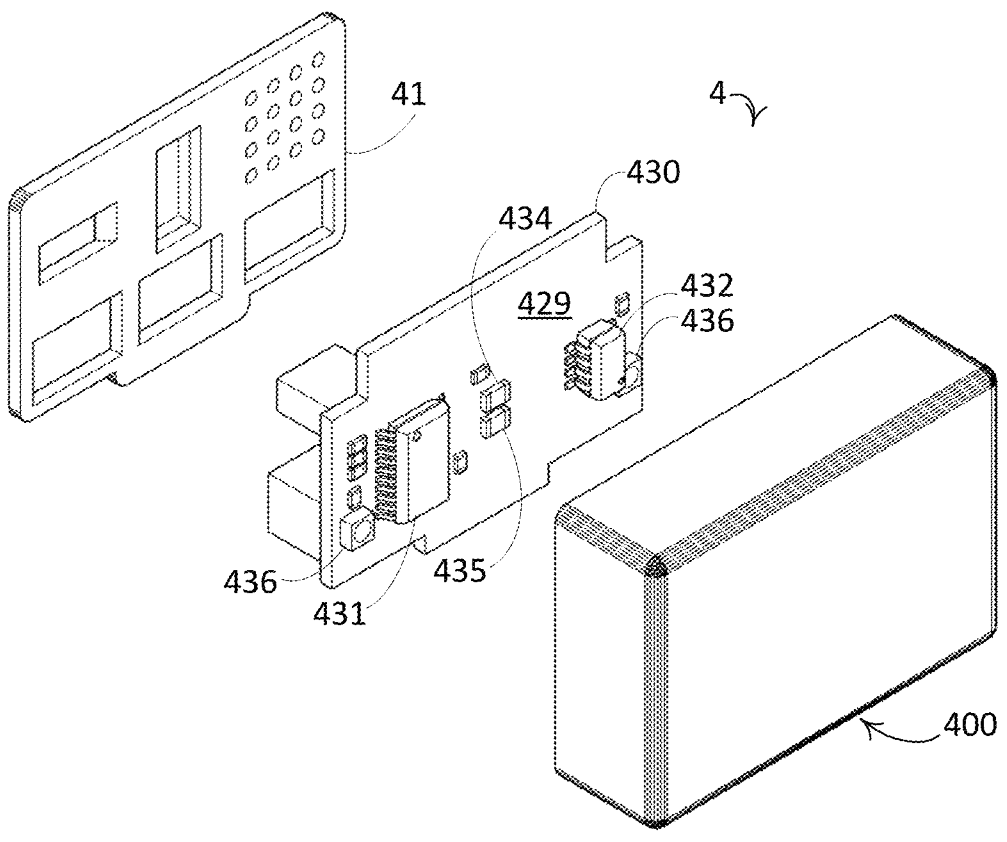
FIG. 11 depicts an exploded view of the top side of an exemplar bud sensor node assembly.

FIG. 11 shows an exploded view from the top side of a 4 bud assembly 4 that includes sensing components. Shown are the top side of the bud structure 400 primary side 429 of PCB assembly 430 and the bud housing bottom 41. Disposed on the PCB primary side 429 of PCB assembly 430 are an IR LED 434, photo transistor 435, the RGB LEDs 436, MCU 431 and voltage regulator 432.

Figure 12:
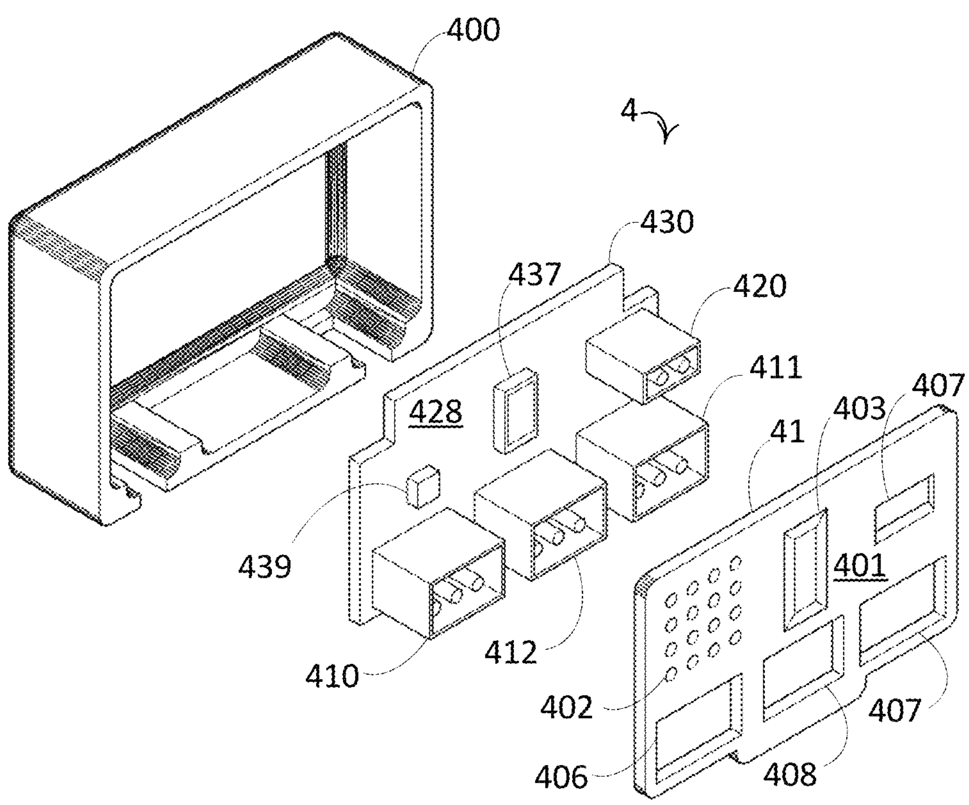
FIG. 12 depicts an exploded view of the bottom side of the bud sensor node assembly of FIG. 11.

FIG. 12 shows an exploded view from the bottom side of the bud 4 assembly 4. Shown are the inside of the bud structure 400, 40 secondary side 428 of PCB assembly 430 and the bud bottom 41. Alignment between vine connectors 410, 411, and 412 with respective openings 406, 407, and 408 is shown. Also shown are aligned external connector 420 and opening 407 and LED 437 and opening 403 for the emitted light and alignment of sensor 439 and perforations 402.

Figure 13:
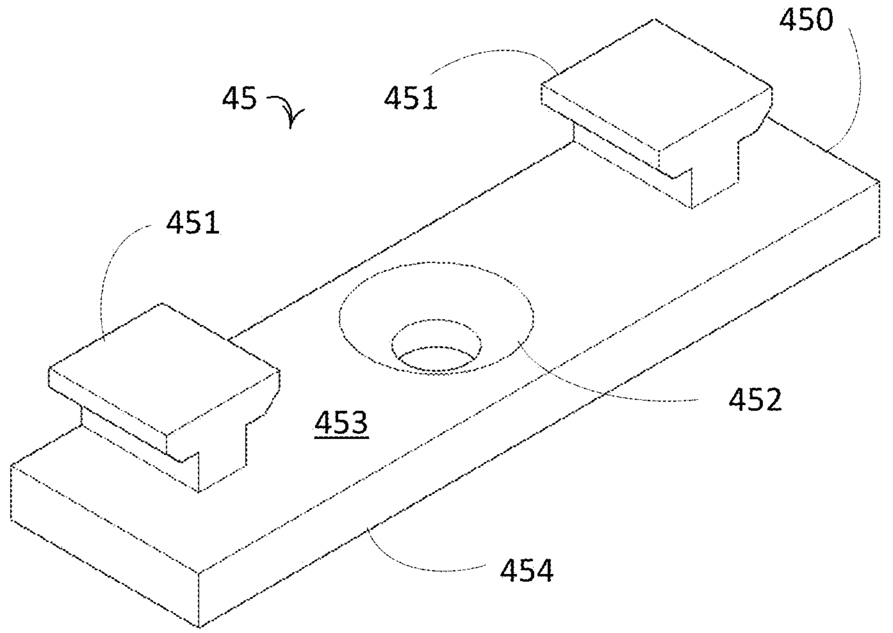
FIG. 13 depicts a typical mounting plate for a bud sensor node as may be employed in a preferred embodiment.

FIG. 13 shows an exemplary mount 45 for a bud 4. The mount 45 is comprised of a base 450 with a first major side 453 and a second major side 454. On first major side 453 there are tabs 451 that align with slots 404 in the bud housing structure 400. Mount 45 can attach to a wine rack with an adhesive applied to the second major side 454 or by using a mechanical fastener, such as a screw, using the mounting hole 452. One skilled in the art can appreciate other methods to attach mount 45 to a wine rack and further, that base 450 may be devised in a variety of configurations to accommodate different types of wine racks.

Figure 14:
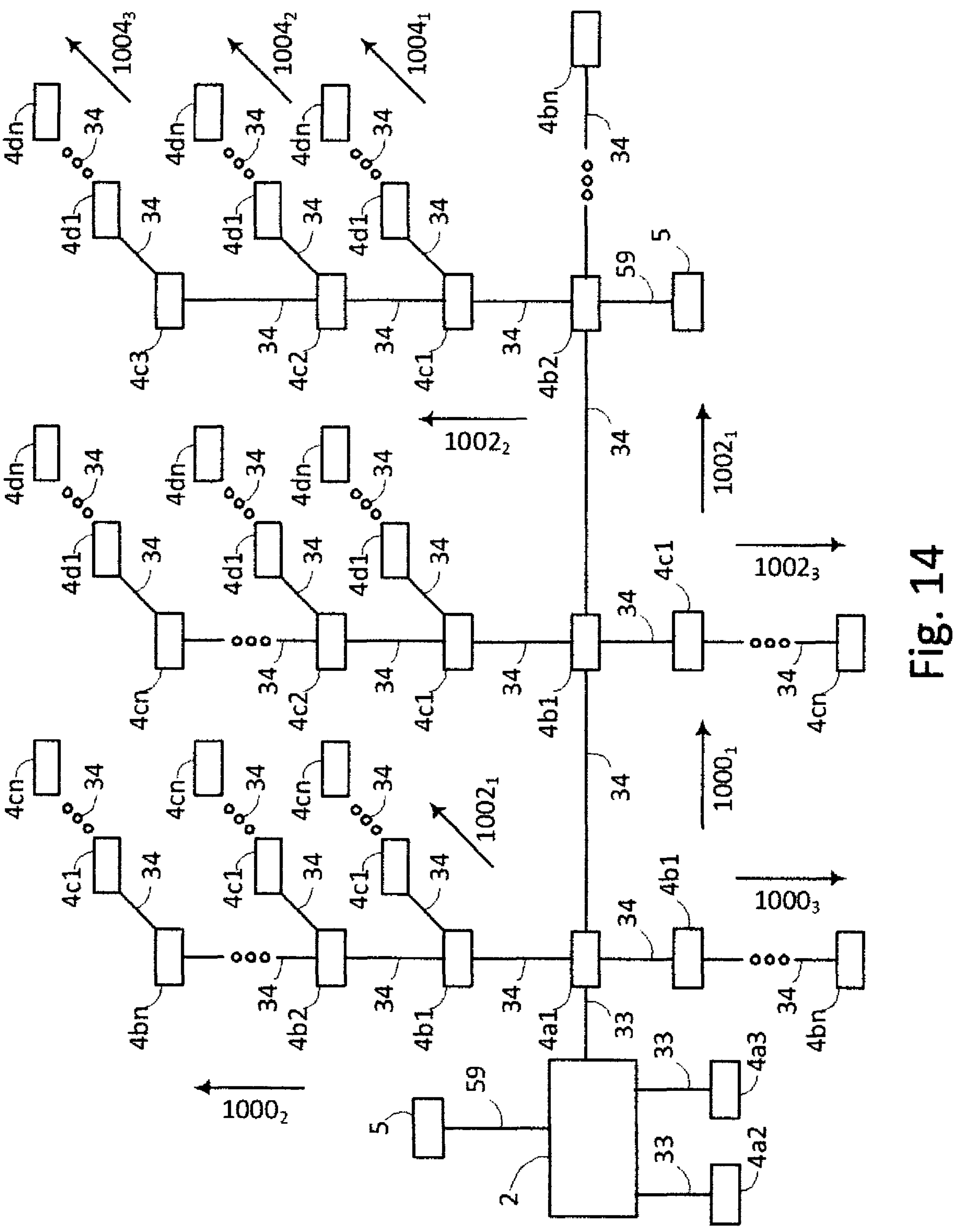
FIG. 14 depicts a block diagram of a preferred embodiment of a divergent mesh interconnect network.

FIG. 14 is a graphical depiction of an embodiment of a vine interconnect 3 implemented with a multi-dimensional divergent mesh topology. Exemplar vine 3 is comprised of multi-function buds 4 connected via combined data and power cables 34 or data only cables 33, power supplies 5, and power cables 59. After appreciating this disclosure, persons of skill will recognize that various components comprising a vine 3 in accordance with the present invention may be interconnected using wireline or wireless technologies familiar to those of skill in the art.

In the depicted embodiment of FIG. 14, root 2 is connected to a first or origin bud 4*a* with cable 33. Buds 4 may be member of one or more communication paths and the implementation shown in FIG. 14 depicts several buds 4 that are members of more than one communication path as further explained.

As shown, from origin bud identified as 4*a*1, various communication paths emanate. Multiple first or primary communication paths $\mathbf{1000}_1$, $\mathbf{1000}_2$, and $\mathbf{1000}_3$ as shown, are comprised of one or more buds 4*b*1, 4*b*2, . . . 4*bn* along with origin bud 4*a*1. Those of skill will recognize that embodiments are not limited to any particular number of primary communication paths 1000 and could be devised using only one primary communication path 1000 or many. One skilled in the art will further recognize that the number of buds 4*b* along a primary communication path 1000 of vine 3 is limited only by the number of address bits allocated. FIG. 14 also depicts origin bud 4*a*2 from which no primary communication paths emanate and it will be understood by those of skill in the art that the term "origin bud" is applied to a bud that is directly connected either by wireline or wirelessly to root 2. It should further be appreciated that an origin bud can be the origination point for one or more communication paths along which various numbers of buds may be connected in a variety of configurations.

As further shown in FIG. 14, multiple second or divergent communication paths $\mathbf{1002}_1$, $\mathbf{1002}_2$, and $\mathbf{1002}_3$ start at various second level buds 4*b* which employ not only their own primary communication path 1000 but participate in communication paths 1002. Thus, a particular 4*b* bud is a member bud of a primary communication path 1000 but is a member of a respective secondary communication path 1002 and that the respective primary communication path 1000 and secondary communication path 1002 intersect at selected ones of buds 4*b* as shown in FIG. 14. It should be recalled that FIG. 14 is a graphical representation and in a physical implementation, there is no requirement for the various paths of the present invention to diverge from each other at any particular angle and they may be implemented with wireline or wireless technologies and protocols familiar to those of skill in the art.

An exemplar secondary or divergent communication path $\mathbf{1002}_3$ such as shown near the top of FIG. 14 extending laterally across the depiction and comprised of multiple buds 4*c*1, 4*c*2, 4*c*3 to 4*cn* has diverging from various of ones of these constituent buds, tertiary communications paths $\mathbf{1004}_1$, $\mathbf{1004}_2$ and $\mathbf{1004}_3$ which diverge from respective constituent buds 4*c*1, 4*c*2 and 4*c*3, respectively. For example, a bud 4*c*1 is an origin bud for tertiary communications path $\mathbf{1004}_1$ comprised of buds 4*d*1 . . . 4*dn* and is a member of that communications path while also being a satellite bud of communications path $\mathbf{1002}_3$. One familiar with the art will recognize that the number of buds 4 on any communications path of vine 3 is limited only by the number of address bits allocated to that particular path.

As those of skill will appreciate, a primary communications path 1000 may be comprised of buds 4*b* and may represent the hierarchal level of a wine rack, while a secondary or divergent communications path 1002 may be comprised of various buds 4*c*1, 4*c*2 . . . 4*cn* corresponding to the hierarchal level of a shelf in a rack. A tertiary communications path 1004 may be comprised of buds 4*d*1 . . . 4*dn* and correspond to the individual socket level of a subject wine storage facility. This is exemplar of an instantiation of an embodiment in the context of a wine storage system.

Figure 15:
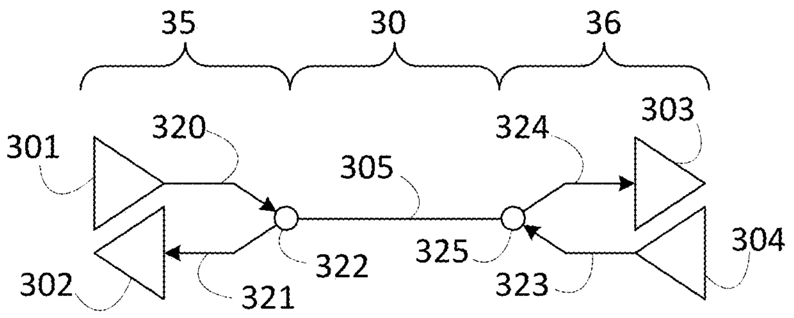
FIG. 15 depicts a half-duplex signaling circuit.

FIG. 15 depicts a simplified version of a half-duplex signaling circuit useable in an embodiment of a vine 3. The circuit may conveniently be allocated into a first or upstream side 35, a second or downstream side 36 and an interconnect link 30. When upstream side 35 is transmitting, output cell 301 drives a signal onto output connection 320. Output connection 320 connects to the input connection 321 for receiver 302 and interconnect link 305 at point 322. At the downstream end, interconnect 305 connects to receiver connection 324 and the transmitter connection 323 at point 325. One familiar with the art will appreciate that connection 325 of link 305, input connection 323 and output connection 323 and connection point 322 of link 305, output connection 320 may be at a single point or at different locations on the net.

Figure 16:
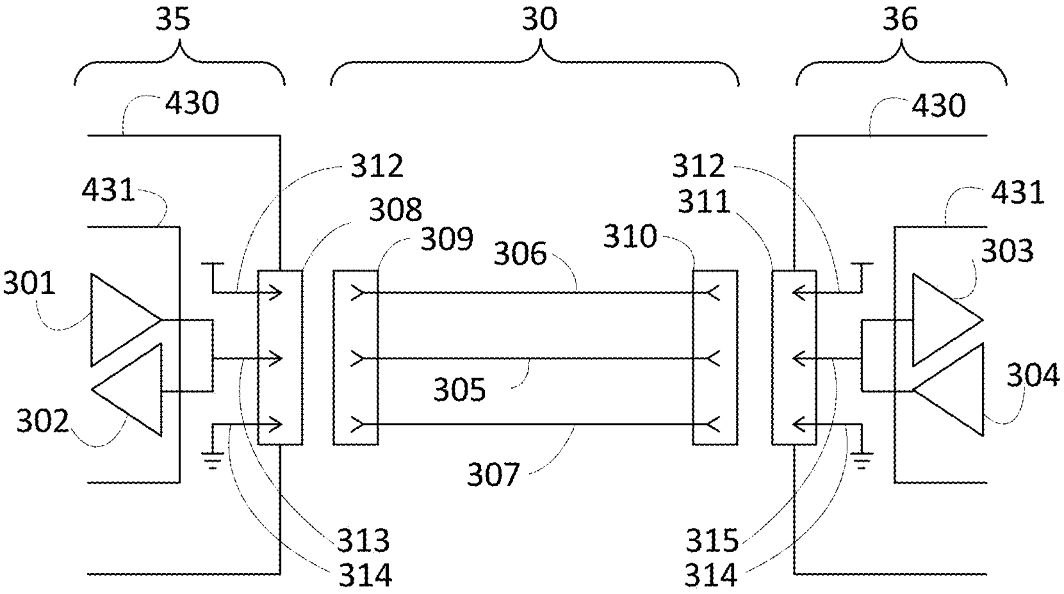
FIG. 16 depicts a preferred embodiment of a half-duplex circuit as employed in an embodiment of a vine interconnect as may be employed in a preferred embodiment of the present invention.

FIG. 16 depicts an embodiment of the half duplex circuit of FIG. 15. In upstream side 35 there is a microcontroller 431 internal to which there is an IO cell configured as an output 301 and an IO cell configured as an input 302. Externally to the MCU 431 input IO cell 302 and output cell 301 are connected together to create a bidirectional interface. One experienced in the art will recognize that a MCU 431 with a bidirectional IO cell could be used in place of the individual input 302 and output 301 IO cells. The bidirectional interface is connected to the signal pin 313 of the fixed connector 312 on the module 430.

Downstream side 36 is implemented in a module 430 with a fixed connector 311 and a MCU 431. MCU 431 also has a bidirectional IO link comprised of a receiver 304 and transmitter 303 connected to signal pin 315.

Cable 30 connects upstream bud 35 with the downstream bud 36. Cable 30 is comprised of a free connector 309 that plugs into upstream fixed connector 308, A free connector 310 plugs into downstream fixed connector 311, a power wire 306, a ground wire 307, and a signal wire 305.

Figure 17:
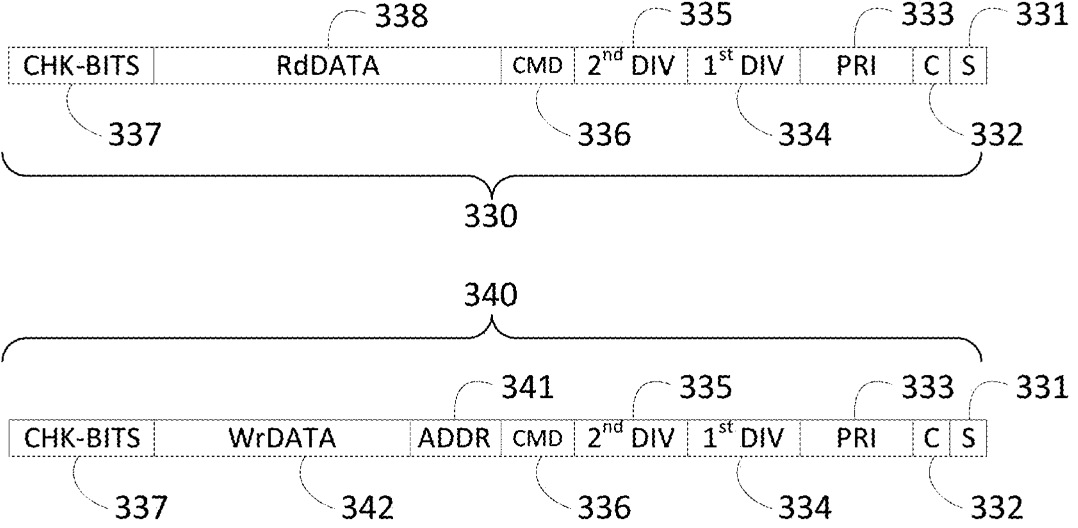
FIG. 17 depicts exemplar internode message packets.

FIG. 17 depicts exemplar message packets as may be employed in embodiments of the present invention. Read packet 330 is comprised of a start bit 331, a credit bit 332, an address corresponding to an address on a primary path 1000, 333, an address corresponding to an address on a secondary or divergent path 1002, a tertiary path 1004 address 335, a command field 336 read data 338, and check bits 337.

Write packet 340 uses the same flow control as the read packet 330. In place of the read data there is a register address field 341 and data 342 to write to the selected register address 341 thus indicating the status of a selected socket or container in a wine rack or facility.

Figure 18:
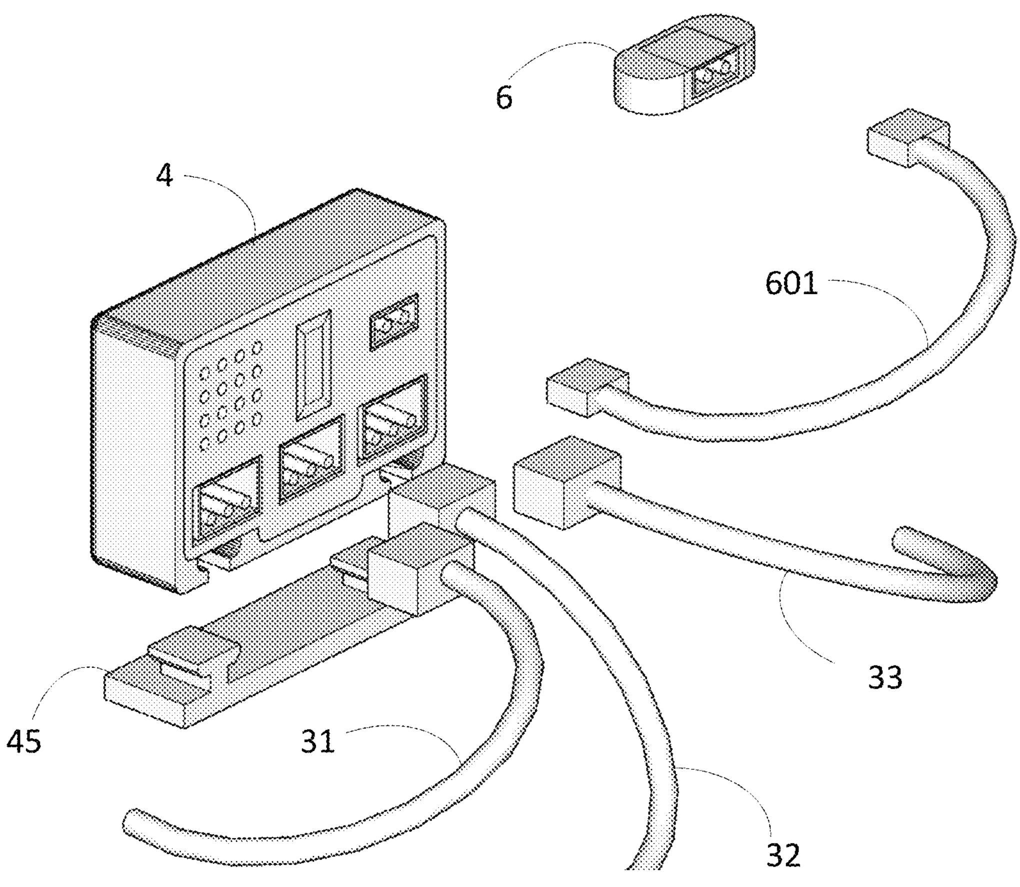
FIG. 18 depicts an exploded view of certain components of a multi-function bud or bud assembly along with optional attachments.

FIG. 18 shows an exploded isometric view of an exemplar bud 4, with a base 45, an external indicator 6, external indicator cable 601, root input cable 31 and downstream cable path connectors 32 and 33.

Figure 19:
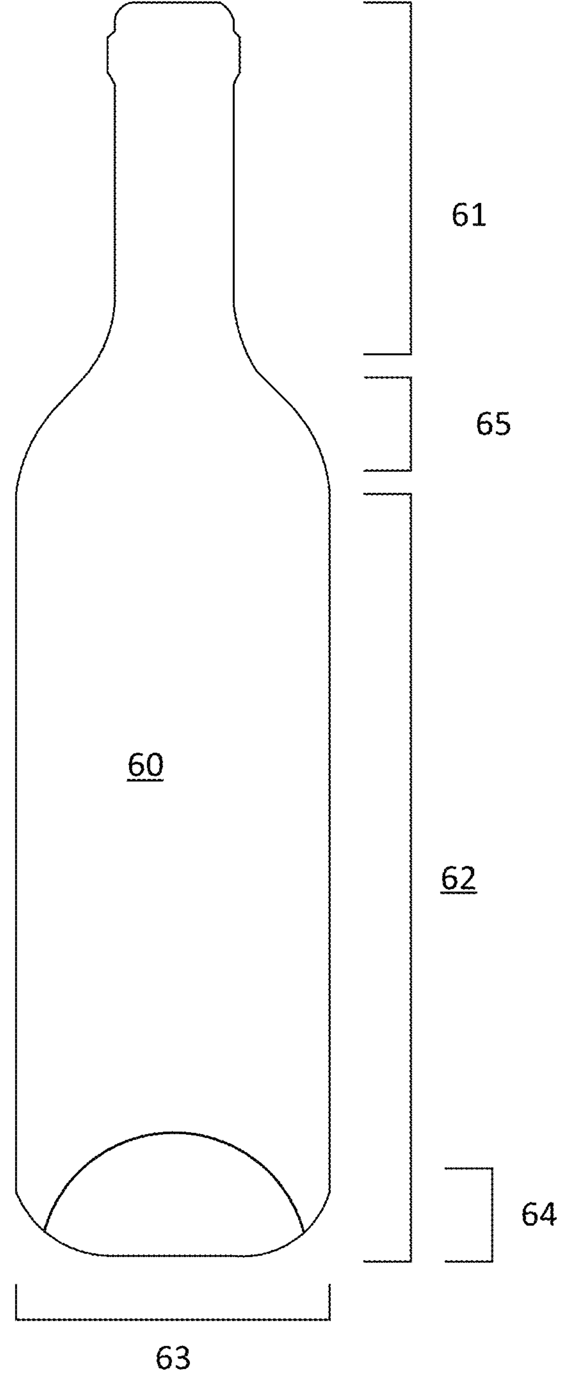
FIG. 19 depicts an exemplary wine bottle with identification of various portions of said bottle.

FIG. 19 depicts an exemplary wine bottle 60. Identified portions of interest are neck 61, body 62, base 63 and the punt 64.

Figure 20:
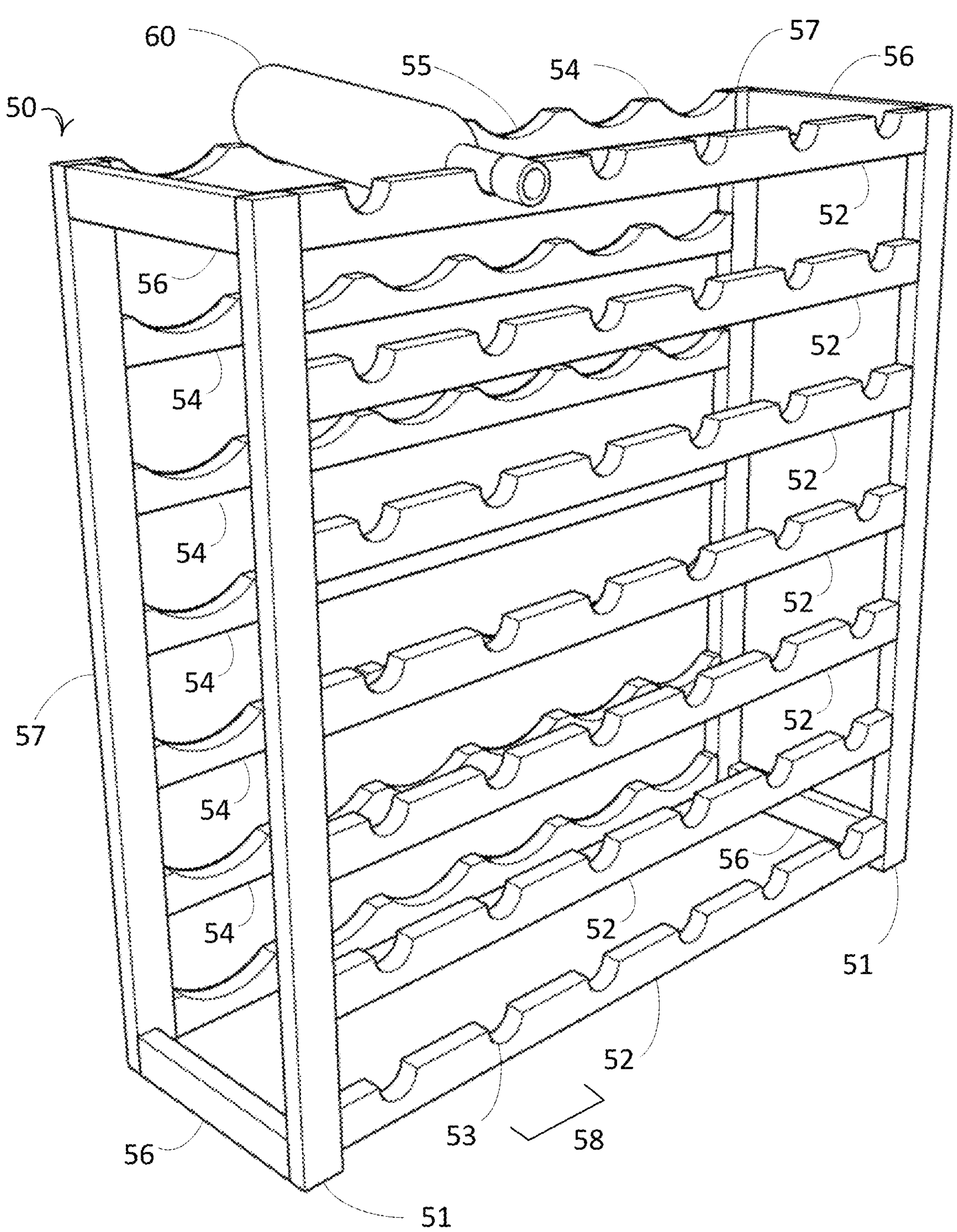
FIG. 20 depicts an exemplary wooden wine rack from the bottle neck side.

FIG. 20 depicts an exemplary unrefrigerated rail and stile wine rack 50 viewed from the neck side of bottle 60. Rack 50 is comprised of front upright stiles 51, multiple first rails 52 that have notches 53 cut in the upper surface that accommodate the neck 61 of a wine bottle 60, and a rear upright stile 57, multiple second rails 54 with notches 55 cut in its upper surface to accommodate the base 63 of a wine bottle 60. Horizontal spacers 56 connect the front stiles 51 and rear stiles 57 at an appropriate distance to hold the bottles in the size or sizes for which rack 50 is designed. Neck notch 53 and base notch 55 together form a socket 58 for bottle 60.

Figure 21:
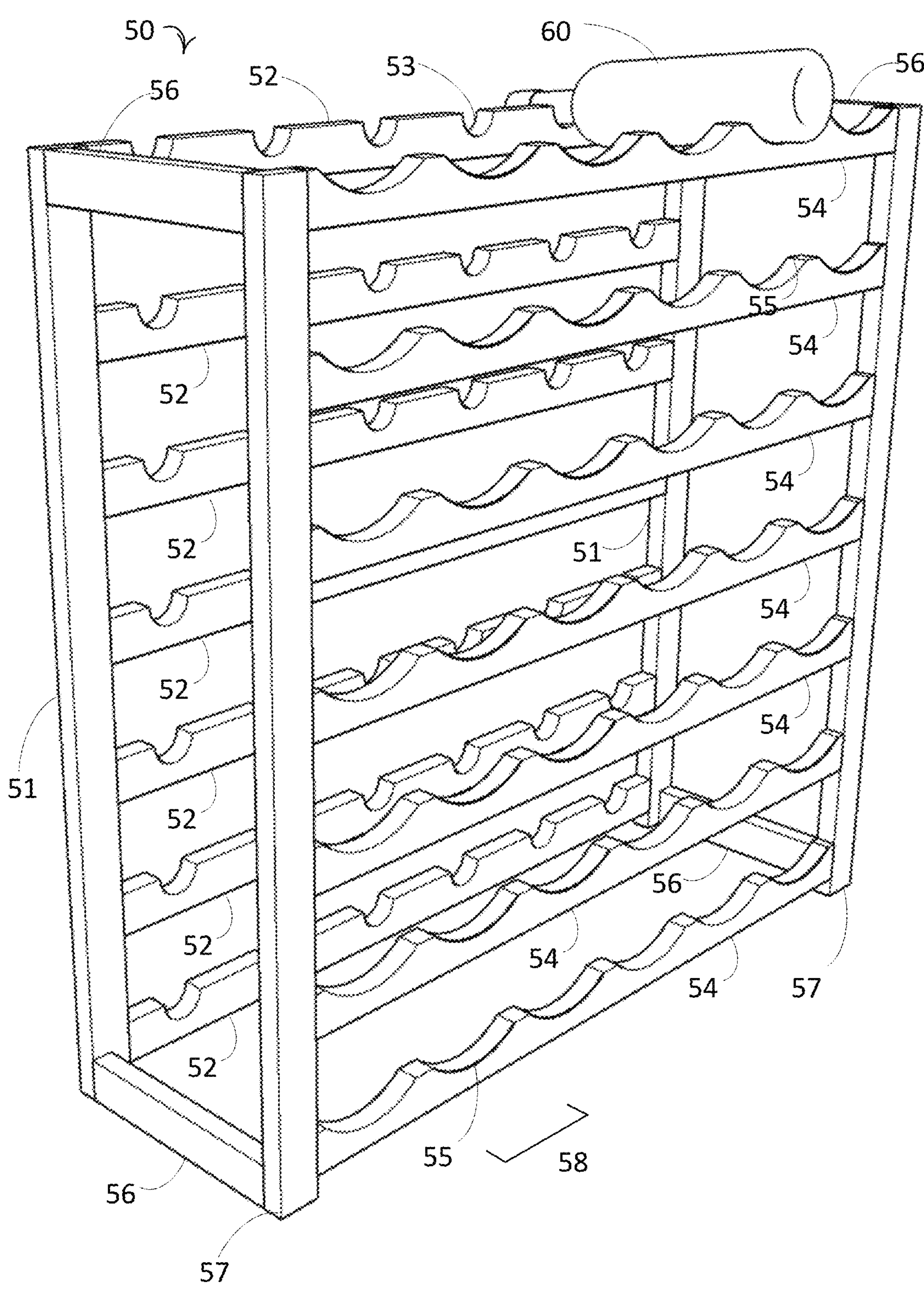
FIG. 21 depicts an exemplary wooden wine rack from the bottle base side.

FIG. 21 show a view of wine rack 50 of FIG. 20 viewed from the base side of bottle 60.

Figure 22:
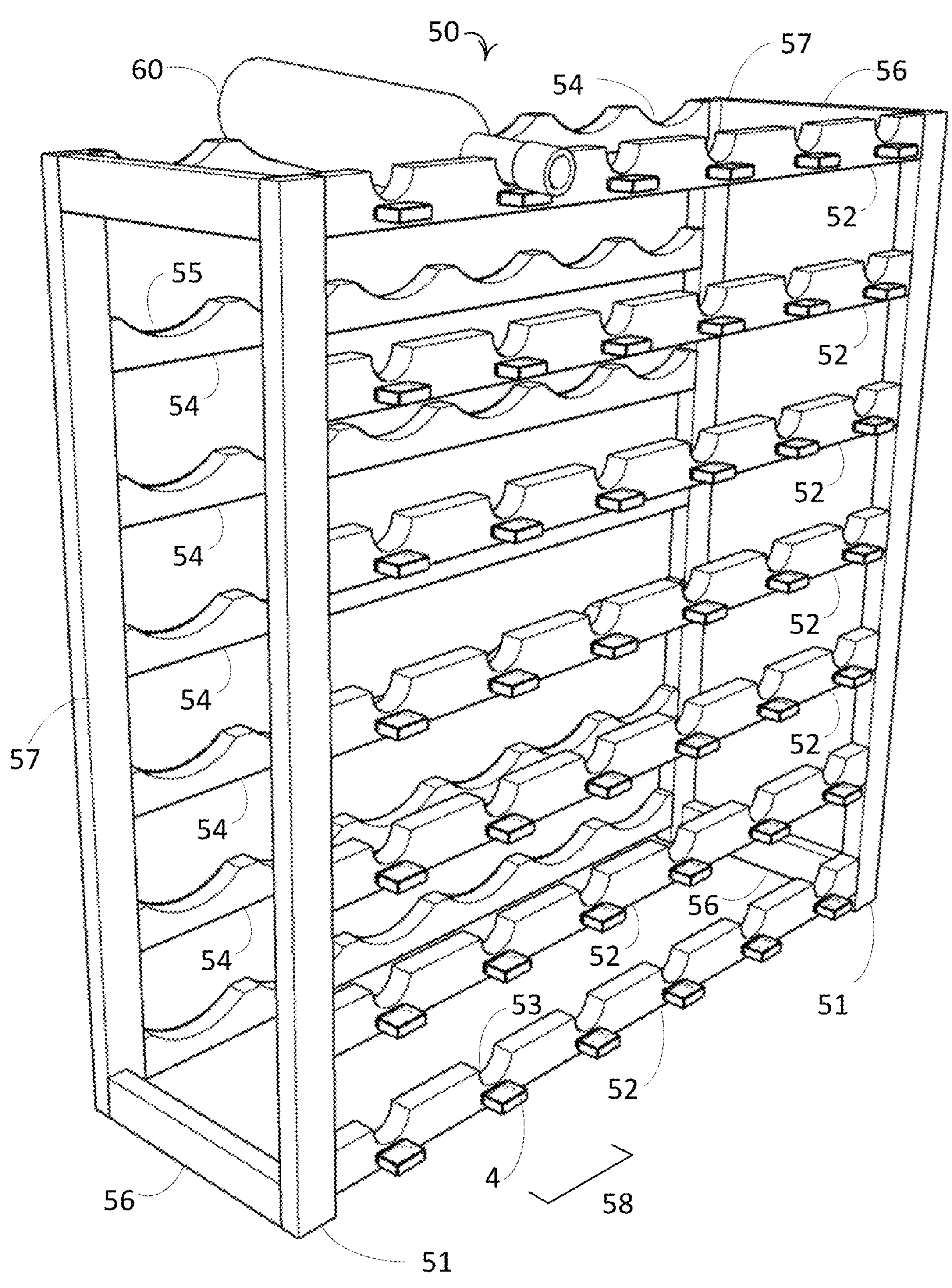
FIG. 22 depicts an exemplary wooden wine rack from the bottle neck side which rack is mounted with exemplar buds as may be employed in a preferred embodiment of the present invention.

FIG. 22 shows wine rack 50 of FIG. 20 with buds 4 mounted on neck rail 52. There is one bud 4 mounted under notch 53 in rail 52 for reception of the neck of wine bottle 60.

Figure 23:
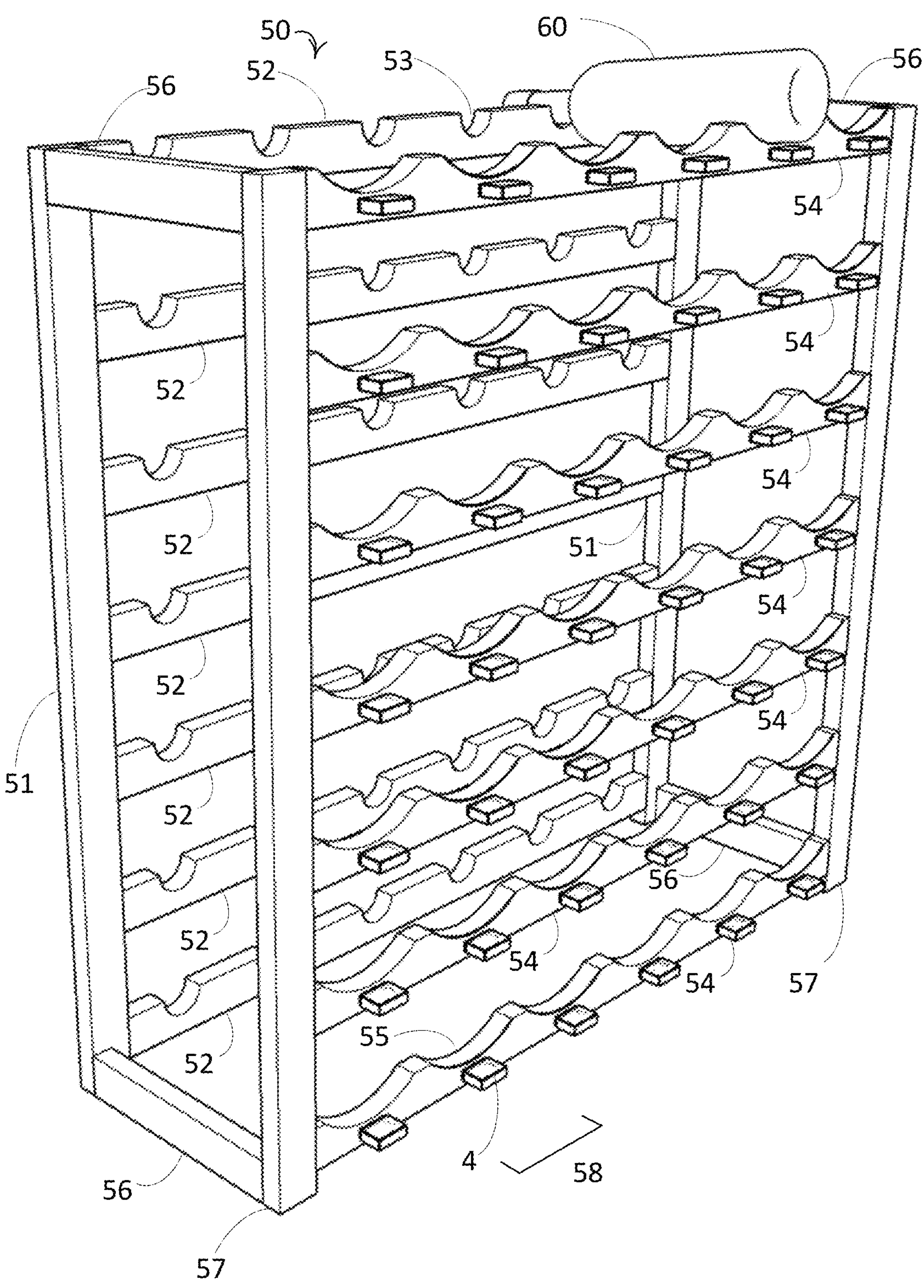
FIG. 23 depicts the exemplary wooden wine rack of FIG. 22 from the bottle base side showing an alternative disposition of a bud assembly for sensing the presence of a bottle in a socket with which the sensor is associated.

FIG. 23 shows the wine rack 50 with the buds 4 mounted onbase rail 54. There is one bud 4 mounted under the notch 55 in rail 54 that forms part of the socket 58 that receives wine bottle 60.

Figure 24:
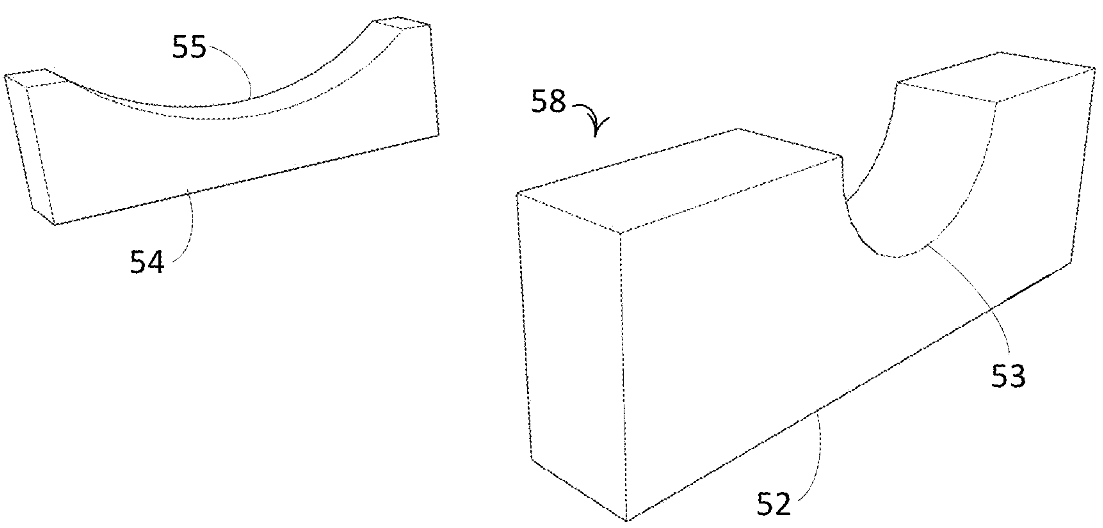
FIG. 24 depicts a single socket of the wooden rack of FIG. 22 viewed from the neck side.

FIG. 24 shows a socket 58 from wine rack 50. of Notch 53 in neck rail 52 and wider notch 55 are devised in base rail 54 to create an exemplar socket 58 for reception of a bottle 60. It is the status of the socket 58 whether empty or populated by a bottle that is sensed by the respective bud 4 adjacent or proximal to socket 58.

Figure 25:
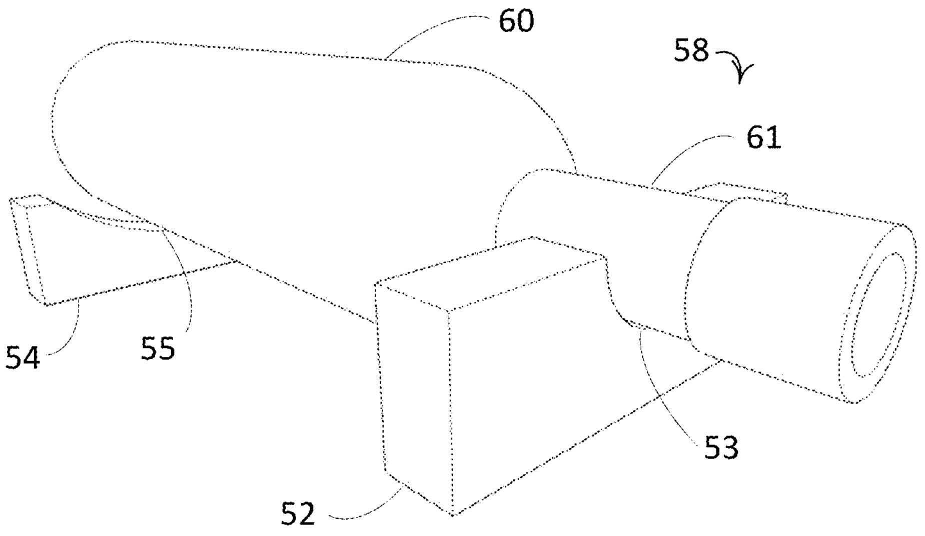
FIG. 25 depicts the single socket depicted in FIG. 24 populated with a wine bottle.

FIG. 25 depicts exemplar socket 58 that is populated with a bottle 60.

Figure 26:
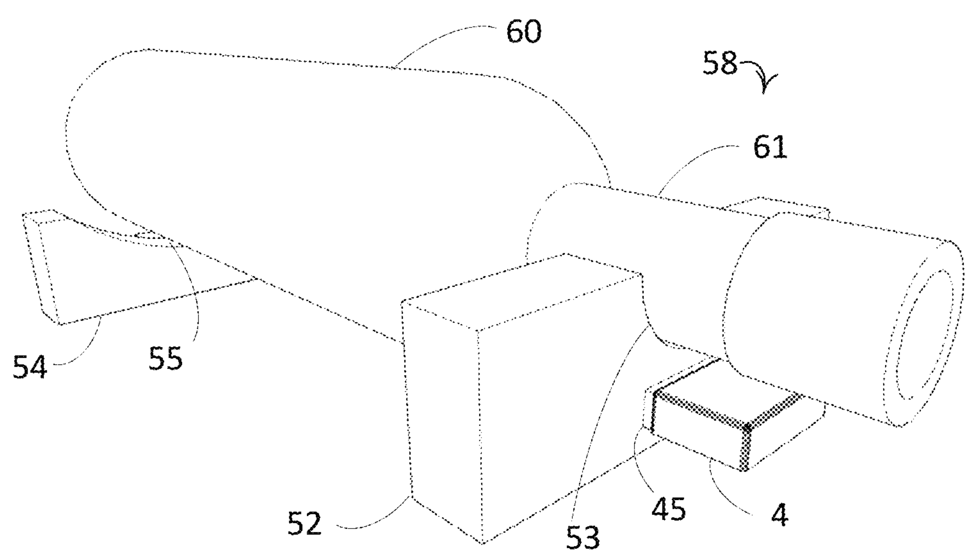
FIG. 26 depicts the single socket of FIG. 24 with a sensor node mounted so as to be proximal to the neck of a bottle that populates the socket.

FIG. 26 depicts socket 58 of FIG. 24 populated with bottle 60 disposed so as to cradle neck 61 in notch 53. Bud 4 is disposed with mount 45 on rail 52 proximal to neck-receptive notch 53 of bottle 60. Bud 4 is placed adjacent to notch 53 at a disposition conducive to triggering sensor 46 of bud 4 by the presence of bottle 60 in socket 58 and thus causing bud 4 to communicate the status of that associated socket to root 2.

Figure 27:
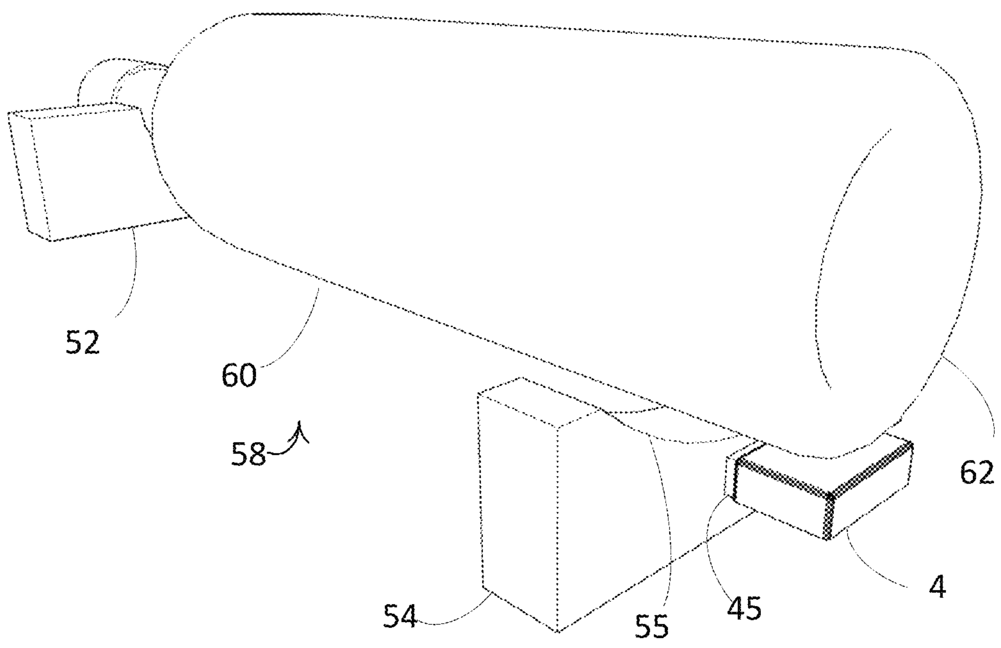
FIG. 27 depicts a single socket of a wine rack viewed from the base side with a bud mounted so as to be proximal to the base of a bottle that populates the socket.

FIG. 27 shows bottle 60 and socket 58 of FIG. 24 with a bud 4 on a mount 45 attached to rail 54 adjacent to notch 55 that cradles base 62 of bottle 60 to allow bud 4 to sense that the status of socket 58 status is "occupied" or "populated.".

Figure 28:
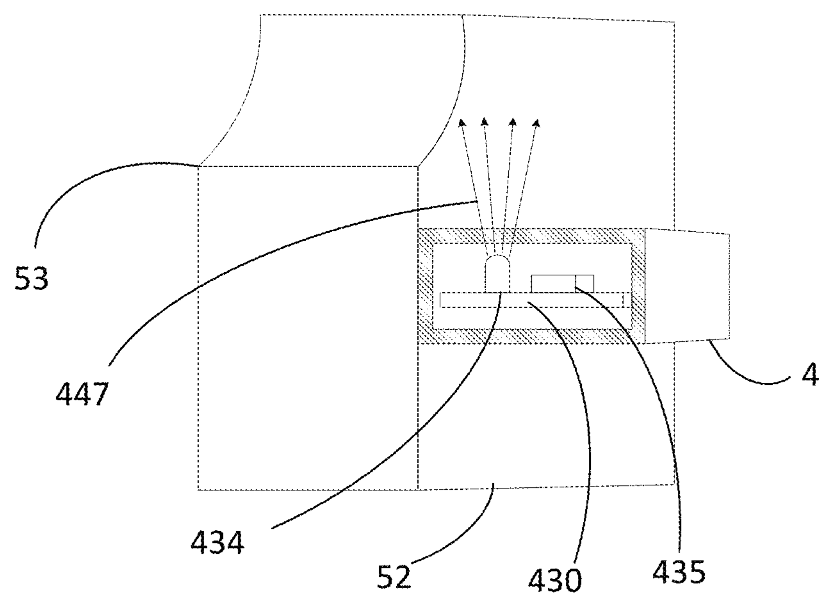
FIG. 28 depicts a cross section of an exemplar multi-function bud in an empty socket.

FIG. 28 is a cross-sectional depiction through neck notch 53 of rail 52 and bud 4 mounted adjacent to rail 52. PCB assembly 430 inside bud 4 is exposed and, more specifically, IR transmitter 434 and photo transistor 435 that comprise exemplar proximity sensor 46. IR light beam 447 is shown to emanate from IR LED 434.

Figure 29:
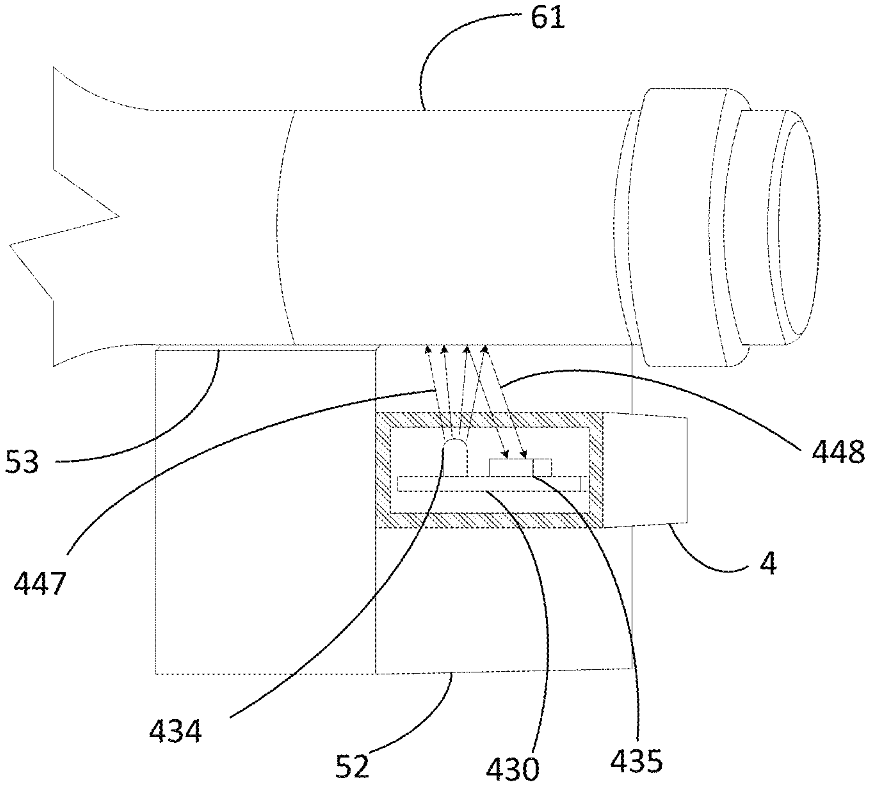
FIG. 29 depicts a cross section of a multi-function bud adjacent to the neck of a bottle populating a socket.

FIG. 29 is a cross-sectional view of bud 4 mounted on rail 52 and shows a portion 448 of beam 447 being reflected back to photo transistor 435 by bottle neck 61.

Figure 30:
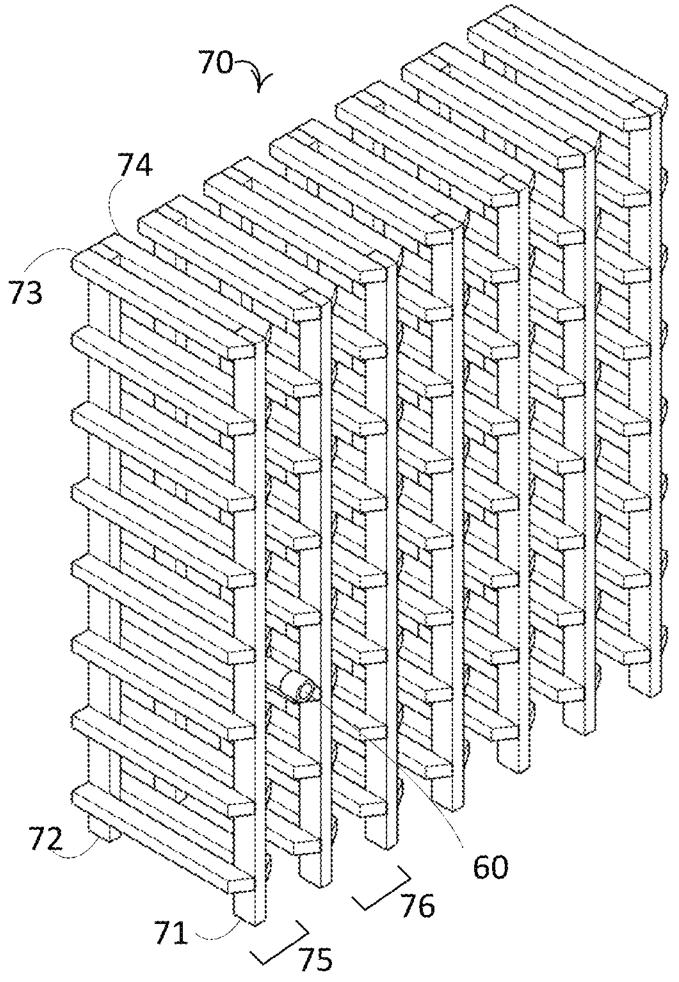
FIG. 30 depicts an isometric view of a column type wood wine rack.

FIG. 30 depicts an exemplary column style wine rack 70. Column style wine rack 70 is comprised of multiple assemblies 75. The assemblies 75 are comprised of a front stile 71, a rear stile 72 multiple right rails 73, and multiple left rails 74. The multiple right rails 73 and multiple left rails 74 are connected from the front stile 71 to the rear stile 72. The instantiations of right rails 73 and left rails 74 are spaced apart on the front stile 71, 72 further than the diameter of the wine bottle 60 they are designed to hold. Multiple column assemblies 75 are placed side by side and rails 73, 74 are spaced to hold a wine bottle 60.

Figure 31:
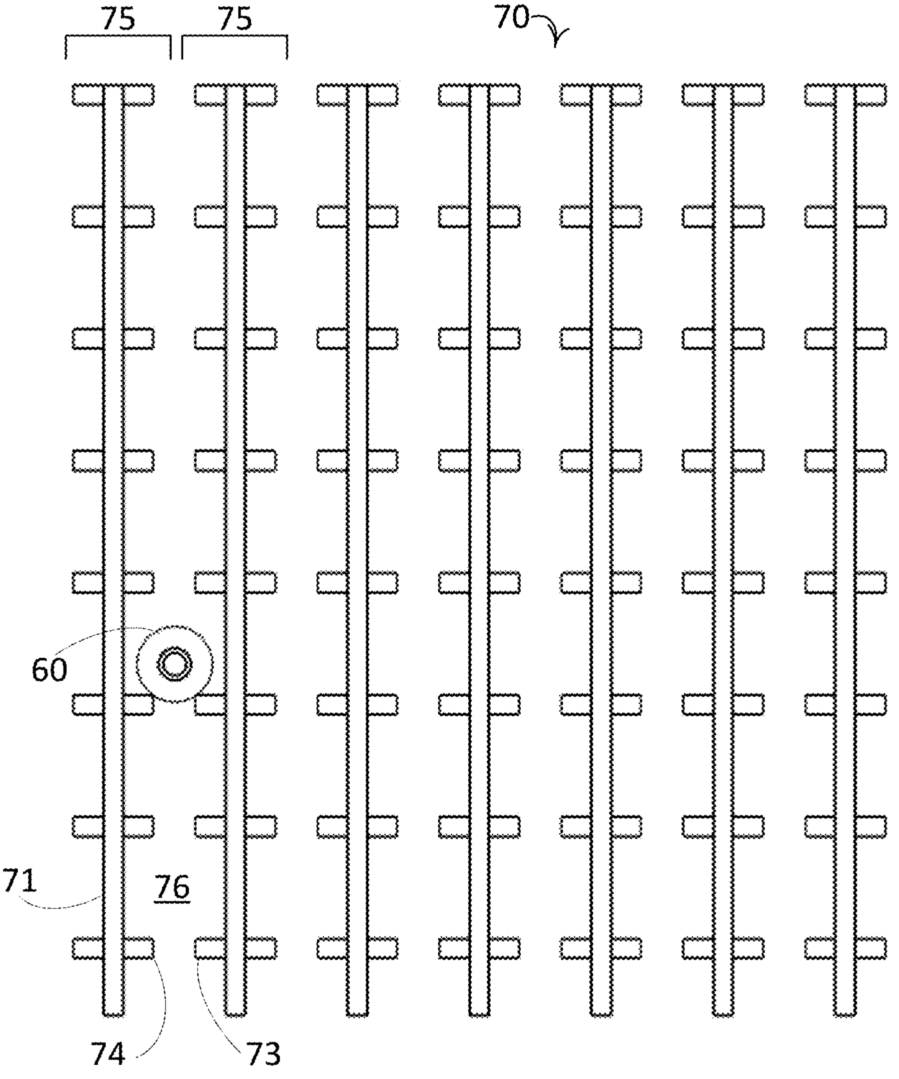
FIG. 31 depicts a front view of a column type wood wine rack.

FIG. 31 is a front view of the exemplary column wine rack 70 of FIG. 30. The space between two column assemblies 75 and between the right rail 73 of a first assembly 74 and the left rail of a second column assembly 74 form a socket 76 that holds a wine bottle 60.

Figure 32:
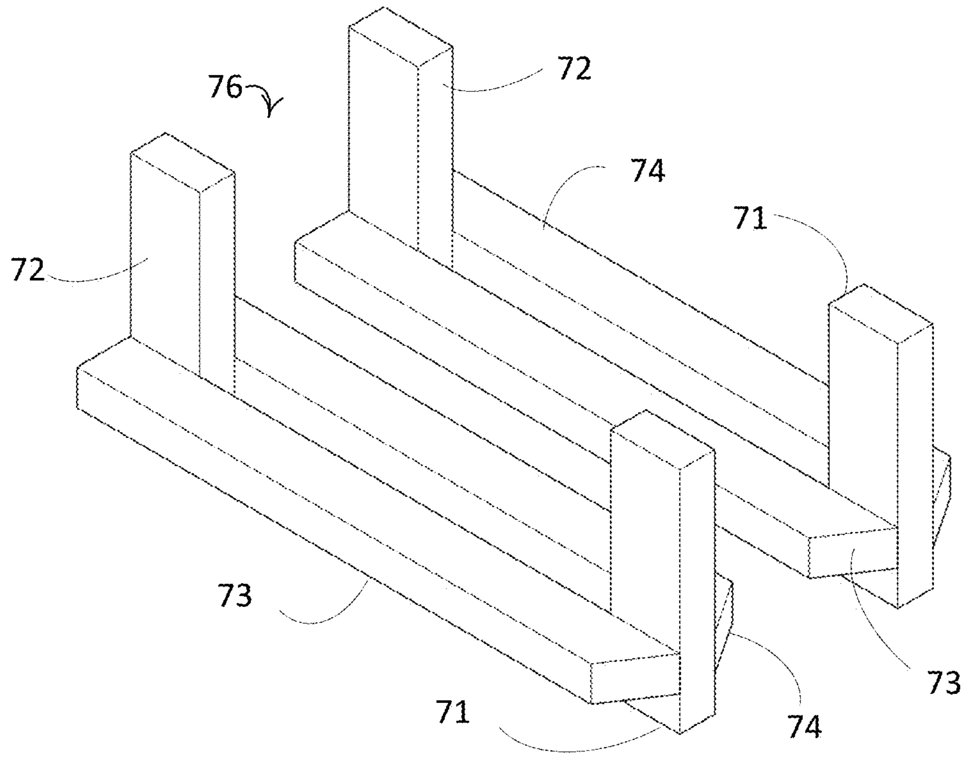
FIG. 32 depicts an isometric view of a single socket of a column type wine rack.

FIG. 32 shows a single socket 76 from a column wine rack 70

Figure 33:
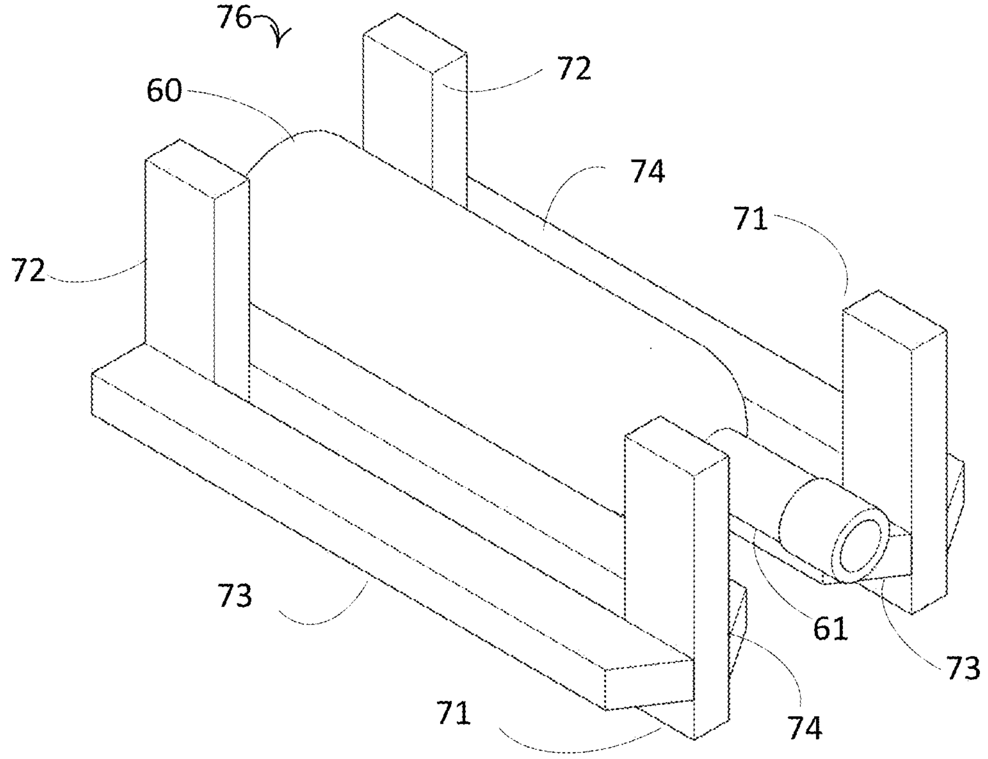
FIG. 33 depicts an isometric view of a bottle-populated single socket of a column type wine rack.

FIG. 33 shows socket 76 of FIG. 32 populated with wine bottle 60.

Figure 34:
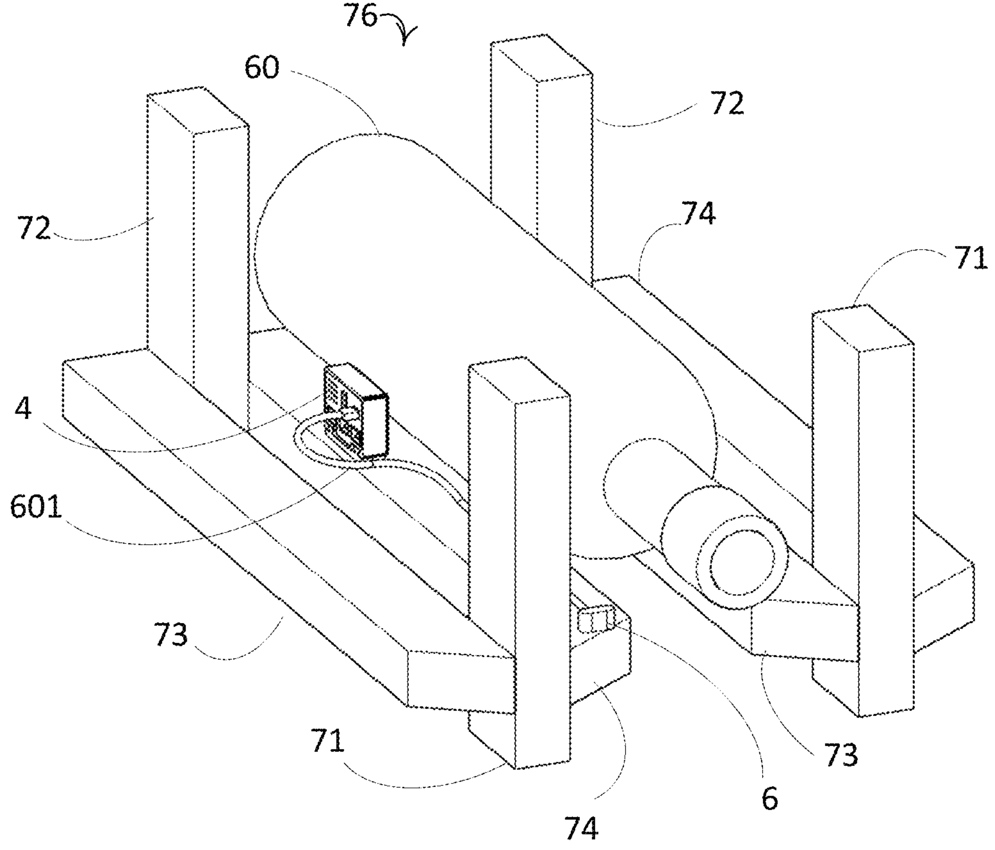
FIG. 34 depicts an isometric view of a single socket of a column type wine rack with a bud proximal to the body of the wine bottle residing in the socket.

In FIG. 34, bud 4 has been mounted on the left rail 74 and disposed so that it is able to detect the status of socket 76 by sensing the presence of bottle 60 in socket 76. A remote indicator 6 is used and placed where it is observable to provide socket status signals as to the presence or absence of bottle 60 in socket 76. Such socket status signals may also be conveyed to root 2. External indicator 6 is connected to the bud 4 by a cable 601 that plugs into external connector 408 of bud 4.

Figure 35:
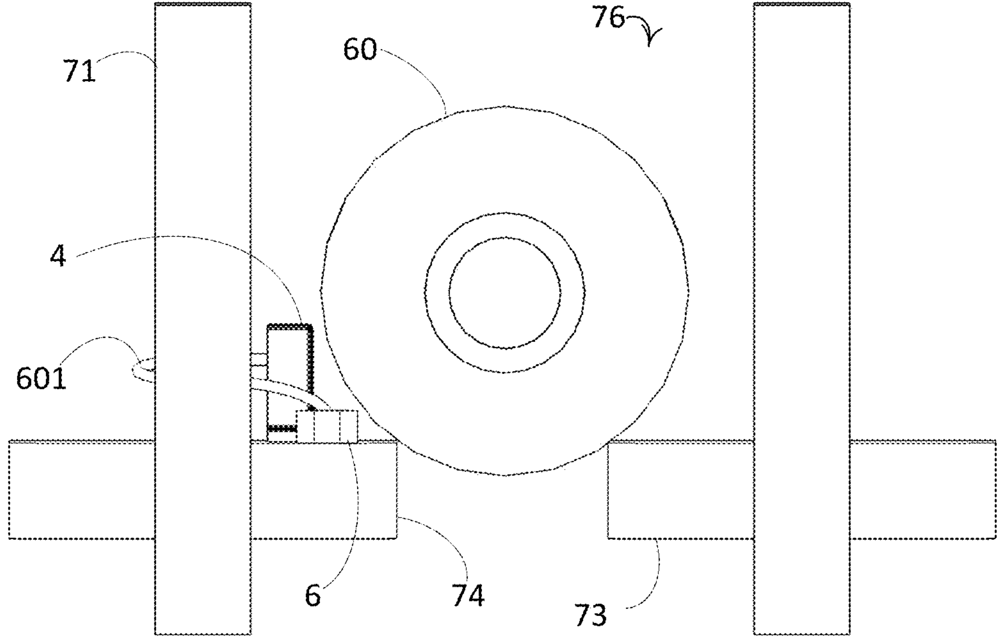
FIG. 35 depicts a front view of a single socket of a column type wine rack with a bud.

FIG. 35 depicts a front view of socket 76 of FIG. 34. Status indicator 6 can be seen on the top of the left rail 74 at the front of the socket 76.

Figure 36:
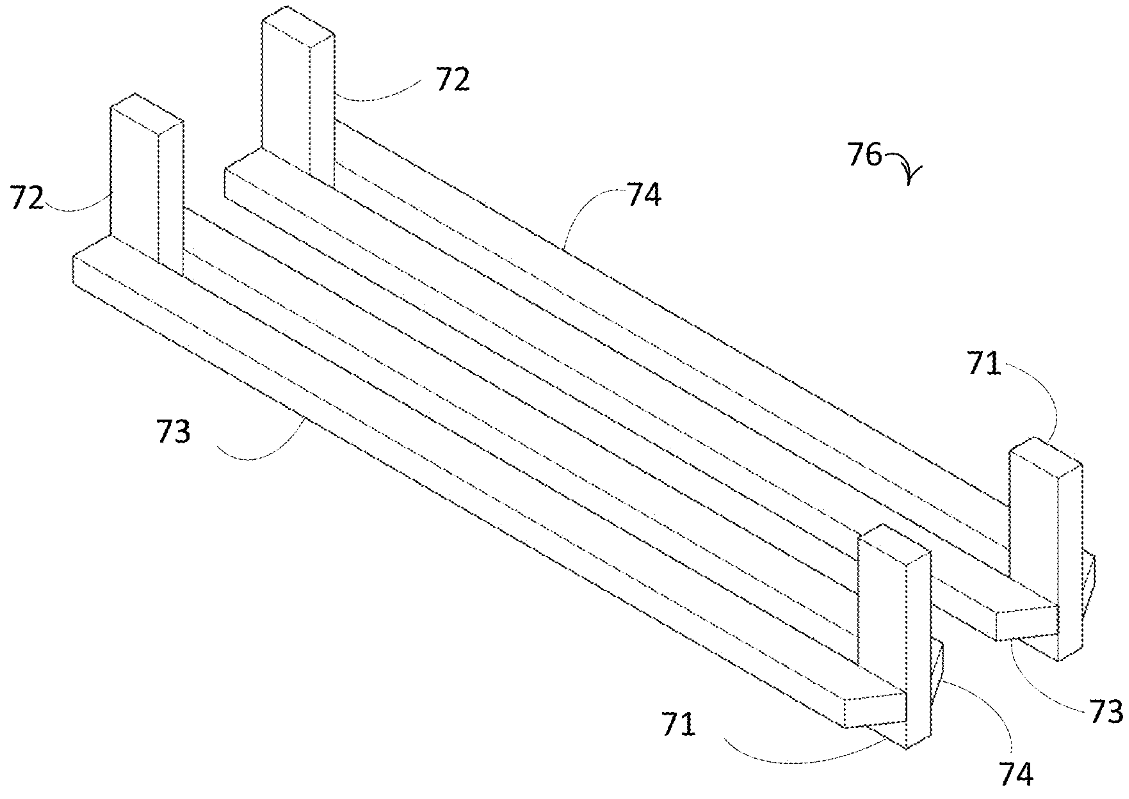
FIG. 36 depicts an isometric view of a double depth single socket of a column type wine rack.

FIG. 36 depicts a variation of an exemplary column wine rack. The right rail 73 and left rail 74 are approximately twice the length and the resulting socket 76 is deeper.

Figure 37:
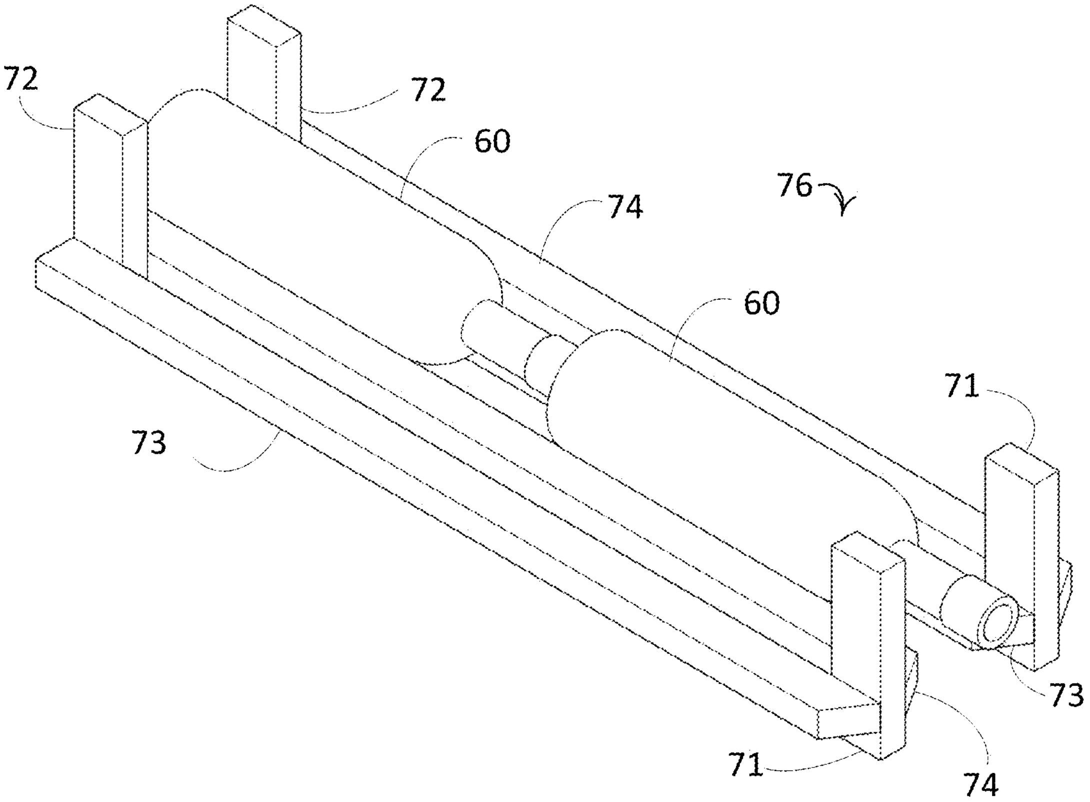
FIG. 37 depicts an isometric view of a double depth single socket populated with two bottles in a column type wine rack.
Figure 40:
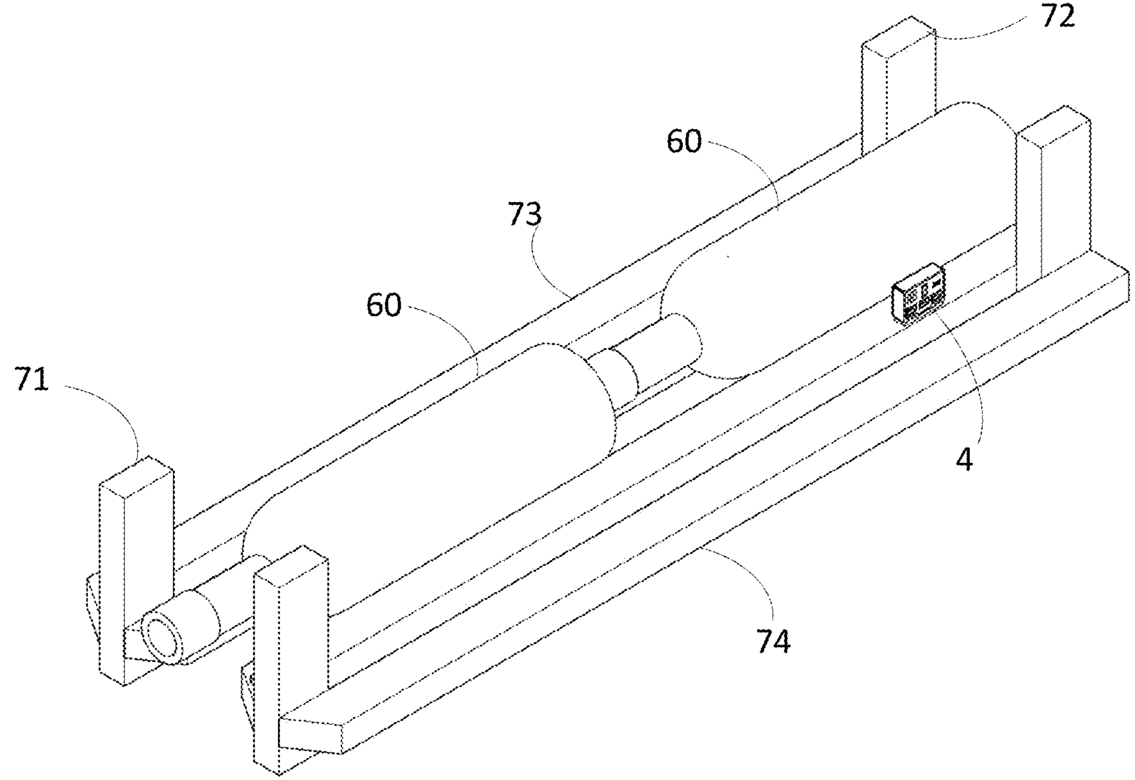
FIG. 40 depicts another isometric view of a double deep single socket of a column type wine rack with bottles.

FIG. 37 depicts the deeper socket 76 of FIG. 40 with two bottles 60 in tandem.

Figure 38:
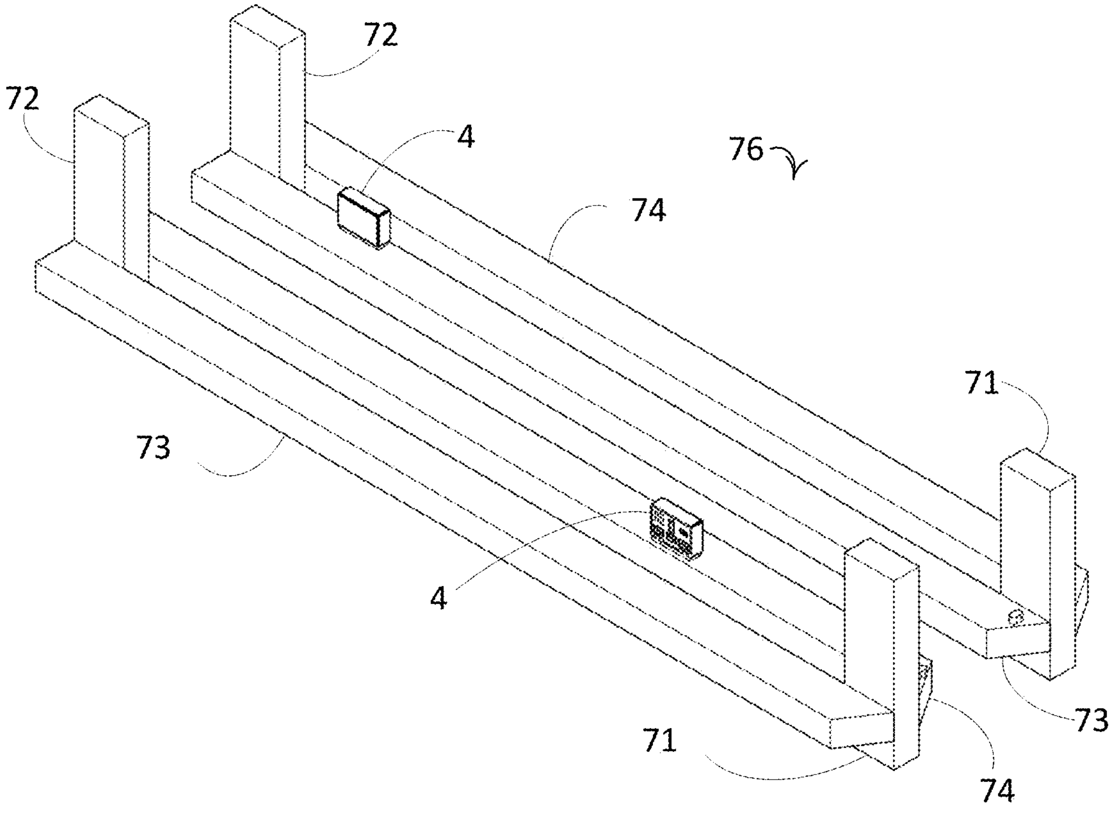
FIG. 38 depicts an isometric view of a double depth single socket of a column type wine rack with two exemplar buds.

FIG. 38 depicts deeper socket 76 fitted with two buds 4 for detection of the presence of bottles in socket 76.

Figure 39:
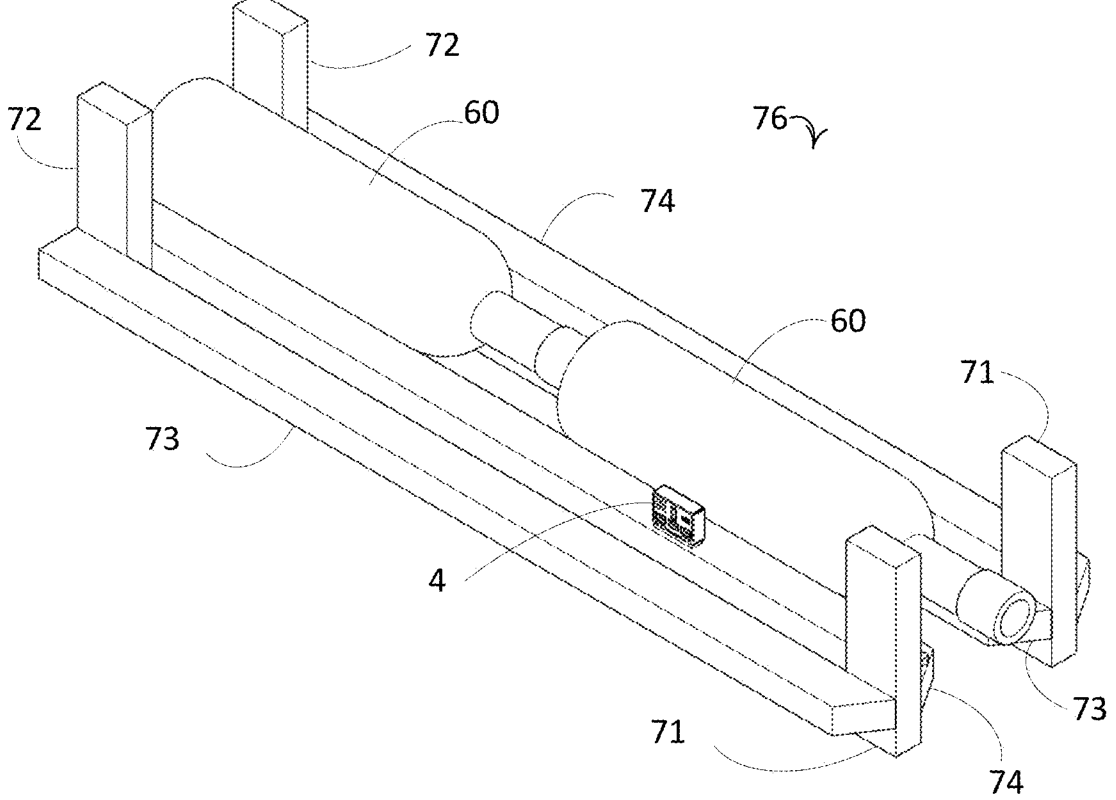
FIG. 39 depicts an isometric view of an exemplar double deep single socket of a column type wine rack populated with two bottles and having two buds, one of which cannot be seen in this depiction.

FIGS. 39 and 40 show bud 4 placed so as to be configured to sense the presence of a first bottle 60 in double-depth socket 76.

Figure 41:
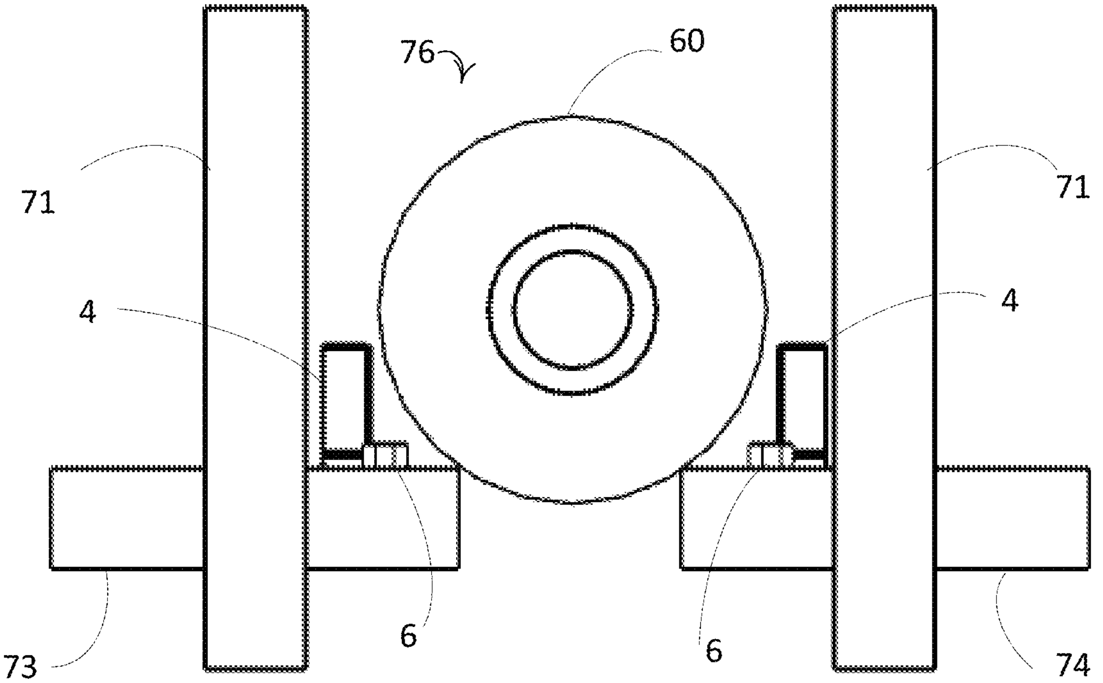
FIG. 41 depicts a front view of a double deep single socket of a column type wine rack with multi-function buds.

FIG. 41 depicts double-depth socket 76 fitted with two buds 4 with respective indicators 6 to provide readily accessible status signals that convey information related to the presence or absence of one or both bottles 60 for which socket 76 is configured.

Figure 42:
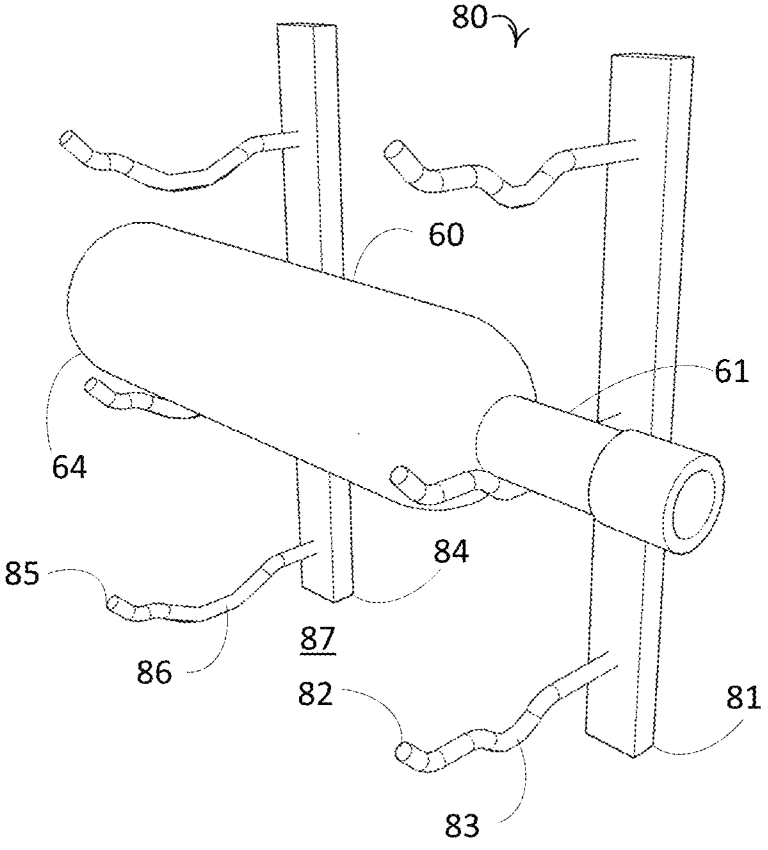
FIG. 42 depicts an isometric view of an exemplary wire type wine rack.

FIG. 42 shows an exemplar bent wire wine rack 80. Wine rack 80 has a neck stile 81 and a base stile 84. Neck stile 81 has one or more bent wires 82 protruding from stile 81 which form a notch 83 for reception of bottle neck 61. Base stile 84 has one or more bent wires 85 protruding from stile 84. The bends in the wire 85 form notch 86 for reception of either the base 62 or body of bottle 60. bottle base 62.

Figure 43:
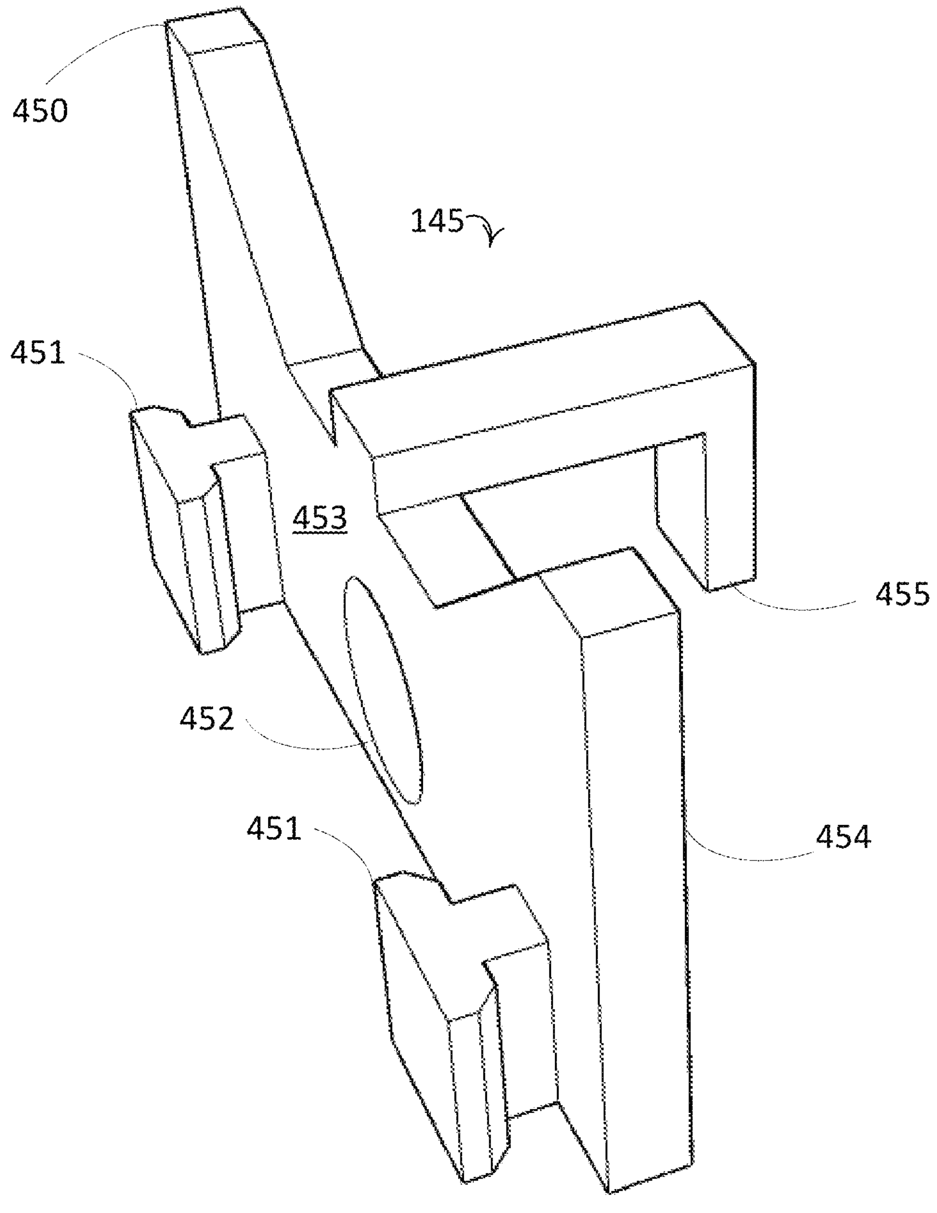
FIG. 43 depicts an exemplary wire rack mounting plate for a preferred embodiment.

FIG. 43 depicts a mount 145 mount 145 is comprised of a base 450 with a first major side 453 and a second major side 454. On the first major side 453 there are tabs 451 that align with the slots 404 in a bud 4. Mount 145 has a clip 455 configured to fit over bent wire notch 83 to provide a mount to position bud 4 to be able to sense the status of socket 76 by either the presence or absence of a bottle in socket 76.

Figure 44:
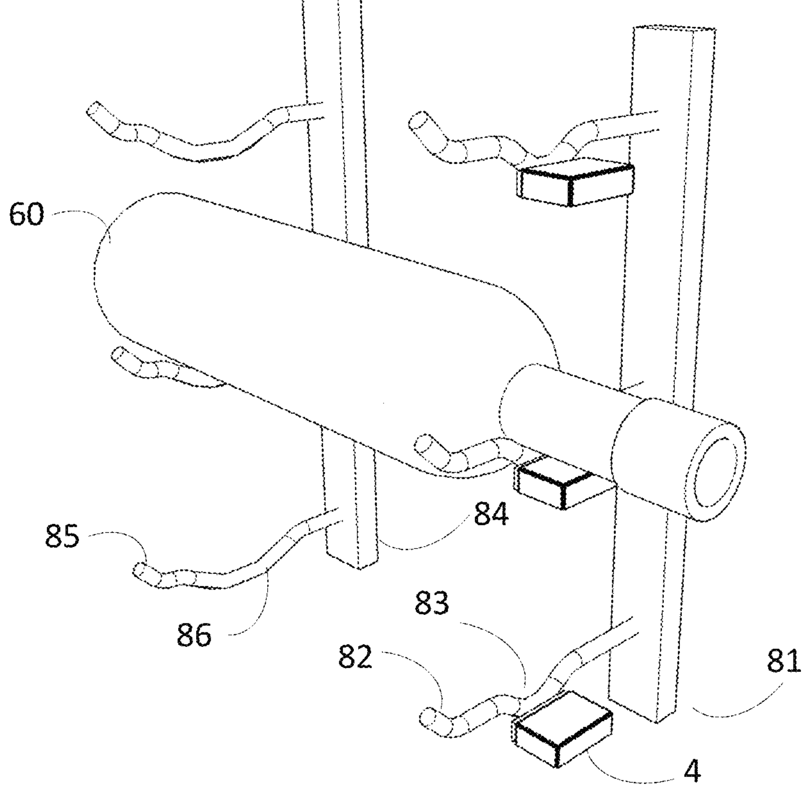
FIG. 44 depicts an isometric view of the rack of FIG. 43 with buds disposed to be adjacent to the necks of populated bottles.
Figure 45:
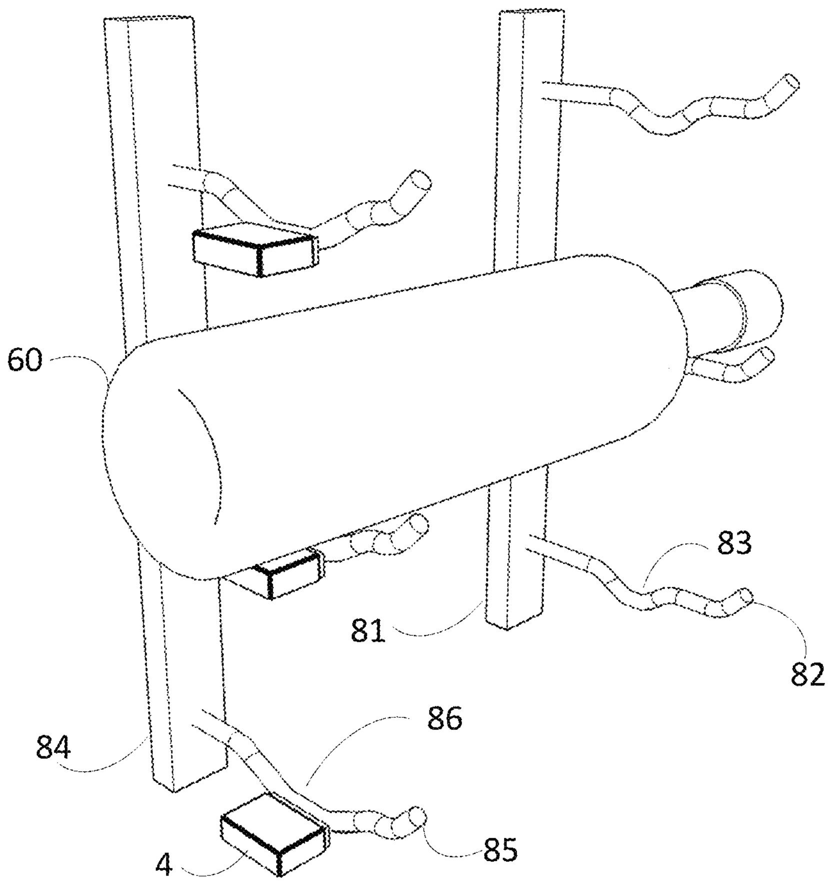
FIG. 45 depicts an isometric view of the rack of FIG. 44 with buds disposed adjacent to the bottle base.

FIG. 44 shows bud 4 mounted on bent wire 82 of wire rack 80 under notch 83 and disposed so at to be proximal to neck 61 of a bottle when present while FIG. 45 shows the bud 4 mounted under notch 86 so as to be proximal to a base or body of a bottle when present.

Figure 46:
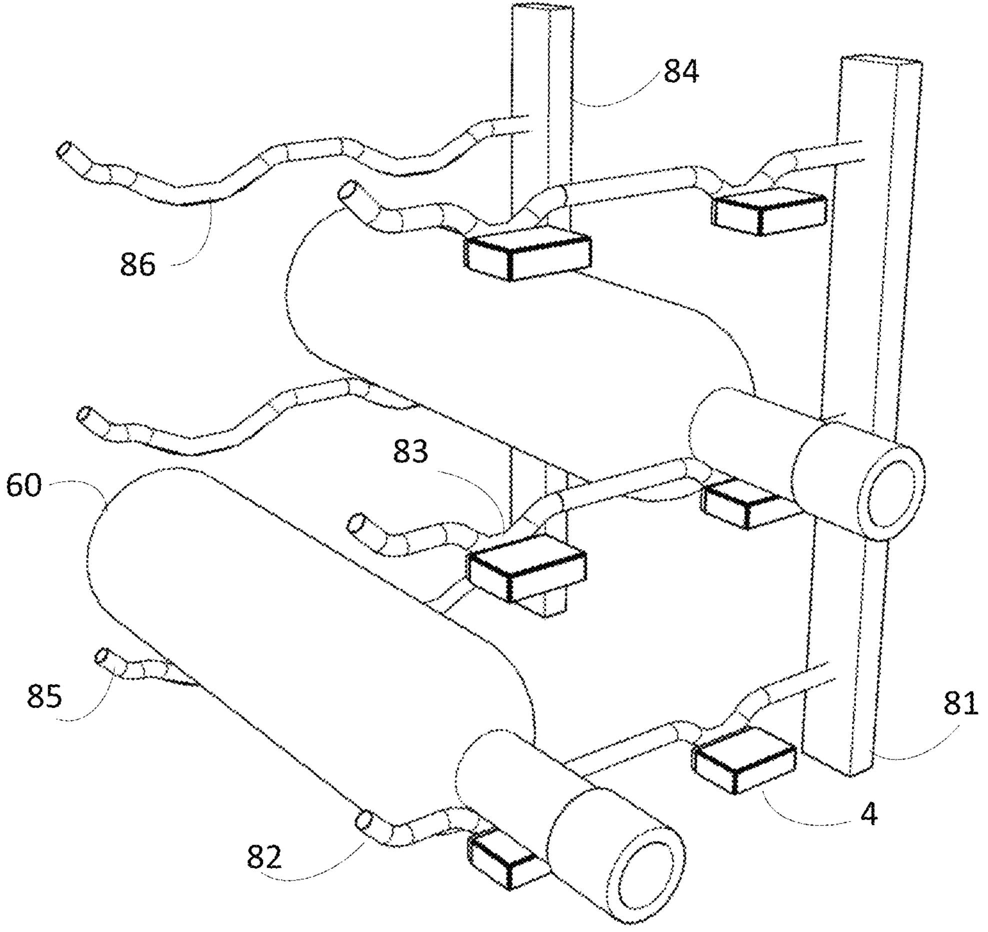
FIG. 46 depicts an isometric view of a double deep wire type wine rack with buds disposed in a manner to be proximal to the necks of bottles that populate the rack.

FIG. 46 shows two buds 4 mounted on a two-bottle bent wire 82 rail. One familiar with the art will recognize that the number of bottles on a shelf is limited only by the weight of the bottles and the strength of the wire.

Figure 47:
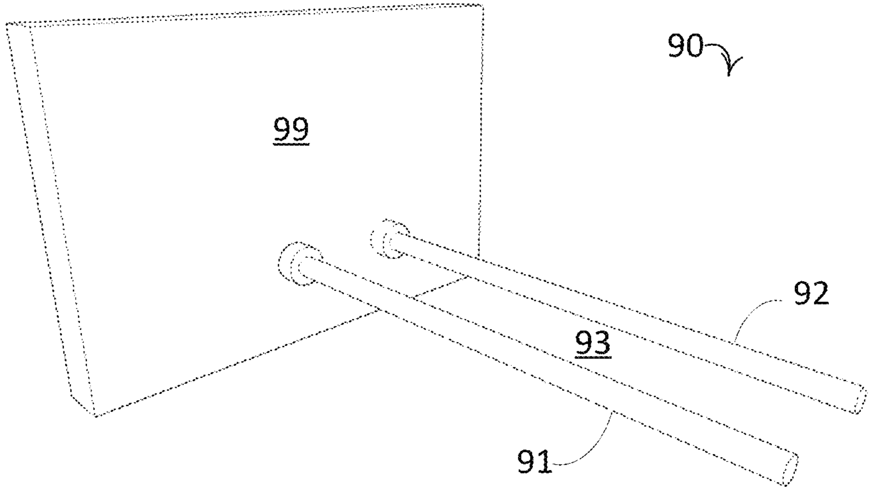
FIG. 47 depicts an isometric view of a pin type wine rack socket.
Figure 48:
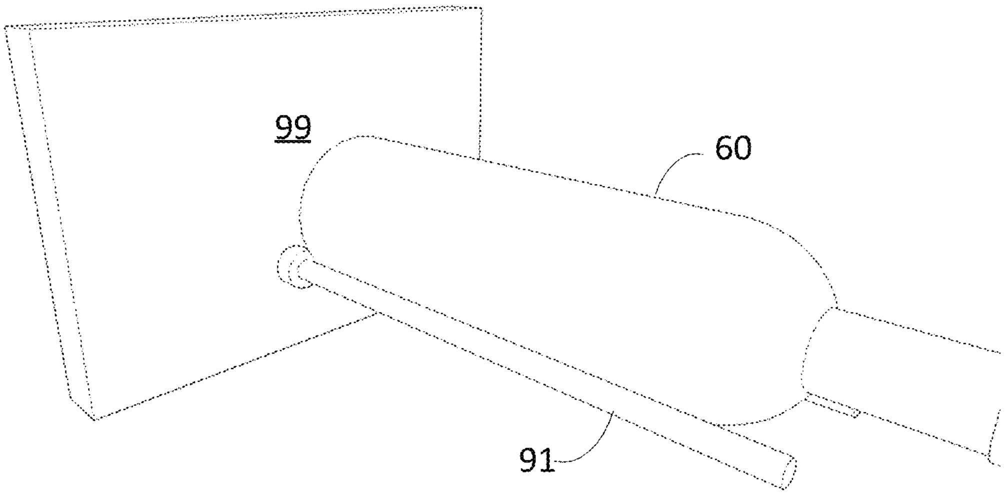
FIG. 48 depicts an isometric view of a pin type wine rack socket populated with a bottle.

A variation of the column wine rack 70 is the pin type rack 90 as depicted in FIG. 47 that illustrates pin socket 93. Right-side and left side pins 91 and 92 protrude from a surface 99 and are configured to be less distant from each other than the width of a bottle so as to hold bottle 60 as depicted in FIG. 48.

Figure 49:
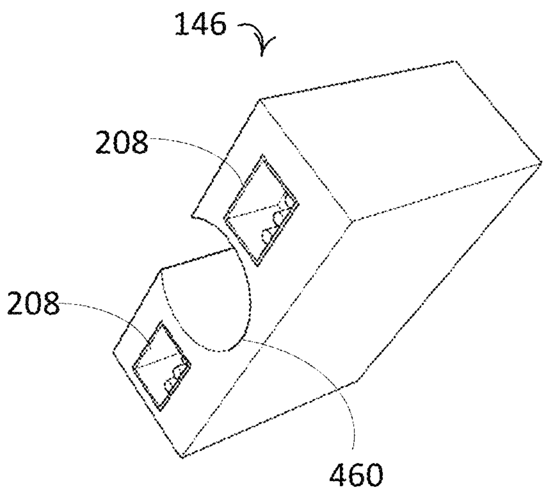
FIG. 49 depicts an alternative embodiment of a bud employable with certain embodiments of the present invention.
Figure 50:
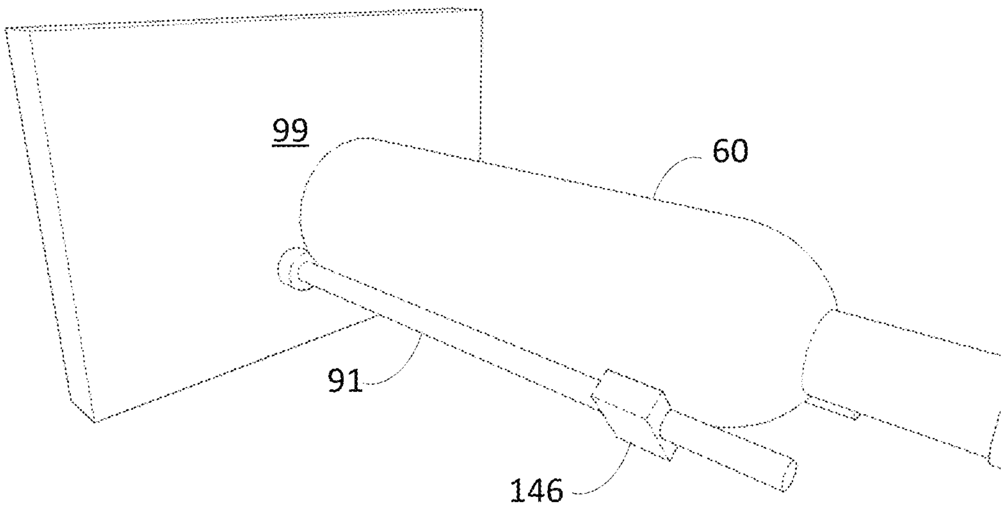
FIG. 50 depicts an isometric view of a pin type wine rack socket populated with a bottle proximal to which an exemplar bud is mounted.

An alternative housing 146 for a bud 4 is shown in FIG. 49. Housing 146 has a circular opening 460 that slides over one of pins 91, 92 from FIG. 47 as shown in FIG. 50.

Figure 51:
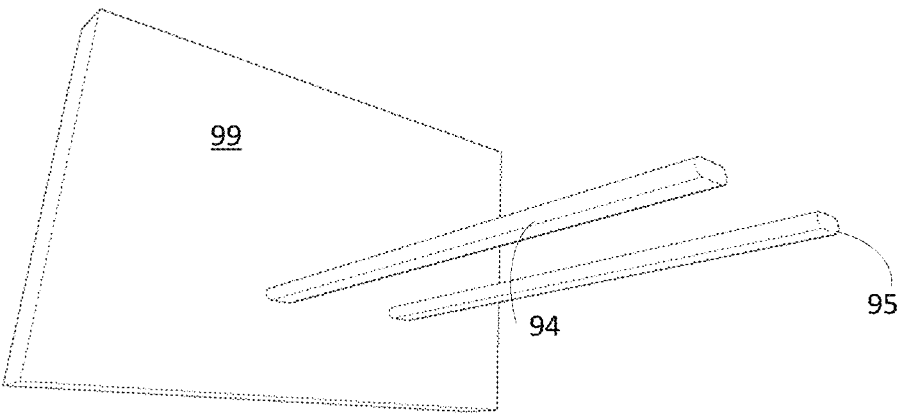
FIG. 51 depicts an isometric view of a bar type wine rack socket.

FIG. 51 shows a variation of a pin type rack that employs flat pins 94 and 95. Those of skill will appreciate that pins for a pin rack may be of a variety of configurations in cross section and are not limited to flat or round.

Figure 52:
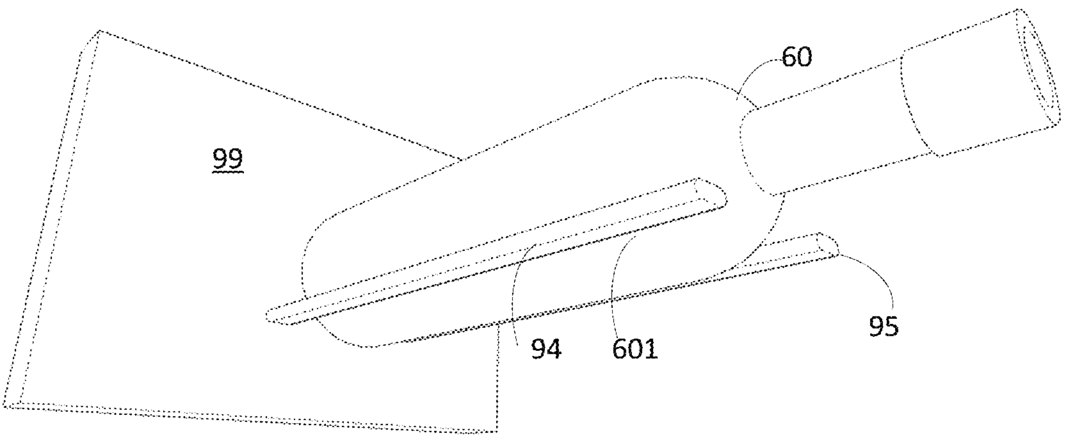
FIG. 52 depicts an isometric view of a bar type wine rack socket populated with a bottle.

FIG. 52 shows a bottle 60 populated into a socket in a bar type pin rack.

Figure 53:
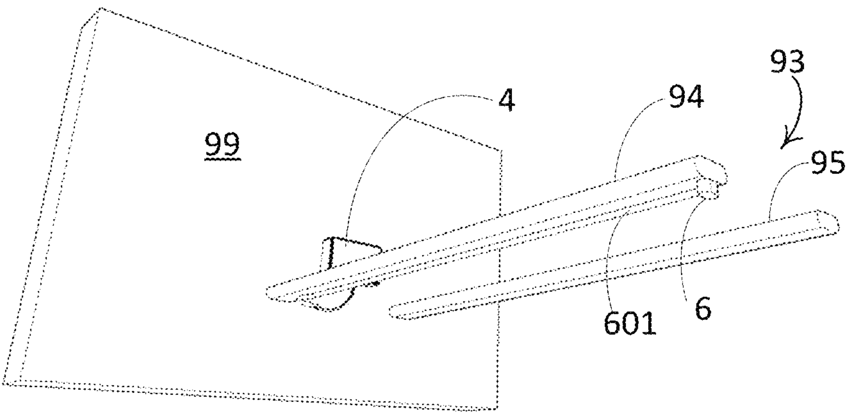
FIG. 53 depicts an isometric view of an exemplar bar type wine rack socket devised with a multi-function bud.

FIG. 53 depicts disposition of a bud 4 on surface 99. External indicator 6 is attached to the front of the left pin 94 and connected to the bud 4 by cable 601.

Figure 54:
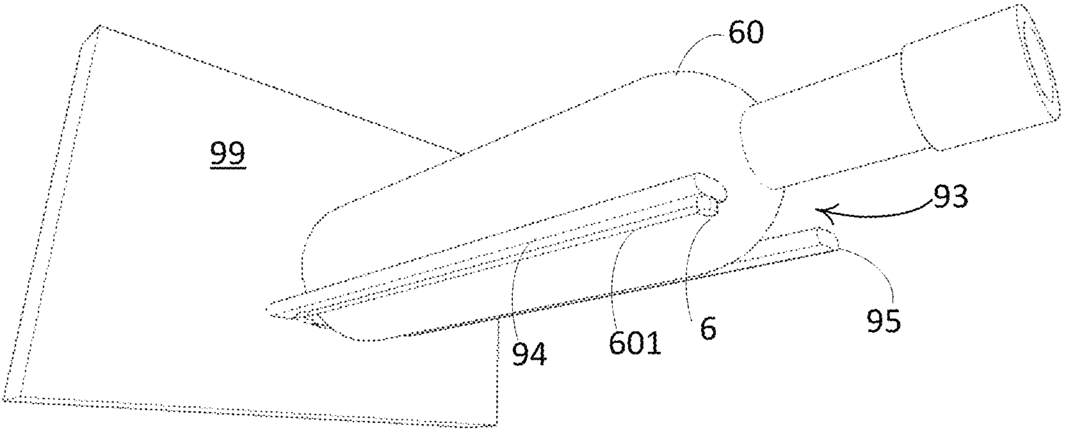
FIG. 54 depicts an isometric view of the bar type wine rack socket of FIG. 53 populated with a bottle.

FIG. 54 depicts socket 93 of FIG. 53 populated with bottle 60. While bottle 60 blocks the view of the bud 4 remote indicator 6 is still observable.

Figure 55:
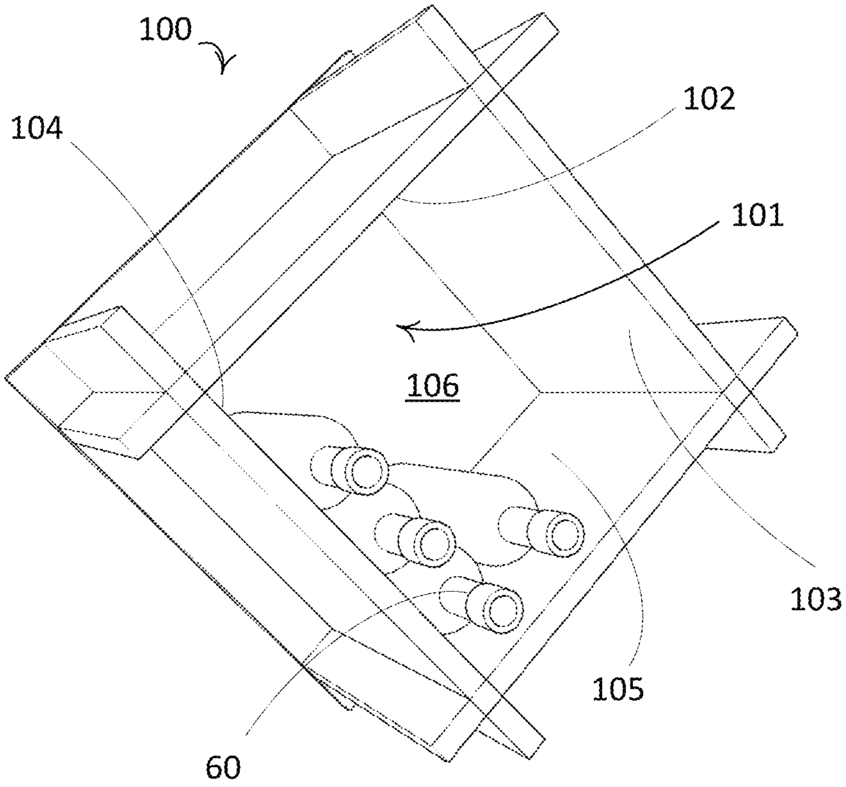
FIG. 55 depicts an isometric view of a box type wine rack holding bottles.

A cavity type wine rack 100 does not have individual sockets for bottles 60. In such embodiments, cavity 101 is the socket in which multiple bottles 60 are disposed. FIG. 55 shows a square cavity type rack 100 where cavity 101 has been rotated 45 degrees. Cavity 101 is formed by a first wall 104 on the lower left and a second wall 105 on the lower right. These two walls support bottles 60. Cavity 101 is further defined by a third wall 102 in the upper left and a fourth wall 103 in the upper right. The back of the cavity is defined by a 5$^{th}$ surface 106.

The cavity wine rack is not limited to a square configuration and may be created in rectangular, triangular or irregular shapes.

Figure 56:
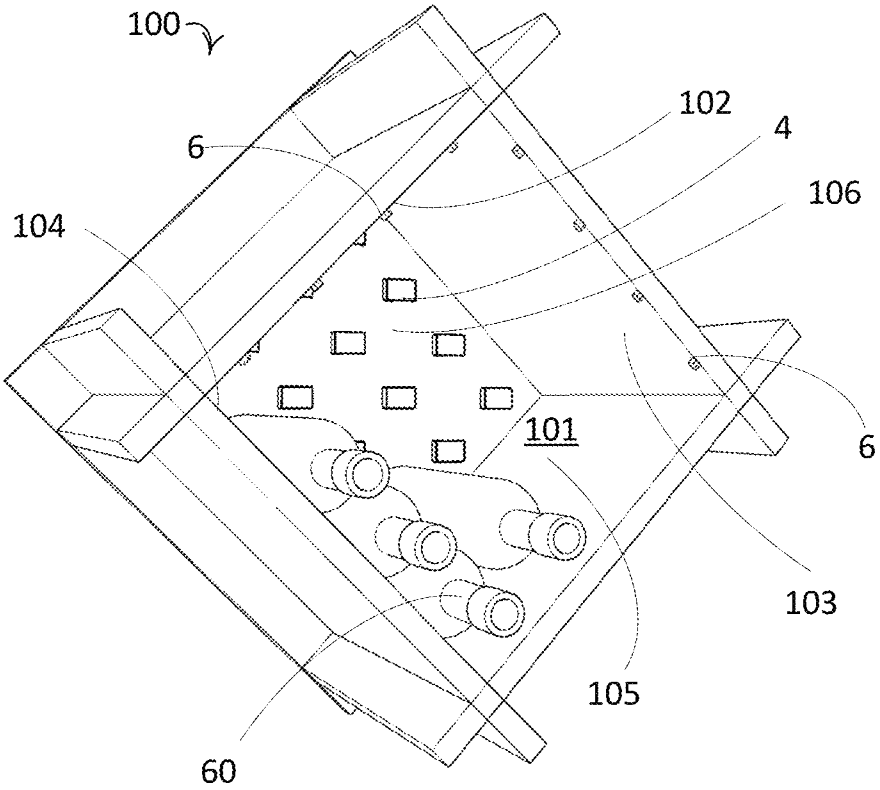
FIG. 56 depicts the box type wine rack of FIG. 55 populated with exemplar buds in which remote indicators are physically separate from the signal handling components of the bud in accordance with an alternative embodiment of the present invention.

FIG. 56 depicts cavity rack 100 with plural buds 4 disposed on back wall 106 of cavity 100 from where the presence (or absence) of a respective bottle 60 may be sensed.

External indicators 6 that correspond to selected buds 4 are disposed in position from which their provided population status indication may be appreciated when the corresponding sensing bud 4 is covered by the bottle at the intersection of the monitored row and column is being sensed.

Figure 57:
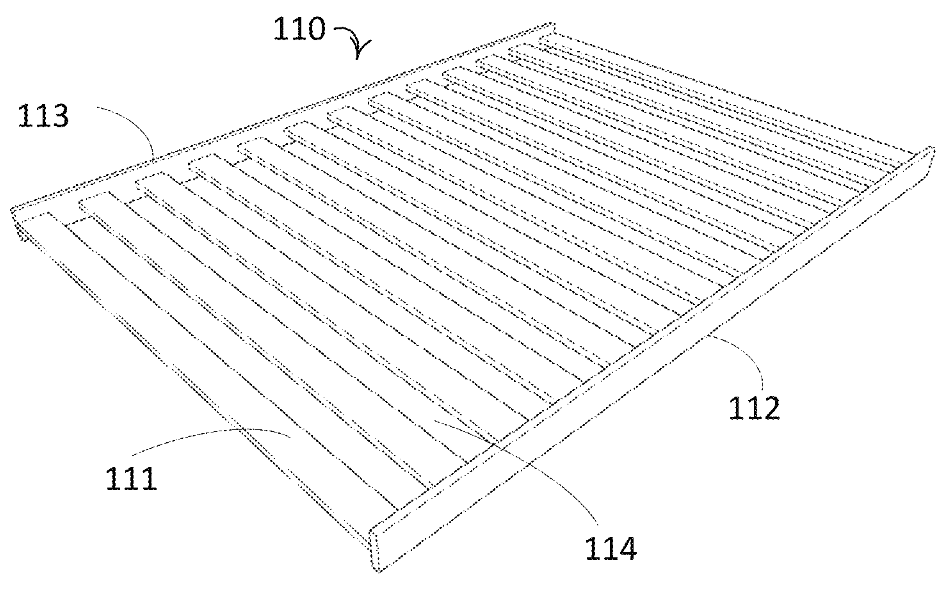
FIG. 57 depicts an isometric view of a shelf type wine rack.

FIG. 57 depicts a typical shelf 110 as may be found in a refrigerated wine storage appliance. Shelf 110 consists of a series of slats 111 between a front rail 112 and rear rail 113. The spacing of the slats 111 is such that a first row of wine bottles 60 can be placed side by side, with the neck of the bottle 61 towards the middle, in the gap 114 between every other slat 111. Gap 114 is the socket for reception of bottles 60. A second row of bottles 60 can be placed on the back half of the shelf 110 in the gap 114 that was skipped by the front row. In this configuration, the necks 61 of the bottles 60 overlap in the center of the shelf 110.

Figure 58:
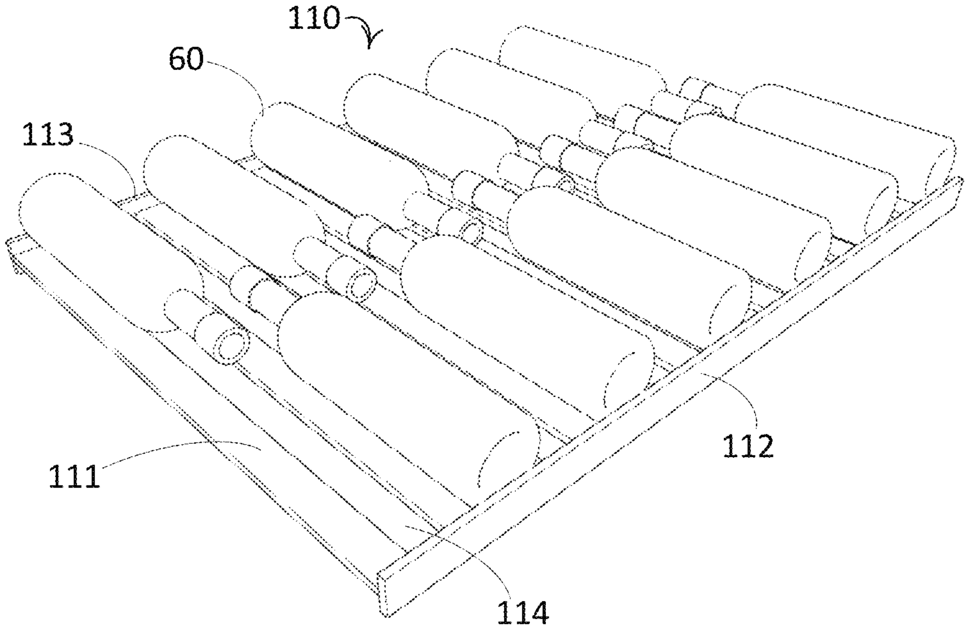
FIG. 58 depicts an isometric view of a shelf type wine rack populated with bottles.

FIG. 58. depicts shelf 110 populated with wine bottles 60.

Figure 59:
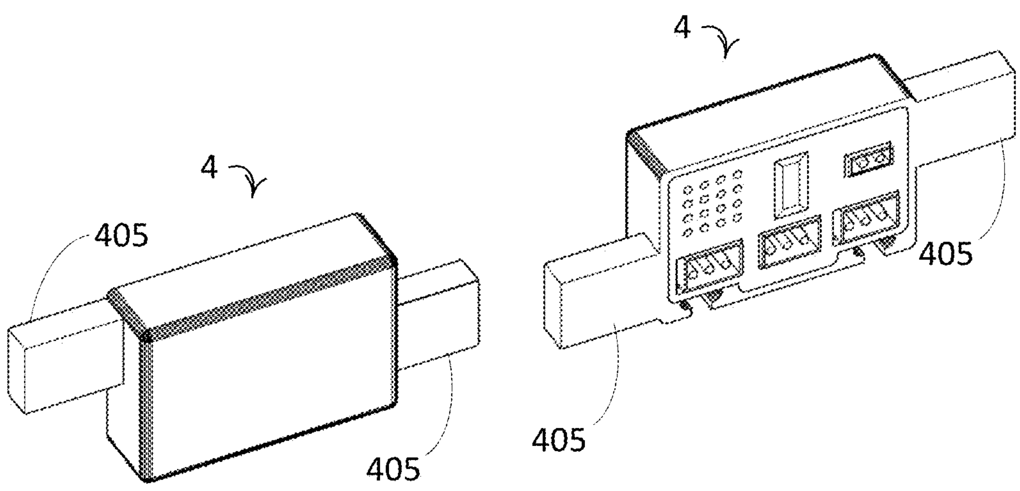
FIG. 59 depicts an alternative embodiment of an exemplar bud that may be employed to advantage in an embodiment of the present invention.

The wine shelf bud 4 as shown in FIGS. 59A and 59B is configured with extensions 405 on the top left and the lower right. Extensions 405 allow bud 4 to be mounted on slats 111 of shelf 110. Extensions 405 allow shelf buds 4 to be used on a wide range of slat 111 widths and spacings.

Figure 60:
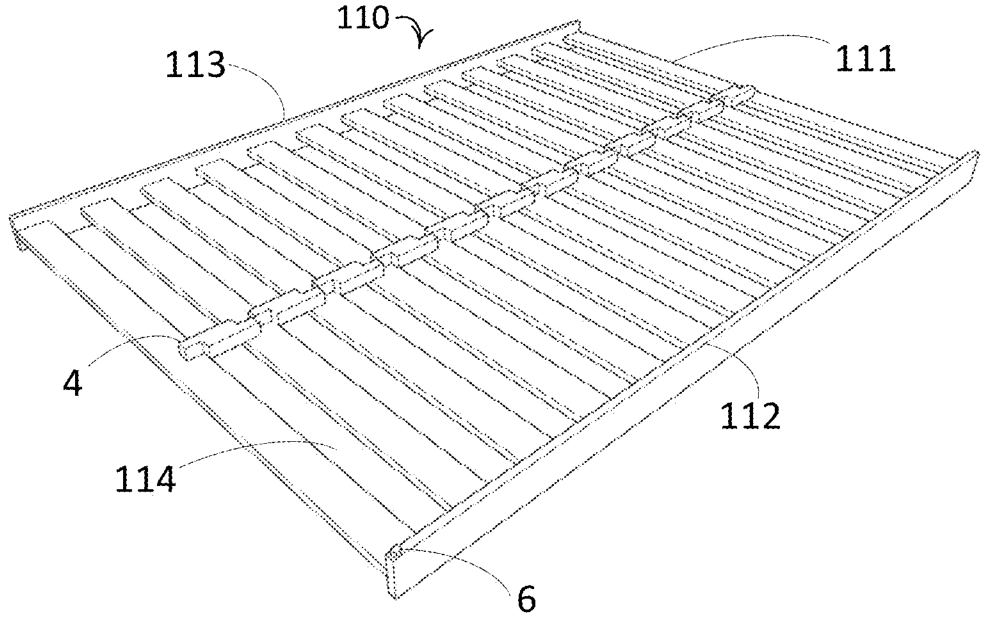
FIG. 60 depicts the shelf type wine rack of FIG. 59 that employs the alternative embodiment of the bud depicted in FIG. 59.

The Shelf buds 4 are shown mounted on shelf 110 in FIG. 60. An external indicator 6 is shown mounted on the front of rail 112 to provide a status signal to indicate the presence or absence of a bottle.

Figure 61:
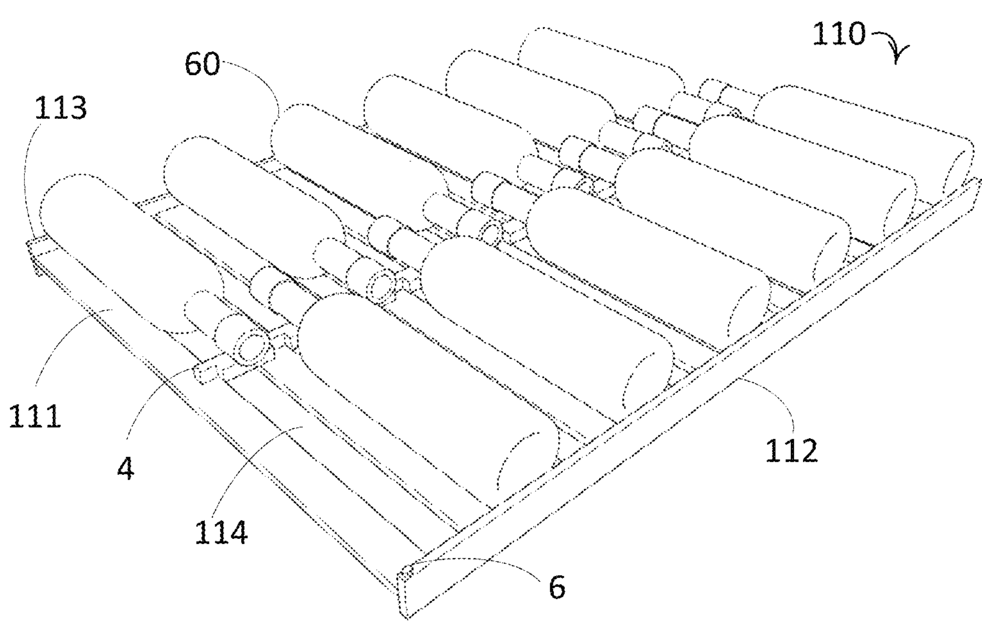
FIG. 61 depicts the shelf type wine rack of FIG. 60 populated with bottles.

FIG. 61 depicts the shelf 110 of FIG. 60 populated with bottles 60.

Figure 62:
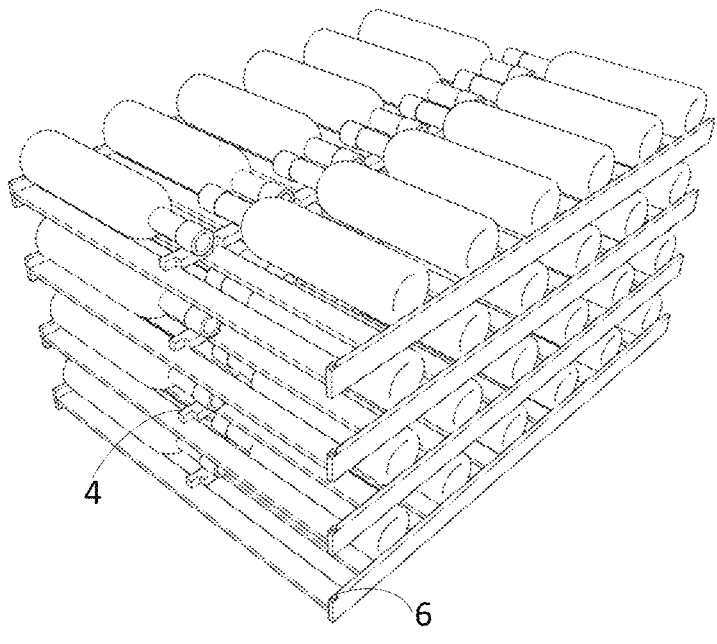
FIG. 62 depicts multiple iterations of the shelf type wine rack of FIG. 60 combined to create a stack.
Figure 63:
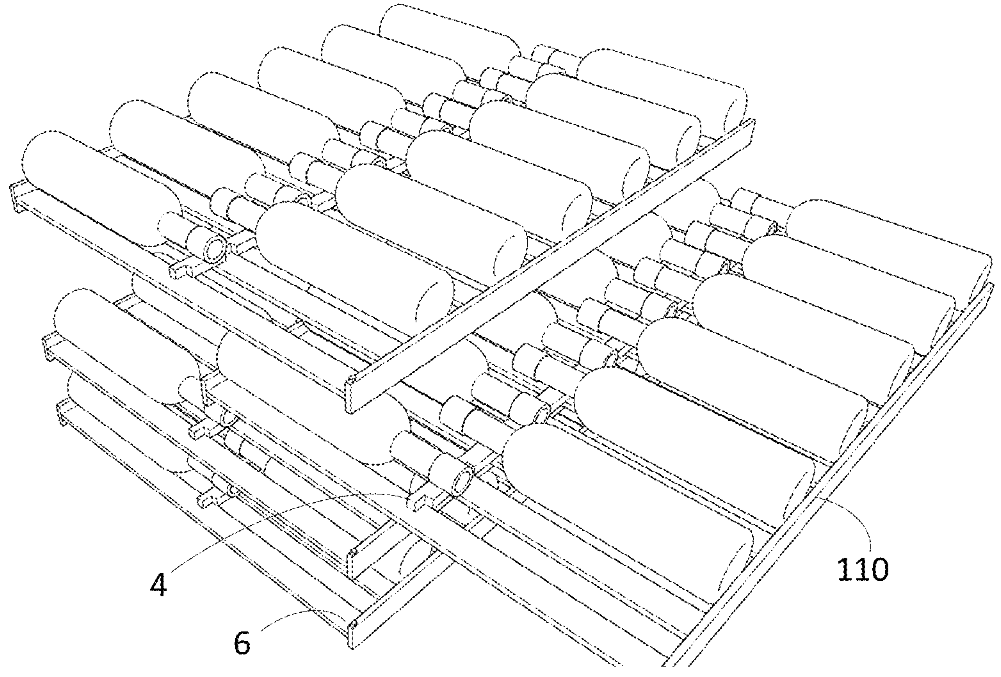
FIG. 63 depicts a stack with one shelf extended.

When shelves 110 are in a refrigerated wine storage appliance, they tend to be close together as depicted in FIG. 62. This can make observing light indicators 436 difficult without pulling out the shelf 110. As with the box type rack, an external visible light indicator 6 is used. In the case of the shelf 110, only one indicator 6 is necessary to indicate the shelf 110 that the selected bottle 60 is on and when pulled out the visible light indicator 436 is then observable when inquiry is made as to a selected bottle.

FIG. 62 depicts multiple shelves 110 to create a stack.

Figure 65:
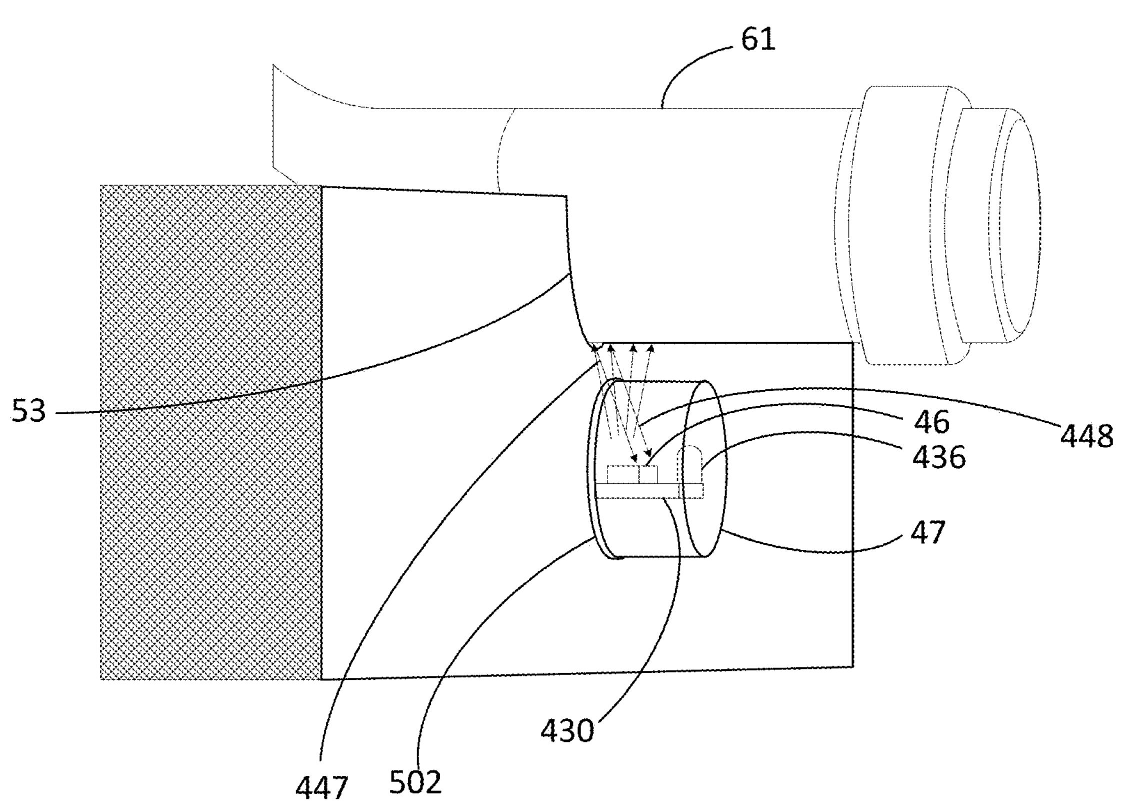
FIG. 65 depicts the alternative embodiment of FIG. 64 mounted through the rail of a wine rack.

FIG. 65 depicts the stack of shelves of FIG. 62 with one of the shelves pulled out to access the bottles 60 populated on that shelf. When shelf 110 is extended, the Buds 4 can be seen disposed below the neck of the bottles 60

Figure 64:
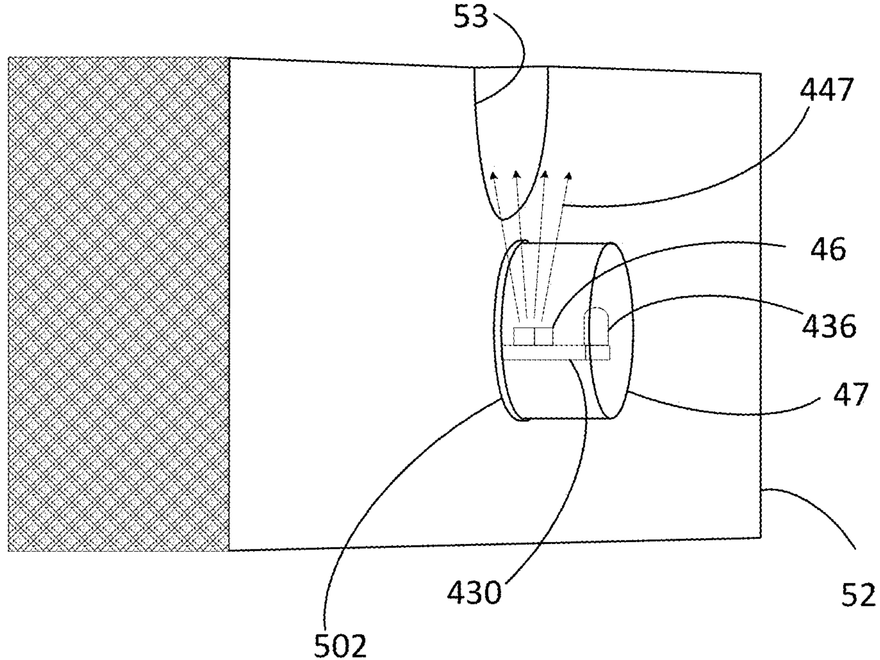
FIG. 64 depicts an alternative embodiment of a sensor node that may be employed in an embodiment.

FIG. 64 depicts an alternative embodiment bud 4 that mounts thru rail 52 of a wood rack. Rather than being mounted on the face of rail 52 bud 4 is mounted in a hole 502 drilled in rail 52 under notch 53. The majority of the bud 4 is located in hole 520 or behind rail 52 while the section of bud 4 that contains detector 46 and visible light indicator 436 protrudes from rail 52.

FIG. 65 depicts the emission of beam 447 and its partial reflection off neck 61 to proximity sensor 46.

Figure 66:
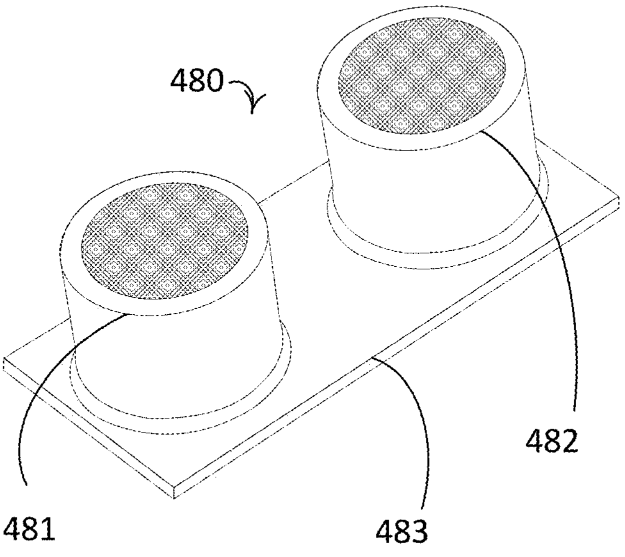
FIG. 66 depicts an exemplar ultrasonic transducer module that may be employed to advantage in alternative embodiments.

An ultrasonic transducer 480 may be employed for detection of bottles. FIG. 66 depicts an exemplary ultrasonic transceiver 480 comprising an ultrasonic transmitter 481 and an ultrasonic receiver 482 mounted on a module 483. The transmitter 481 emits an ultra-sonic chirp and receiver 482 detects the echo from objects disposed adjacent to the front of transceiver 480.

Figure 67:
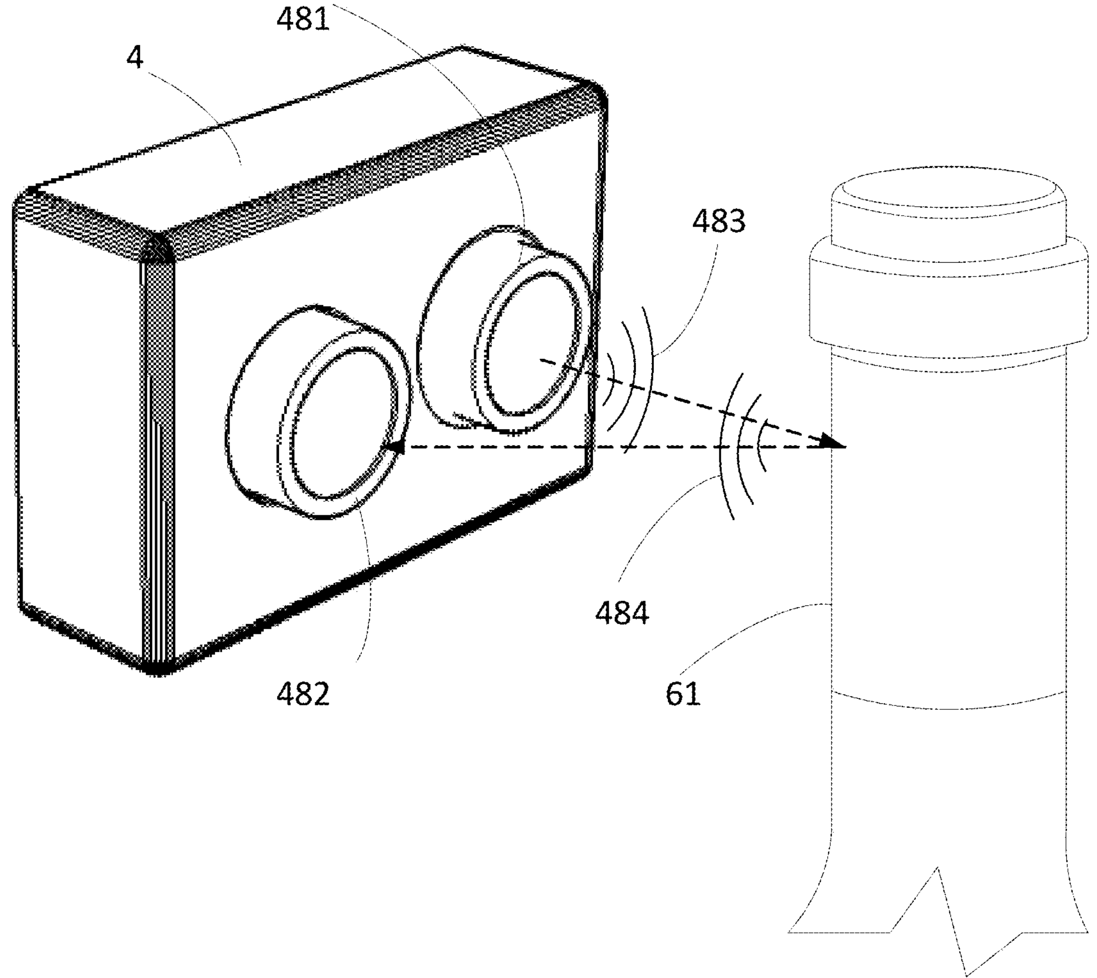
FIG. 67 Depicts an ultrasonic transducer used as a proximity sensor for detecting the presence of a wine bottle.

FIG. 67 depicts an ultrasonic transceiver 480 integrated into a bud 4. Transmitter 481 produces an ultrasonic burst or chirp. The chirp travels until it hits the surface of bottle 60 and in this case the neck 61. The reflected chirp or echo travels back to ultrasonic receiver 482. The circuitry in bud 4 may determines the time that it took the chirp to echo back to receiver 482 of bud 4 and consequently determine if selected bottle 60 is present in the associated socket.

Figure 68:
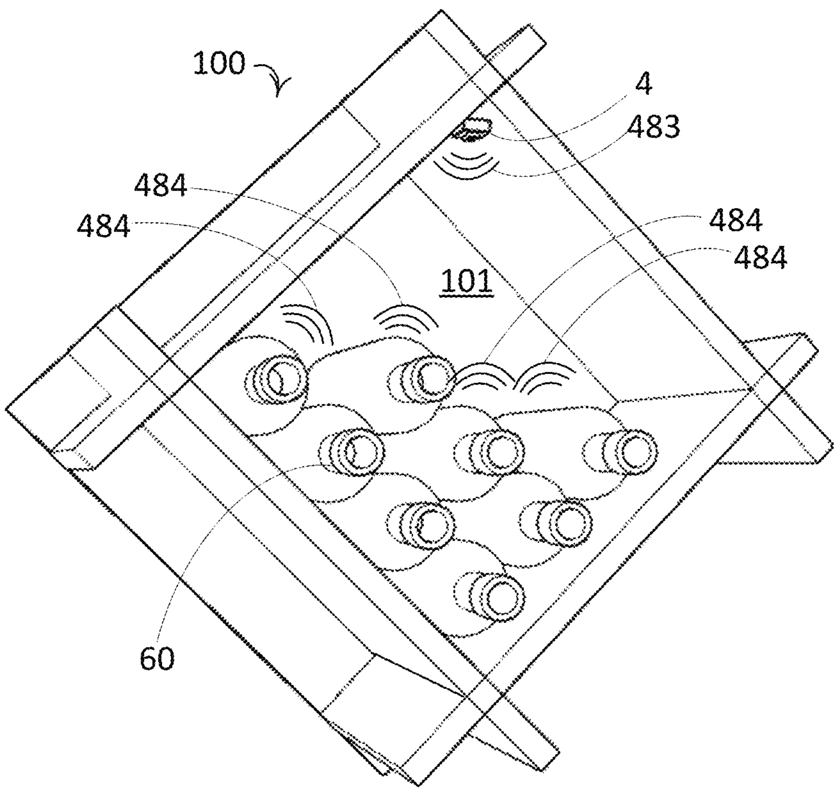
FIG. 68 depicts an alternative embodiment proximity sensor employed in a box wine rack.

FIG. 68 depicts a cavity 100 populated with eight bottles 60. Bud 4 having ultrasonic transducer emits a chirp 483. Reflections 484 of the chip bounce back to bud 4 from the bottles 60 and other surfaces. The reflections 484 from bottles 60 will return at different times depending how far away the chirp 483 and reflection 484 must travel. Reflections 484 will vary in strength depending on the angle from perpendicular. This different return times and return strength will form a signature that may be interpreted to compute the population of cavity 100 or when the bottle population changes.

Figure 69:
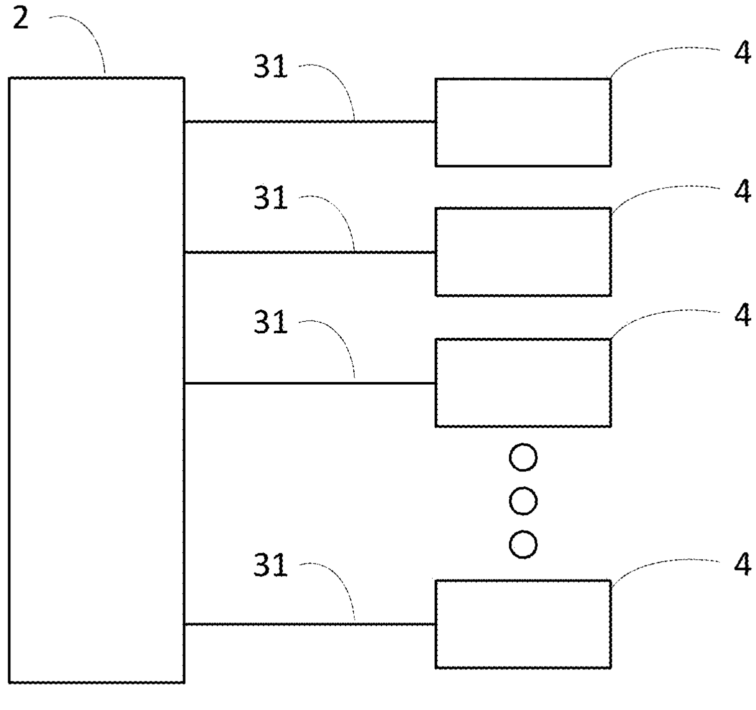
FIG. 69 depicts an alternative embodiment of a vine interconnect.

FIG. 69 shows an alternative embodiment of vine 3 in which connectivity is point to point. Each depicted bud 4 has a single connection directly to root 2. This has the benefit of the root 2 being able to talk directly to each bud 49. There is only one connector in each direct connect bud 4 for vine 3 interconnect so there is no message passthrough.

The simplest interconnect it is not practical for installations having large numbers of bottles 60. One impediment is physical in that root 2 would need an expansion module to hold all the large number of connectors that would be required by a large direct connection embodiment. Further, the cable bundle from a 400-bottle installation would be thicker than bottle 60. Other implementation problems can be envisioned.

Figure 70:
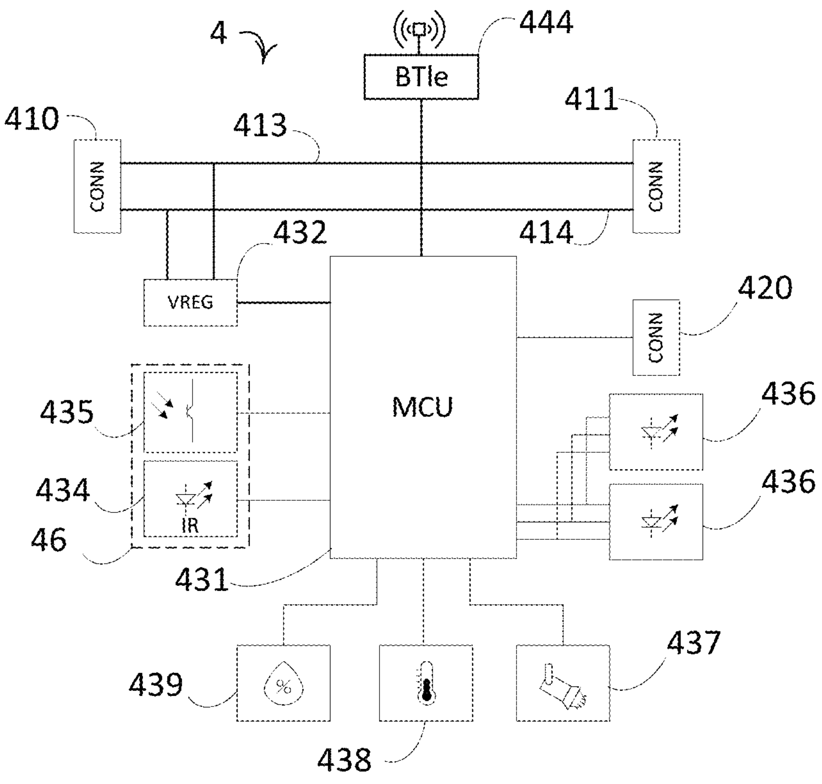
FIG. 70 depicts a block diagram of a wireless alternative embodiment of a vine interconnect that may be employed to advantage in an embodiment of the present invention.

Another embodiment of bud 4 is used in vine 3 employing wireless communication. The FIG. 70 depicted embodiment of a wireless bud 4 includes a root facing connector 410 and a downstream connector 411 with common connections for power 413 and ground 414. Vine 3 interconnect cable for this alternative embodiment would be a 2-wire cable with the two wires being for power and ground. A wireless embodiment can be expected to have a fast response time since the root 2 communicates directly with each bud 4.

Figure 71:
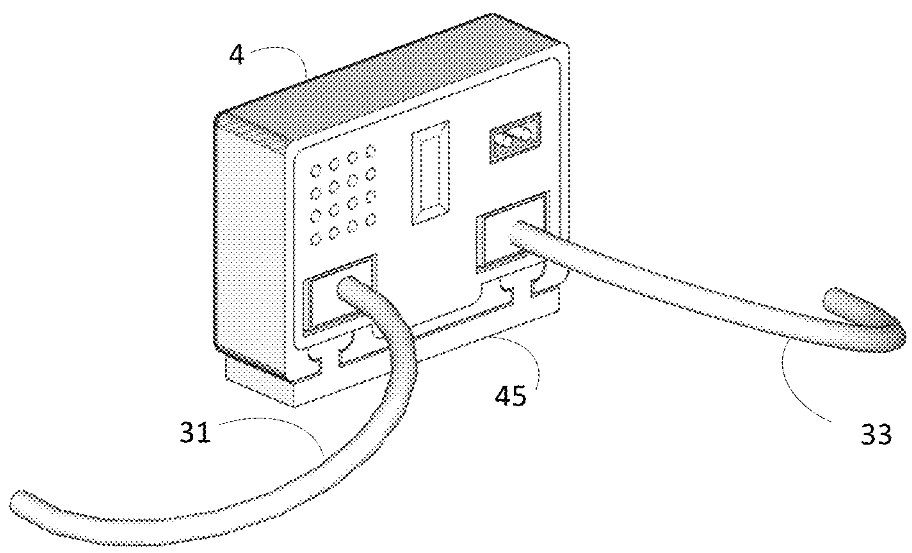
FIG. 71 depicts an external view of an instantiation of an alternative bud.

FIG. 71 depicts the external aspect of bud 4 as would be employed in a wireless implementation of vine 3 with upstream and downstream connections 31 and 33.

Figure 72:
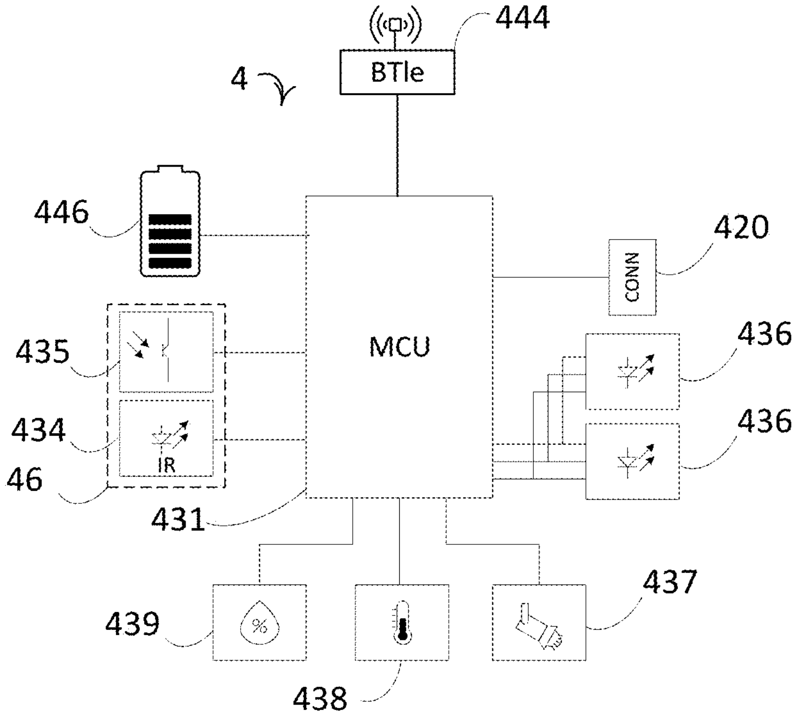
FIG. 72 depicts the block diagram of a battery-powered wireless alternative embodiment of a vine interconnect.

FIG. 72 depicts a block diagram of an alternative embodiment of bud 4. In this embodiment, power is supplied by a battery 446. Without a need to forward power to downstream buds, the downstream connector 411 has also been eliminated.

An embodiment employing battery-powered buds would be the simplest to install since there is no power wiring from bud to bud. However, replacing the batteries in a medium size configuration become an expensive and time-consuming process.

Figure 73:
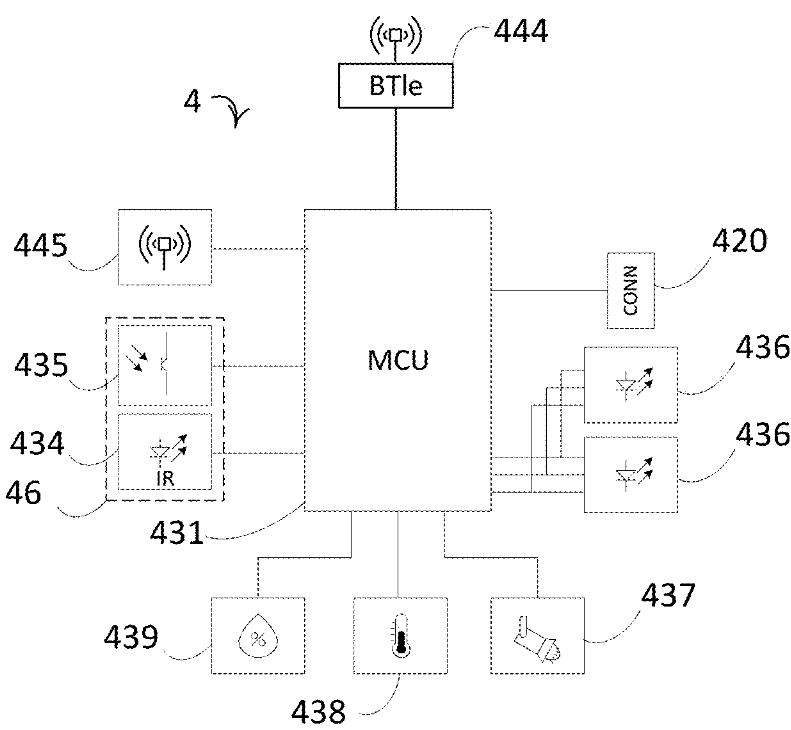
FIG. 73 depicts the block diagram of a wireless power distribution and wireless signaling alternative embodiment of a vine interconnect.

FIG. 73 depicts the block diagram of an alternative embodiment of bud 4 of FIG. 72. In this embodiment, the battery has been replaced with a wireless power receiver 445.

Figure 74:
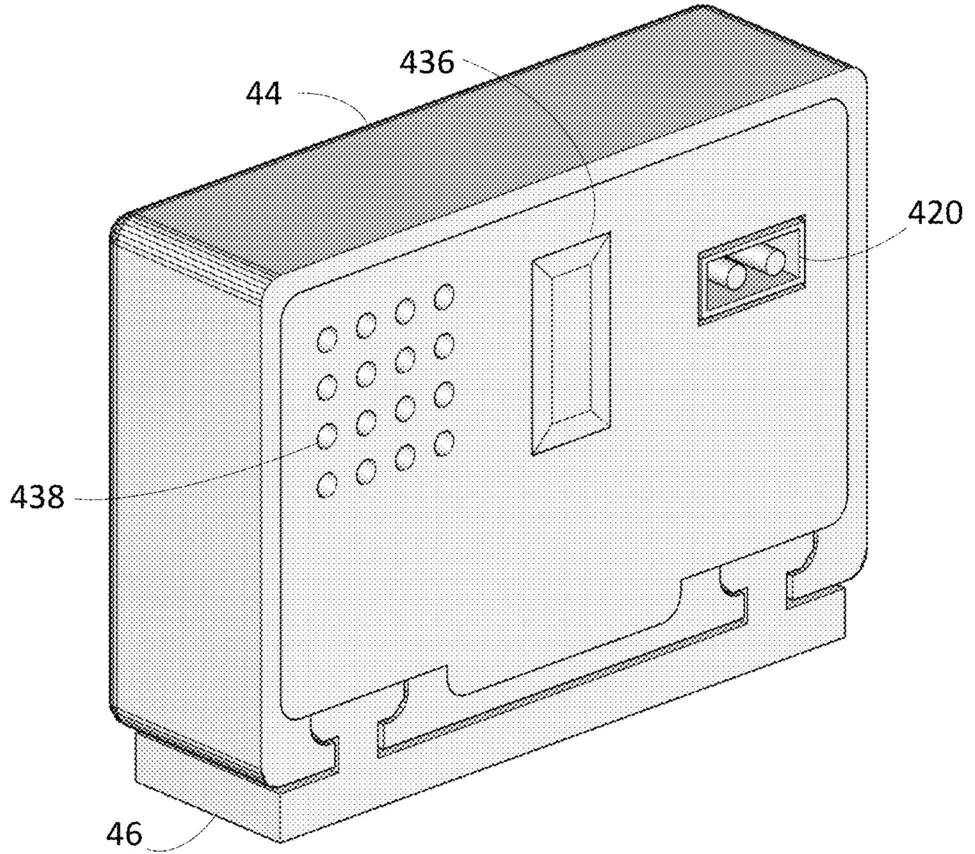
FIG. 74 depicts an instantiation of an alternative bud.

FIG. 74 depicts the external appearance of an exemplar bud 4 implemented in the manner of the block diagram of FIG. 73, along with a wireless signalling capability. Such embodiments of bud 4 do not require physical connections to each other or to root 2 and thus there are no vine 3 connectors.

Figure 75:
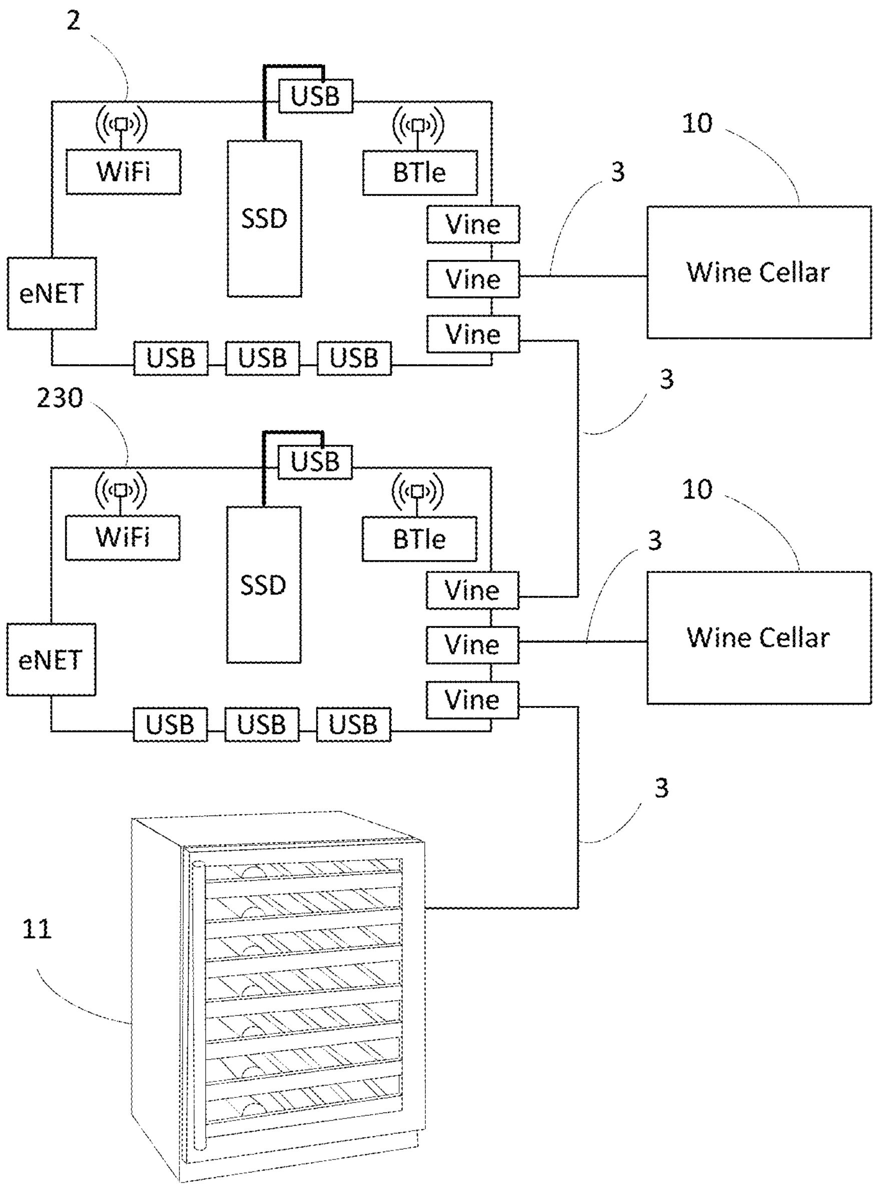
FIG. 75 depicts a root as a directly connected primary and secondary controller.

FIG. 75 depicts a configuration of a wine inventory control system that employs a wired vine 3 expansion. Here a master root 2 is connected to to a wine cellar 10 through a vine 3 and is connect to an expansion root 230. Expansion root 230 receives messages from first root 2 via a vine 3 connection and determines from the addressing if the message is for a bud 4 on it's wine cellar vine or if it is for a third root 231 and an affiliated vines and buds that provide inventory control over a refrigerated wine storage appliance 11 This integration can be a factory install or an aftermarket upgrade.

Figure 76:
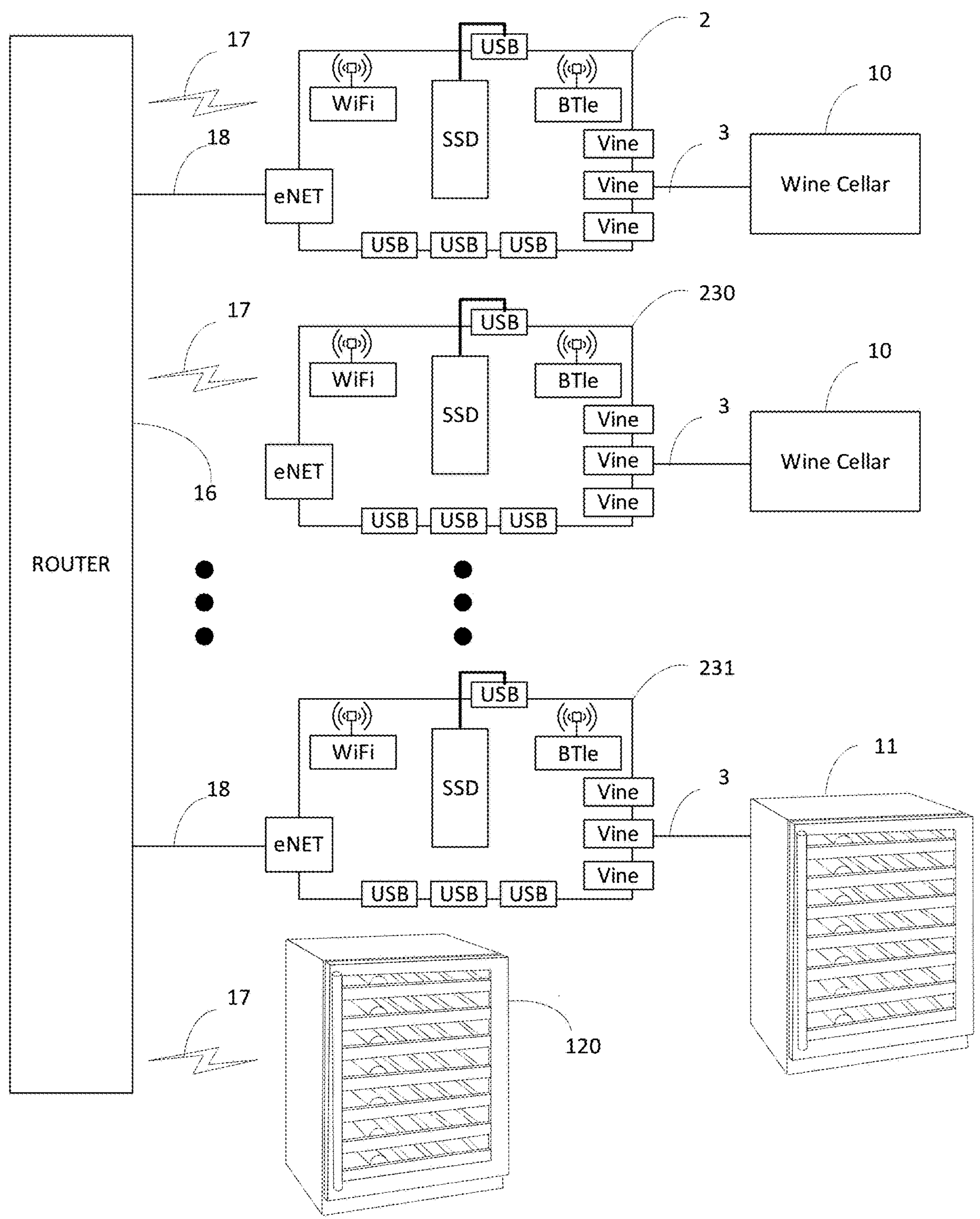
FIG. 76 depicts a root as a wirelessly-connected primary and secondary controller.

FIG. 76 shows an alternative method of vine expansion. In this alternative, first or master root 2 broadcasts a message over a WIFI channel 17 or a wired ethernet 18 connection to a router 16. Expansion Root 230 is connected to the router 16 by a WIFI channel 17 while the second expansion root 231 is connected to the router 16 by a wired ethernet connection 18. In addition to the expansion roots, a refrigerated wine storage appliance 120 linked to first root 2 thru router 16 via a WIFI channel 17

Figure 77:
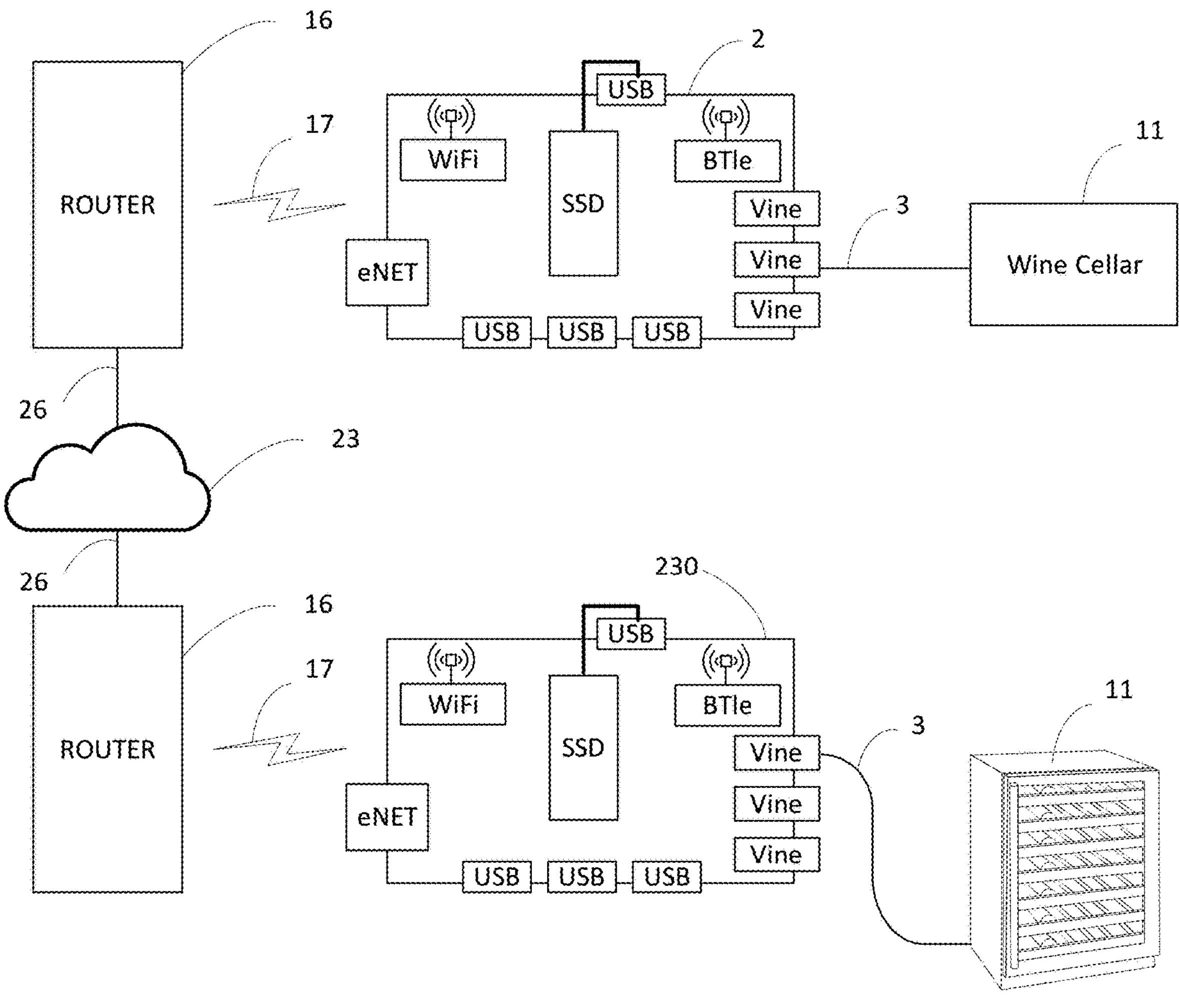
FIG. 77 depicts a root as a cloud-connected primary and secondary controller.

FIG. 77 shows a remote expansion with first or master root 2 in one location and the second root 230 in a different location. First root 2 communicates with remote second root 230 through the cloud. First root 2 is connected to the cloud 23 via a WIFI connection 17 to a router 16 that is connected via a broadband connection 26 to the cloud 23. Remote root 230 is also connected to a router 16 via a WIFI channel 17 with a broadband connection 26 to the cloud 23.

Figure 78:
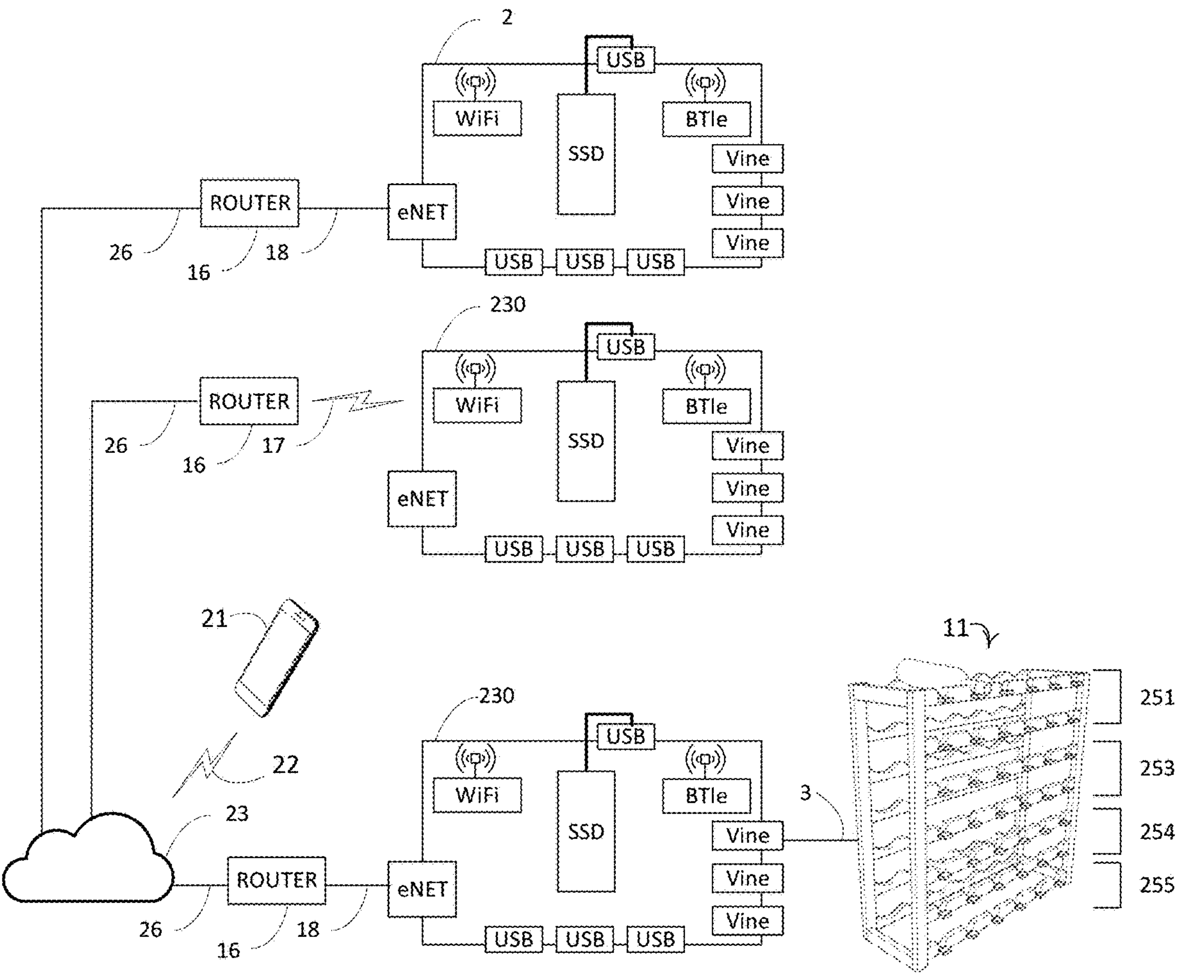
FIG. 78 depicts a multi-host expansion root as may be employed in an embodiment of the present invention.

FIG. 78 depicts an alternative use embodiment that comprises multiple hosts and a single expansion root 230. Expansion root 230 is connected to a wine rack 11 via the vine 3 and to the cloud 23. First host root 2 is connected to the cloud 23 and is allocated to manage storage area 251 of rack 11. A second host root 230 is also connected to the cloud 23 and is allocated to manage storage area 253 of rack 11. An embodiment that resides on a a cell phone 21 also has a wine storage area 254 allocated to its management.

What is claimed is:

1. A system for monitoring bottle inventory of a wine storage facility comprising:

a root and a plurality of buds each one of the plurality of buds including a proximity sensor and communications facilities configured to implement communications with the root, there being a first selected bud of the plurality of buds that is movable and selectively disposed in the wine storage facility on a first communications path and proximally located adjacent to a first socket of the wine storage facility such that a first socket status of the first socket can be sensed by the proximity sensor of the first selected bud which is configured to communicate to the root the first socket status using the first communications path, the first bud having an address that is associated with the first socket and is communicated to the root with the first socket status and a second selected bud of the plurality of buds that is movable and selectively disposed in the wine storage facility on a second communications path and proximally located adjacent to a second socket of the wine storage facility such that a second socket status of the second socket can be sensed by the proximity sensor of the second selected bud which is configured to communicate to the root the second socket status using the second communications path and the first communications path, the second bud having an address that is associated with the second socket and is communicated to the root with the second socket status.

2. The system of claim 1 further comprising a third selected bud of the plurality of buds that is movable and selectively disposed in the wine storage facility on a third communications path and proximally located adjacent to a third socket of the wine storage facility such that a third socket status of the third socket can be sensed by the proximity sensor of the third selected bud which is configured to communicate the third socket status to the root using the third communications path, the second communications path and the first communications path, the third bud having an address that is associated with the third socket and is communicated to the root with the third socket status.

3. The system of claim 1 further comprising a first dual path bud disposed at an intersection of the first communications path and the second communications path.

4. The system of claim 3 in which the first dual path bud acts as a repeater to participate in conveyance of messages from the root to the second selected bud and conveyance of messages from the second selected bud to the root.

5. The system of claim 4 in which the conveyance of messages is implemented with a half-duplex circuit of the first dual path bud.

6. The system of claim 2 further comprising a second dual path bud disposed at an intersection of the second communications path and the third communications path.

7. The system of claim 6 in which the second dual path bud acts as a repeater to participate in conveyance of messages from the root to the third selected bud and participate in conveyance of messages from the third selected bud to the root.

8. The system of claim 1 further comprising a first status indicator associated with the first selected bud and a second status indicator associated with the second selected bud and the first status indicator is configured to indicate the first socket status and the second status indicator is configured to indicate the second socket status.

9. The system of claim 8 in which the first status indicator indicates the first socket status using visible light and the second status indicator indicates the second socket status using visible light.

10. The system of claim 8 in which the first status indicator indicates the first socket status with an audible signal.

11. The system of claim 1 in which the proximity detector comprises an IR detector.

12. The system of claim 1 in which the first and second communications paths are implemented with wireless technologies.

13. The system of claim 2 in which the first, second and third communications paths are each implemented with wireless technologies.

14. The system of claim 1 in which the root is configured to communicate with an application on a cell phone.

15. The system of claim 1 in which the first and second communication paths are part of a divergent mesh interconnect network that is movable and selectively disposed in the wine storage facility to points of interest for sensing the presence or absence of wine bottles at the points of interest.

16. The system of claim 2 in which the first, second, and third communication paths are part of a divergent mesh interconnect network that is movable and selectively disposed in the wine storage facility to points of interest for sensing the presence or absence of wine bottles at the points of interest.

17. The system of claim 2 in which the address of the first bud corresponds with the position of the first bud in the first communication path, the address of the second bud corresponds with the position of the second bud in the second communication path, and the address of the third bud corresponds with the position of the third bud in the third communication path.

18. The system of claim 2 in which each of the first, second, and third buds are multifunction buds that are capable of sensing and communicating to the root at least one of temperature and humidity.

19. A system for monitoring bottle inventory of a wine storage facility comprising:

a root and a plurality of buds each one of the plurality of buds including a proximity sensor and communications facilities configured to implement communications with the root, there being a first selected bud of the plurality of buds that is movable and selectively disposed in the wine storage facility on a first communications path and proximally located adjacent to a first socket of the wine storage facility such that a first socket status of the first socket can be sensed by the proximity sensor of the first selected bud which is configured to communicate to the root the first socket status using the first communications path, the first bud having an address that is associated with the first socket and is communicated to the root with the first socket status, a second selected bud of the plurality of buds that is movable and selectively disposed in the wine storage facility on a second communications path and proximally located adjacent to a second socket of the wine storage facility such that a second socket status of the second socket can be sensed by the proximity sensor of the second selected bud which is configured to communicate to the root the second socket status using the second communications path and the first communications path, the second bud having an address that is associated with the second socket and is communicated to the root with the second socket status, and a third selected bud of the plurality of buds that is movable and selectively disposed in the wine storage facility on a third communications path and proximally located adjacent to a third socket of the wine storage facility such that a third socket status of the third socket can be sensed by the proximity sensor of the third selected bud which is configured to communicate the third socket status to the root using the third communications path, the third bud having an address that is associated with the third socket and is communicated to the root with the third socket status, wherein the first, second, and third communication paths are part of a divergent mesh interconnect network that is movable and selectively disposed in the wine storage facility to points of interest for sensing the presence or absence of wine bottles at the points of interest.

20. The system of claim 19 further comprising a first dual path bud disposed at an intersection of the first communications path and the second communications path.

* * * * *